US012589042B2

(12) United States Patent
Petton et al.

(10) Patent No.: US 12,589,042 B2
(45) Date of Patent: Mar. 31, 2026

(54) SURFACE ADAPTATION FOR PATIENT PRONING

(71) Applicant: Hill-Rom Services, Inc., Batesville, IN (US)

(72) Inventors: Marlene Petton, Auray (FR); Kathryn R. Smith, Batesville, IN (US); Bryan Weidman, Columbus, IN (US); Neal Wiggermann, Batesville, IN (US); Robert Mark Zerhusen, Cincinnati, OH (US); Jie Zhou, Batesville, IN (US)

(73) Assignee: Hill-Rom Services, Inc., Batesville, IN (US)

( * ) Notice: Subject to any disclaimer, the term of this patent is extended or adjusted under 35 U.S.C. 154(b) by 175 days.

(21) Appl. No.: 18/134,704

(22) Filed: Apr. 14, 2023

(65) Prior Publication Data

US 2023/0329931 A1 Oct. 19, 2023

Related U.S. Application Data

(60) Provisional application No. 63/331,982, filed on Apr. 18, 2022.

(51) Int. Cl.
*A61G 7/018* (2006.01)
*A61G 7/05* (2006.01)

(52) U.S. Cl.
CPC ........... *A61G 7/018* (2013.01); *A61G 7/0507* (2013.01); *A61G 7/0527* (2016.11)

(58) Field of Classification Search
CPC .... A61G 7/018; A61G 7/0507; A61G 7/0527; A61G 7/05776; A61G 7/065; A61G 7/07; A61G 7/015; A61G 2200/325
See application file for complete search history.

(56) References Cited

U.S. PATENT DOCUMENTS

| | | | |
|---|---|---|---|
| 6,282,737 | B1 | 9/2001 | Vrzalik |
| 6,952,852 | B2 | 10/2005 | Reeder et al. |

(Continued)

FOREIGN PATENT DOCUMENTS

| | | |
|---|---|---|
| CN | 107126005 A | 9/2017 |
| CN | 108028005 A | 5/2018 |

(Continued)

OTHER PUBLICATIONS

Linet, Instructions for Use and Technical Description, OptiCAre X, Integrated Mattress System for Multicare X, D9U003VSX-0101, Version: 00, Publication Date: Oct. 2021.

(Continued)

*Primary Examiner* — Justin C Mikowski
*Assistant Examiner* — George Samuel Gines
(74) *Attorney, Agent, or Firm* — Price Heneveld LLP

(57) ABSTRACT

A patient proning system includes a surface assembly configured to be positioned on a frame of a support apparatus. The surface assembly includes a pneumatic system that includes bladders arranged in multiple zones and a pump in fluid communication with the bladders. The pump is configured to adjust the bladders between deployed and non-deployed conditions. A controller is configured to selectively control the pneumatic system in at least one of a standard mode and a prone mode based on a patient support position. A control panel is communicatively coupled to the controller. The controller is configured to generate at least one prone aid notification to be displayed on a graphical user interface of the control panel. The prone aid notification provides at least one of a reminder, instruction, alert, or information for assisting a caregiver in positioning a patient for the prone mode.

20 Claims, 29 Drawing Sheets

(56) References Cited

U.S. PATENT DOCUMENTS

| | | | | |
|---|---|---|---|---|
| 7,146,664 | B1 | 12/2006 | Grosvenor | |
| 8,261,387 | B2 * | 9/2012 | Lipman | A47C 27/18 5/709 |
| 8,615,831 | B2 | 12/2013 | Lipman et al. | |
| 9,192,533 | B2 | 11/2015 | Fairburn et al. | |
| 9,468,307 | B2 | 10/2016 | Lafleche et al. | |
| 10,413,464 | B2 | 9/2019 | Lachenbruch et al. | |
| 11,202,515 | B2 | 12/2021 | DeFranks et al. | |
| 2002/0138905 | A1 * | 10/2002 | Bartlett | A61G 7/0507 5/607 |
| 2004/0237203 | A1 | 12/2004 | Romano et al. | |
| 2007/0186349 | A1 | 8/2007 | Lipman et al. | |
| 2008/0028533 | A1 * | 2/2008 | Stacy | A61G 7/015 5/713 |
| 2008/0028534 | A1 | 2/2008 | Wilkinson | |
| 2011/0197366 | A1 | 8/2011 | Lachenbruch | |
| 2016/0008195 | A1 * | 1/2016 | Lokken | A61G 5/1091 5/610 |
| 2016/0250088 | A1 | 9/2016 | Williamson et al. | |
| 2020/0268163 | A1 * | 8/2020 | Duvert | A47C 27/083 |
| 2020/0330302 | A1 * | 10/2020 | Knecht | A61G 7/018 |
| 2021/0015692 | A1 * | 1/2021 | Yvernault | A61G 7/015 |
| 2021/0227991 | A1 * | 7/2021 | Frank | A47C 27/10 |
| 2021/0259899 | A1 | 8/2021 | Maho et al. | |
| 2021/0298643 | A1 | 9/2021 | Baker et al. | |
| 2022/0110808 | A1 | 4/2022 | Squitieri | |

FOREIGN PATENT DOCUMENTS

| | | | | |
|---|---|---|---|---|
| CN | 210205183 | U | 3/2020 | |
| CN | 113081575 | A | 7/2021 | |
| CN | 214285556 | U | 9/2021 | |
| CN | 214858525 | U | 11/2021 | |
| CN | 215132015 | U | 12/2021 | |
| CN | 114587905 | A | 6/2022 | |
| JP | 2015526261 | A * | 9/2015 | A61G 7/05776 |
| WO | 0170167 | A2 | 9/2001 | |
| WO | 02069880 | A1 | 9/2002 | |
| WO | 2005122992 | A2 | 12/2005 | |
| WO | 2020174418 | A1 | 9/2020 | |
| WO | 2021199017 | A1 | 7/2021 | |
| WO | 2021163147 | A1 | 8/2021 | |

OTHER PUBLICATIONS

Linet, Pressure Injury Prevention, MultiCareX, 2021 Linet Group, Apr. 12, 2022.

Hillrom / Progressa Smart+ Bed Proning Accessory/ Product Video, https://www.youtube.com/watch?v=YXHfyA5wfXw.

* cited by examiner

SURFACE ADAPTATION FOR PATIENT PRONING

CROSS-REFERENCE TO RELATED APPLICATION

This application claims priority to and the benefit under 35 U.S.C. § 119(e) of U.S. Provisional Application No. 63/331,982, filed on Apr. 18, 2022, entitled "SURFACE ADAPTATION FOR PATIENT PRONING," the disclosure of which is hereby incorporated herein by reference in its entirety.

FIELD OF THE DISCLOSURE

The present disclosure generally relates to a surface adaptation, and more particularly to a surface adaptation for patient proning.

SUMMARY OF THE DISCLOSURE

According to one aspect of the present disclosure, a patient proning system includes a surface assembly configured to be positioned on a frame of a support apparatus. The surface assembly includes a pneumatic system that includes bladders arranged in multiple zones and a pump in fluid communication with the bladders. The pump is configured to adjust the bladders between a deployed condition and a non-deployed condition. A controller is communicatively coupled to the pneumatic system. The controller is configured to selectively control the pneumatic system in a standard mode and a prone mode based on a patient support position. A control panel is communicatively coupled to the controller. The controller is configured to generate at least one prone aid notification to be displayed on a graphical user interface of the control panel. The prone aid notification provides at least one of a reminder, instruction, alert, or information for assisting a caregiver in positioning a patient for the prone mode.

According to another aspect of the present disclosure, a support apparatus includes a surface assembly configured to be disposed on a frame. The surface assembly includes a pneumatic system including bladders, a compressor in fluid communication with the bladders, and valves in fluid communication with the bladders. The bladders are adjustable between a deployed condition and a non-deployed condition and a controller is in communication with the pneumatic system. The controller is configured to control the pneumatic system in a standard mode and a prone mode based on a patient support position, determine a morphology of a person disposed on the surface assembly when in the prone mode, and adjust the bladders in the surface assembly to define surface contours based on the morphology of the person.

According to one aspect of the present disclosure, a patient proning system includes a support apparatus including a frame and a surface assembly configured to be positioned on the frame of the support apparatus. The surface assembly includes a pneumatic system. The pneumatic system includes alternating bladders arranged in multiple zones including a first zone configured to support a head of a patient and a second zone, an isolation bladder disposed in the first zone, and a pump in fluid communication with the alternating bladders and the head isolation bladder. The pump is configured to selectively adjust the alternating bladders in the first and second zones between a deployed condition and a non-deployed condition. The controller is configured to selectively control the pneumatic system in a standard mode and a prone mode based on a patient support position. In the prone mode, the controller is configured to retain at least one alternating bladder adjacent to the isolation bladder in the first zone in the non-deployed condition while adjusting at least one alternating bladder in the first zone and at least one alternating bladder in the second zone between the deployed condition and the non-deployed condition.

These and other features, advantages, and objects of the present disclosure will be further understood and appreciated by those skilled in the art by reference to the following specification, claims, and appended drawings.

DETAILED DESCRIPTION

Figure 1:
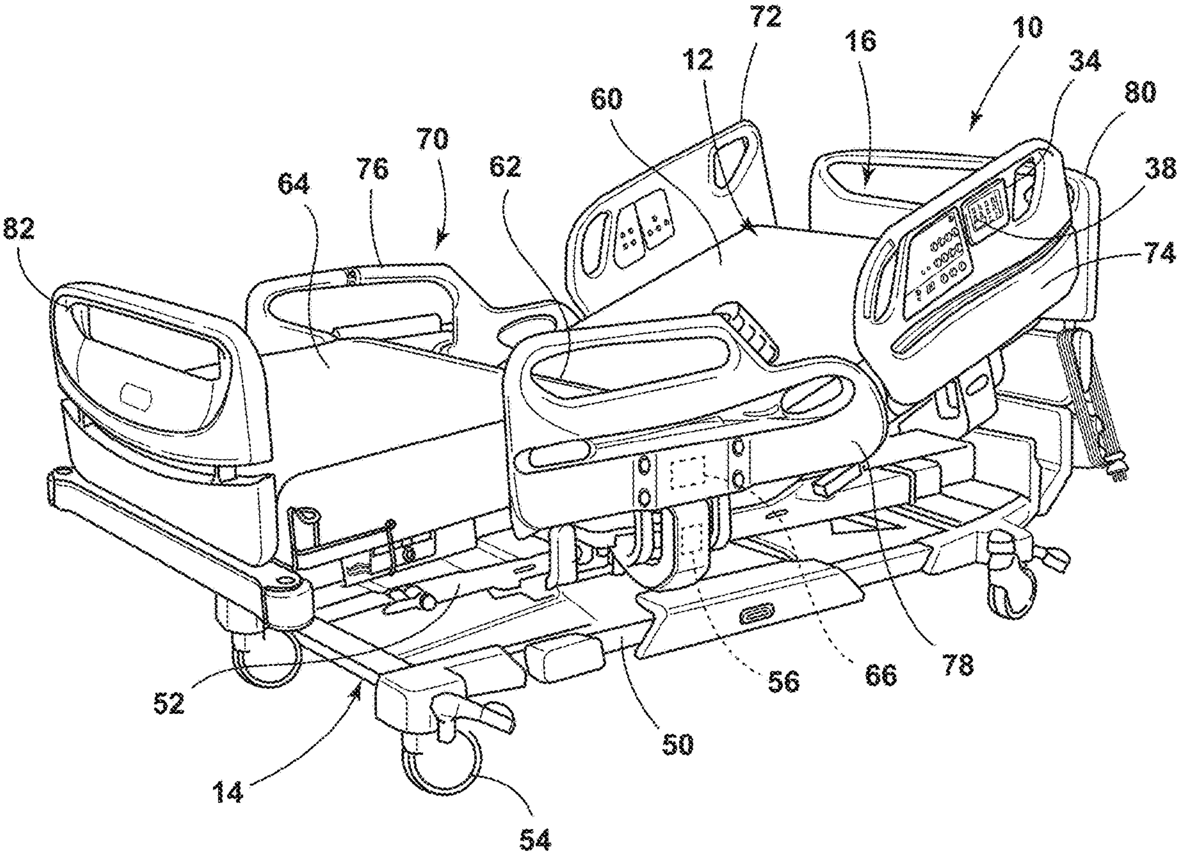
FIG. 1 is a side perspective view of a support apparatus with a surface assembly, according to the present disclosure.

The present illustrated embodiments reside primarily in combinations of method steps and apparatus components related to a surface adaptation for patient proning. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof, shall relate to the disclosure as oriented in FIG. 1. Unless stated otherwise, the term "front" shall refer to a surface closest to an intended viewer, and the term "rear" shall refer to a surface furthest from the intended viewer. However, it is to be understood that the disclosure may assume various alternative orientations, except where expressly specified to the contrary. It is also to be understood that the specific structures and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

With reference to FIGS. 1-31, reference numeral 10 generally designates a patient proning system that includes a surface assembly 12 configured to be positioned on a frame 14 of a support apparatus 16. The surface assembly 12 includes a pneumatic system 18 with bladders 20 arranged in multiple zones 22, including any combination of one or more of a head zone 24, a seat zone 26, and a foot zone 28. The pneumatic system 18 includes a compressor 30 in fluid communication with the bladders 20. The compressor 30 is configured to selectively adjust each bladder 20 between a deployed condition and a non-deployed condition. A controller 32 is communicatively coupled to the pneumatic system 18. The controller 32 is configured to selectively control the pneumatic system 18 in a standard mode and a prone mode based on a patient support position. A control panel 34 is communicatively coupled to the controller 32. The controller 32 is configured to generate at least one prone aid notification 36 to be displayed on a graphical user interface (GUI) 38 of the control panel 34.

With reference to FIG. 1, the support apparatus 16 is configured as a bed typically used within medical or healthcare facilities. Although illustrated as the bed, the support apparatus 16 may be configured as a bed, surgical table, stretcher, chair, or other structure for supporting a patient or person thereon. When configured as the bed, the support apparatus 16 includes a frame 14 having a base frame 50 and an upper frame 52. The base frame 50 has casters or wheels 54 configured for engaging an underlying floor surface. The upper frame 52 is operably coupled to the base frame 50. The upper frame 52 is adjustable relative to the base frame 50 (e.g., raise, lower, tilt, etc.) via a lift system 56. The lift system 56 includes an actuator, which is activated to adjust the upper frame 52 between various heights relative to the base frame 50 and the underlying floor surface, as well as between various angles relative to the base frame 50. Any practicable configuration of the lift system 56 may be included in the support apparatus 16 without departing the teachings herein.

The upper frame 52 generally includes multiple segments 60, 62, 64, which collectively form a deck. The deck includes a head segment 60, a base segment 62, and a foot segment 64 that are independently adjustable relative to one another via at least one actuation assembly 66. When activated, the actuation assembly 66 is configured to adjust the segments 60, 62, 64 between various positions. For example, the head segment 60 may be adjusted to elevate a head area of the patient, which is often beneficial for patients with certain pulmonary conditions. Additionally, the foot segment 64 may be lowered to bring the support apparatus 16 into a chair position, allowing the patient to be in a supported sitting position. Further, the base segment 62 and the foot segment 64 may both be adjusted to raise knees of the patient to prevent or minimize movement of the patient along the longitudinal extent of the support apparatus 16. The adjustable segments 60, 62, 64 are independently operable relative to one another. Any practical configuration of the actuation assembly 66 may be included in the support apparatus 16 without departing the teachings herein.

Referring still to FIG. 1, the support apparatus 16 includes multiple siderails 70, which are configured to be raised and lowered to selectively prevent and allow ingress and egress from the support apparatus 16. In the illustrated example of FIG. 1, the support apparatus 16 includes two head siderails 72, 74 and two base siderails 76, 78, which are collectively referred to herein as the siderails 70. Each of the siderails 70 may be automatically adjusted via an actuator or alternatively may be adjusted manually. The support apparatus 16 also includes the control panel 34, which is coupled to one of the siderails 70. The control panel 34 includes the GUI 38 for displaying and receiving information related to the patient and the support apparatus 16.

The support apparatus 16 also includes a headboard 80 coupled to the frame 14 proximate to the head segment 60 and a footboard 82 coupled to the frame 14 proximate to the foot segment 64. The headboard 80 and the footboard 82 may be selectively coupled and removed to the frame 14. When removed, there may be additional space for devices, accessories, or the caregiver.

The support apparatus 16 includes the surface assembly 12 disposed on the deck. The surface assembly 12 provides comfort and treatment to the patient on the support apparatus 16. The controller 32 (FIG. 11) of the support apparatus 16 is communicatively coupled with various electronic components within the surface assembly 12. The support apparatus 16, including the surface assembly 12, is configured to function in the standard mode or the prone mode, as well as switch between the two modes. The prone mode provides different or adjusted functionality and comfort for the patient based on the patient support position compared to the standard mode.

Figure 2:
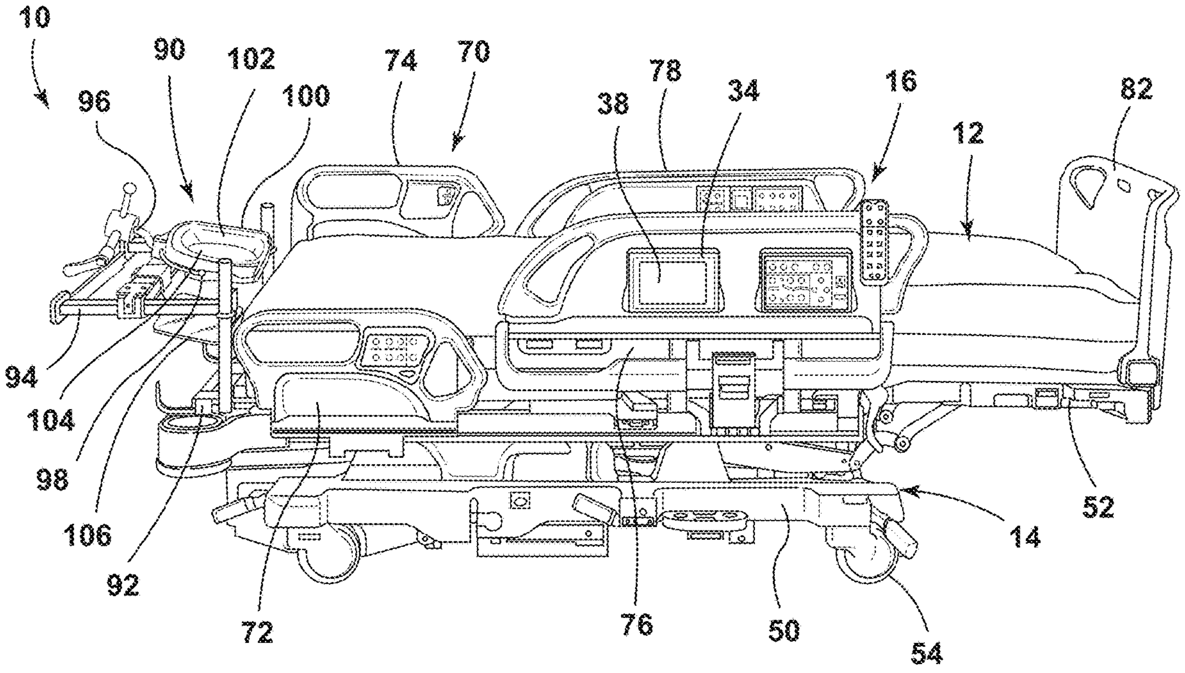
FIG. 2 is a side perspective view of a support apparatus with a proning accessory, according to the present disclosure.

Referring to FIG. 2, the support apparatus 16 is illustrated with the deck in a flat condition. In the flat condition, the deck is generally parallel with the underlying floor, and each of the segments 60, 62, 64 generally has no angle of elevation (e.g., about 0° of elevation). Further, the headboard 80 (FIG. 1) is removed from the support apparatus 16, and a prone accessory 90 is coupled to a head end 92 of the frame 14. The flat condition of the support apparatus 16 and the prone accessory 90 are configured to support the patient in a prone position (e.g., one of the patient support positions).

The support apparatus 16 is configured to support the patient in a variety of support positions depending on treatments, therapies, health conditions, comfort, etc. For example, the support apparatus 16 may support the patient in a supine position, where the patient lies flat on his or her back. The support apparatus 16 is also configured to support the patient in a Fowler's position and a semi-Fowler's position. When the head segment 60 is elevated to a select degree of elevation (e.g., about 30°), the support apparatus 16 supports the patient in the semi-Fowler's position. This position may be advantageous for patients who have cardiac or respiratory conditions. When the head segment 60 is rotated to an angle of about 45° of elevation, the support apparatus 16 supports the patient in Fowler's position.

The support apparatus 16 also supports the patient in the prone position. When the patient is in the prone position, the support apparatus 16 is in the flat condition and the patient is lying on his or her stomach. The prone position is often used for patients who have acute respiratory distress syndrome (ARDS) and other pulmonary complications or conditions to provide better ventilation. The prone position is advantageous for treating patients but is often considered to be less comfortable than other support positions, such as the supine position or the Fowler's position.

When the patient is in the prone position, the head of the patient may be supported on the surface assembly 12 or by the prone accessory 90. Generally, when the head is supported by the surface assembly 12, the patient alternates between laying on the left side of his or her face and the right side of his or her face. When the head is supported on the prone accessory 90, the head may be straight, with the face of the patient directed to the underlying floor surface.

The prone accessory 90 includes an adaptor 94 configured to couple the prone accessory 90 to the frame 14, as well as a support positioning assembly 96 and a head support 98. The head support 98 provides a space for the head of the patient to rest. The head support 98 generally includes a cushion 100 to increase comfort for the patient. Each of the head support 98 and the cushion 100 includes an opening 102, 104 that align with one another and which are configured to align with the face of the patient. In this way, the patient is supported face down with the openings 102, 104 for the patient to breathe and/or for any tubing, such as ventilation tubing.

The head support 98 is coupled to the support positioning assembly 96, which is configured to laterally and vertically adjust the head support 98 to align the head support 98 for the patient. Generally, the head support 98 is aligned with the surface assembly 12, positioning the patient with a neutral spine. The prone accessory 90 may include or be used with a mirror 106 disposed below the head support 98. The mirror 106 may be advantageous for the caregiver to conveniently view the face of the patient, as well as for conscious proning patients to see the caregiver.

Referring still to FIG. 2, the patient may be in the prone position while sedated or while awake, which may also be referred to as conscious proning. When the patient is awake during conscious proning, the comfort of the patient is of increased importance compared to the sedated proning as the patient often lies in the prone position for multiple hours. The prone position is utilized to treat pulmonary concerns, as well as for reducing or preventing the development of pressure injuries.

Pressure injuries may include localized damage to the skin and underlying soft tissue. Generally, pressure injuries developed over a bony prominence and may be related to or result from intense pressure, prolonged pressure, pressure in combination with shear, or combinations thereof. Example locations or areas prone to developing pressure injuries include the sacral region, ischial tuberosity, heels, etc. The risk of the patient developing pressure injury is cumulative during the time the patient is at the medical facility.

A variety of factors contribute to the tolerance of the soft tissue for pressure and sheer (e.g., mechanical load), including microclimate, nutrition, perfusion, comorbidities, the condition of the soft tissue, etc. For example, moisture often causes the skin to soften, which can increase the likelihood of pressure injury developing. Additionally, temperature can increase metabolic processes, which can speed up breakdown of skin. Also, fluid retention may lead to more pressure, which can lead to an increase in temperature. One or more risk assessment tools such as the Braden scale, the Norton scale, the water low scale, the Scott triggers, or a combination thereof, are generally utilized to determine a risk score for risk assessment for developing pressure injuries. Proning, as well as providing therapies and adaptations to the surface assembly 12 during proning, may each assist in reducing or preventing the development of pressure injuries.

Figure 3:
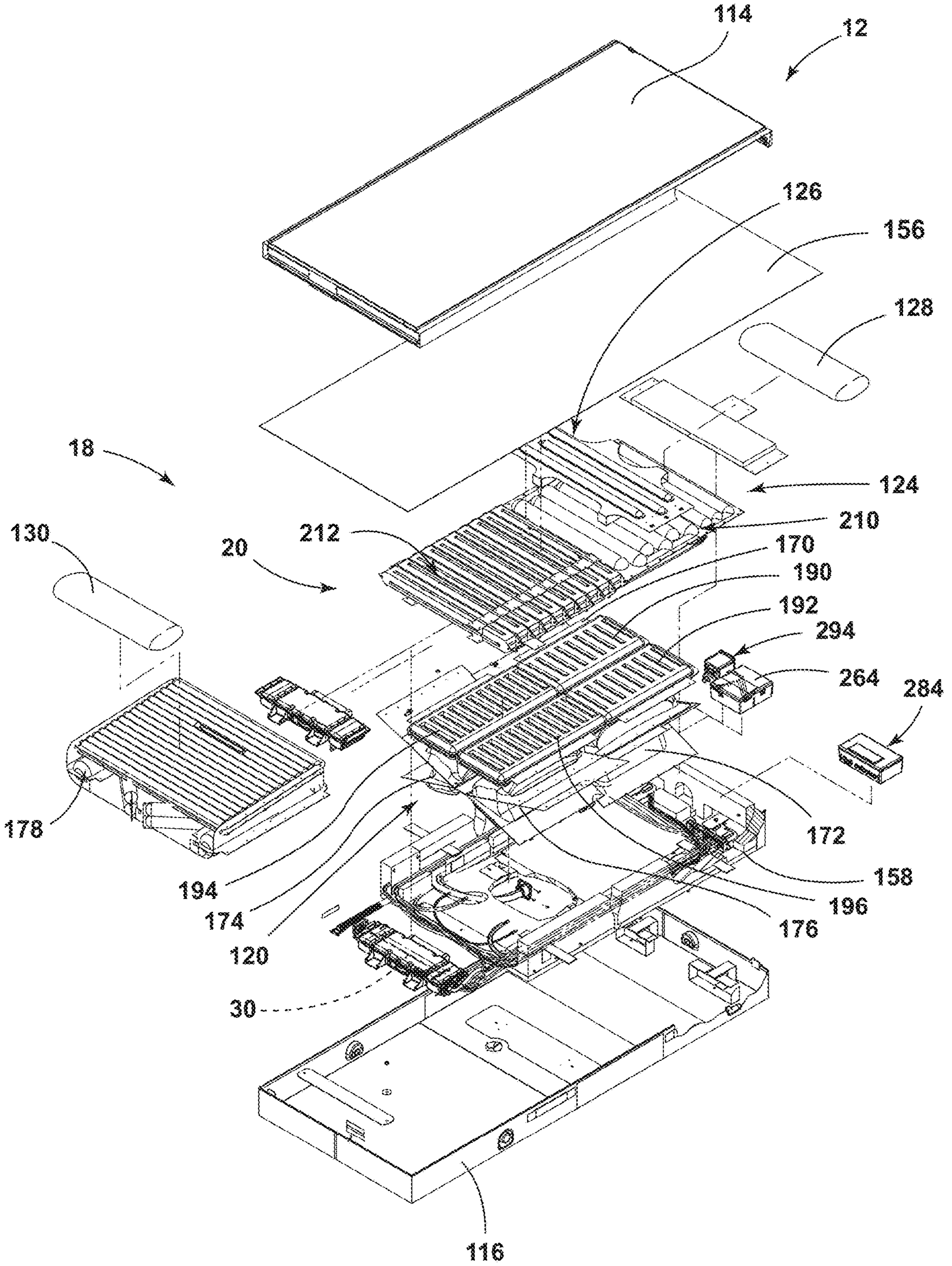
FIG. 3 is an exploded view of a surface assembly including a pneumatic system, according to the present disclosure.
Figure 4:
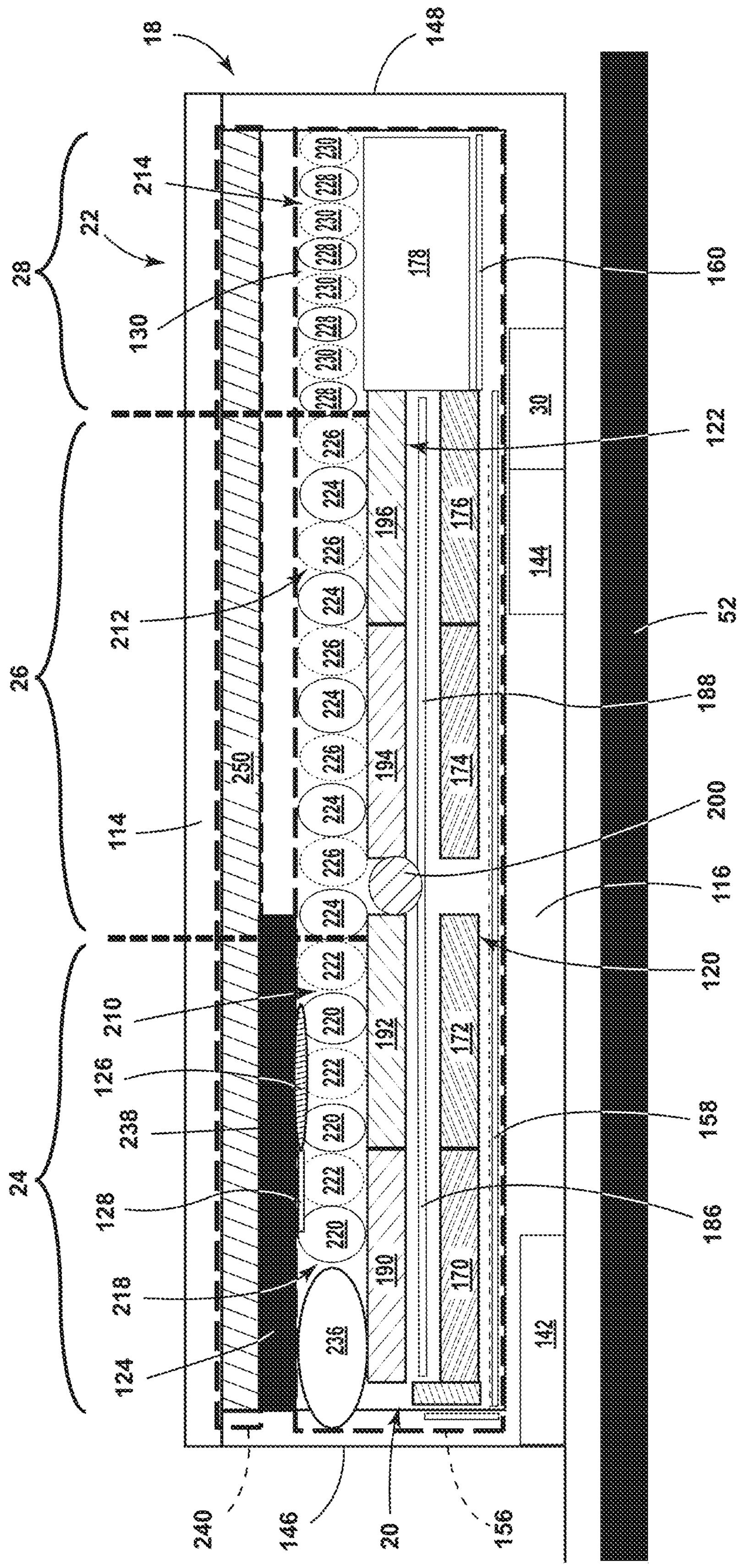
FIG. 4 is a schematic cross-sectional view of a surface assembly on a frame of a support apparatus that includes a pneumatic system, according to the present disclosure.

Referring still to FIG. 2, as well as FIGS. 3 and 4, the support apparatus 16 includes the surface assembly 12 disposed on the upper frame 52. The surface assembly 12 may also be referred to as a mattress or a support surface without departing from the teachings herein. The surface assembly 12 includes the pneumatic system 18, which may be utilized to provide different therapies, such as pulmonary therapies, and adjustments for patient comfort. The pneumatic system 18 includes the bladders 20 that are adjusted to provide different pressure to the patient being supported on the surface assembly 12. The amount of pressure is generally related to the amount of fluid within the bladders 20 in the different zones 22 of the surface assembly 12.

In various examples, the surface assembly 12 includes an upper cover 114 and a base cover 116 that at least partially enclose the pneumatic system 18, including the various bladders 20. Depending on the configuration of the surface assembly 12, the bladders 20 may include at least one of turn bladders 120, working bladders 122, support bladders 124, and percussion and vibration therapy (PVT) bladders 126. The pneumatic system 18 also includes bladders 20 for supporting the patient in the prone position, such as a repositioning bladder 128 and a foot elevation bladder 130. The turn bladders 120, the working bladders 122, the support bladders 124, the repositioning bladder 128, and/or the foot elevation bladders 130 may be in fluid communication with the compressor 30. The PVT bladders 126 are generally in fluid communication with a PVT blower 140. The compressor 30 and the PVT blower 140 are configured to direct fluid into the various bladders 20. One or more of the bladders 20 may be fluidly coupled with either or both of the compressor 30 and the PVT blower 140 without departing from the teachings herein.

Referring still to FIGS. 2-4, the base cover 116 of the surface assembly 12 is disposed on the upper frame 52 and defines air vents 142 and air inlets 144. For example, multiple air vents 142 may be defined proximate a head end 146 of the surface assembly 12, while multiple air inlets 144 are defined proximate a foot end 148 of the surface assembly 12. The compressor 30 is disposed proximate to the air inlets 144 to draw fluid (i.e., air) into the surface assembly 12 from an area surrounding the surface assembly 12.

A first barrier 156 is disposed on the base cover 116 and generally encloses the pneumatic system 18. The first barrier 156 may be a fire barrier or other barrier for enclosing the pneumatic system 18 within the surface assembly 12. Various supporting components, such as a shell or foam bucket 158 and a support substrate 160, are disposed within the first barrier 156 to assist in supporting the pneumatic system 18. The foam bucket 158 generally extends from the head end 146 of the surface assembly 12 toward the foot end 148 and the support substrate 160 is disposed proximate to the foot end 148.

Referring still to FIGS. 3 and 4, the surface assembly 12 generally defines three zones 22, including the head zone 24, the base or seat zone 26, and the foot zone 28. Each of these zones 22 may include different features or provide different functions with the features in the respective zones 22. These separate functions or features may operate independently of one another or in combination with one another. Further, the functions or features may also be different and operate concurrently. For example, the turn bladders 120 are disposed on the foam bucket 158. In the example illustrated in FIGS. 3 and 4, the turn bladders 120 include four turn bladders 170, 172, 174, 176, with the first and second turn bladders 170, 172 disposed within the head zone 24 and the third and fourth turn bladders 174, 176 disposed within the seat zone 26. The turn bladders 120 are arranged on a left side and a right side of the surface assembly 12. The turn bladders 120 of the illustrated configuration do not extend into the foot zone 28. A foot filler 178 is disposed in the foot zone 28 adjacent to the third and fourth turn bladders 174, 176. The foot filler 178 may be constructed of foam, or similar materials, or be one of the bladders 20. The foot filler 178 provides support for the foot area of the patient.

The turn bladders 120 operate to adjust the patient between a center position, in which the patient is lying on his or her back in the supine position or stomach in the prone position, and side positions, in which the patient is lying on or tilted to his or her right or left side. This side-to-side movement may be part of a continuous lateral rotation therapy. The turn bladders 120 may be selectively deployed to the expanded state or inflated in a certain pattern to provide a gentle, side-to-side movement of the patient to aid in the prevention and treatment of pulmonary and other health complications related to immobility, as well as treat or prevent pressure ulcers. For example, to rotate the patient to the right, the second and fourth turn bladders 172, 176 are inflated. The first and third turn bladders 170, 174 may remain in a current state (e.g., a neutral state or non-deployed condition) or may be adjusted to a compressed state (e.g., the deployed condition).

The controller 32 (FIG. 11) may control the pneumatic system 18 to vary a number of turns, a pause time in each position, a duration of the continuous lateral rotation therapy, etc. to provide customized treatment for the patient. The amount of pressure provided by each turn bladder 120 may be based on a detected or input weight of the patient. Additionally or alternatively, the therapy may be initiated and adjusted by the caregiver.

The turn bladders 120 may also be used for providing a turn assist for the caregiver, which assists the caregiver in turning the patient on the support apparatus 16 for linen changes, dressing changes, bed pan placement, back care, and other procedures or treatments. The turn assist protocol may also be utilized for adjusting the patient to the prone position to provide the gentle side-to-side movement while the patient is in the prone position.

Referring still to FIGS. 3 and 4, the working bladders 122 are disposed above the turn bladders 120, with additional support substrates 186, 188 extending therebetween to separate the turn bladders 120 from the working bladders 122. In the illustrated configuration, the working bladders 122 include four working bladders 190, 192, 194, 196, with two working bladders 190, 192 disposed primarily within the head zone 24 and two working bladders 194, 196 disposed primarily within the seat zone 26.

The working bladders 122 provide support, which may be dynamically adjustable, such as via a continuous low pressure (CLP) therapy. In such examples, the fluid in the working bladders 122 may be adjusted and redistributed in response to changes of the position of the patient on the surface assembly 12. For example, if a patient adjusts from a lying position to a sitting position, the weight of the patient increases in a seat area. The increase in weight may cause an increase in pressure applied by the working bladders 194, 196 if the fluid in the working bladders 194, 196 is not adjusted. Accordingly, the working bladders 194, 196 are adjusted to reduce the amount of fluid within the working bladders 194, 196 to, consequently, reduce the pressure applied to the patient.

The working bladders 122 generally extend across the head zone 24 and the seat zone 26. In order to fill the space in the foot zone 28, the foot filler 178 has a height that generally allows the foot filler 178 to extend a similar height as the combination of the turn bladders 120, the additional support substrates 186, 188, and the working bladders 122.

In various examples, a fill or advanced articulation bladder 200 is disposed between the working bladders 192, 194 in the head zone 24 and the working bladders 194, 196 in the seat zone 26. The advanced articulation bladder 200 may be utilized to fill a gap formed between the working bladders 122 based on the adjustment of the upper frame 52. As different segments 60, 62, 64 of the upper frame 52 move, the advanced articulation bladder 200 inflates or deflates to fill any gap or space.

Referring still to FIGS. 3 and 4, the support bladders 124 are arranged on the working bladders 122 and extend laterally across the surface assembly 12. The support bladders 124 are generally arranged in each of the three zones 22 and are therefore arranged as head bladders 210, seat bladders 212, and foot bladders 214. The support bladders 124 may be utilized to provide additional comfort and support for the patient on the support apparatus 16. In certain aspects, the support bladders 124 in each zone 22 may be adjusted together (e.g., the head bladders 210 adjusted as a single unit, etc.).

Additionally or alternatively, the support bladders 124 may be configured as alternating support bladders 218. When configured as the alternating support bladders 218, each grouping of bladders 124 is separated into two sets of bladders 124. For example, the head bladders 210 include first head bladders 220 and second head bladders 222 arranged in an alternating pattern (e.g., first, second, first, etc.). The seat bladders 212 include first seat bladders 224 and second seat bladders 226 arranged in the alternating pattern, and the foot bladders 214 include first foot bladders 228 and second foot bladders 230 arranged in the alternating pattern.

The alternating support bladders 218 in each zone 22 are separately and independently adjustable between the deployed condition (i.e., the expanded state or the compressed state) and the non-deployed condition (i.e., the neutral state). In certain aspects, the expanded state is an inflated condition and the neutral state is a deflated condition. The alternating support bladders 218 may be adjusted in a cyclic pattern to provide an alternating low pressure (ALP) therapy to the patient.

During ALP therapy, the bladders 218 are adjusted in an alternating and repeating pattern to apply and remove pressure to areas of the patient. Accordingly, the alternating support bladders 218 in each zone 22 are separately inflated, maintained, deflated, or compressed in a pattern to relieve pressure points by cyclically dropping and/or elevating a pressure within the alternating support bladders 218. Accordingly, at least two bladders 20 within the same zone 22 are at two different pressures.

Using the seat bladders 212 as an example, the first seat bladder 224 is configured to be adjusted to the expanded state, while the second seat bladder 226 is maintained in the neutral state or adjusted to the compressed state. After a predefined period of time, the first seat bladder 224 is adjusted to the neutral state or the compressed state, while the second seat bladder 226 is adjusted to the expanded state. This pattern then repeats to provide the ALP therapy. It is also contemplated that the alternating support bladders 218 may adjust between the compressed state and the neutral state without utilizing the expanded state. The alternating support bladders 218 in the head zone 24 and the foot zone 28 may operate in a substantially similar manner. The controller 32 may include ALP therapy protocols that include at least frequency, duration, pattern, and intensity of the ALP therapy. The ALP therapy may be initiated and adjusted (e.g., frequency, duration, intensity, etc.) by the caregiver.

As illustrated in FIG. 4, the head bladders 210 may not extend across the entirety of the head zone 24. An end head bladder 210 may be spaced from the head end 146 of the surface assembly 12 to provide space for a head isolation bladder 236. The head isolation bladder 236 is configured to align with and support the head of the patient resting on the surface assembly 12. The absence of the alternating support bladders 218 in this area may be advantageous for preventing the ALP therapy from being applied directly to the head of the patient. The head isolation bladder 236 may generally be maintained in a constant condition to provide consistent support for the head. Additionally or alternatively, the head isolation bladder 236 may adjust based on the movement and weight of the patient, similar to CLP therapy described herein.

Referring still to FIGS. 3 and 4, in various examples, the surface assembly 12 also provides percussion and vibration therapy. The percussion and vibration therapy is provided by the PVT bladders 126 disposed on the head bladders 210 in the head zone 24 of the surface assembly 12. The PVT bladders 126 provide percussion and/or vibration therapies when pressure in the PVT bladders 126 drops and elevates at a rate sufficient to impart a vibration to the patient. For example, percussion or vibration therapy may be applied to a chest region of the patient to aid in breaking down undesired materials within the lungs of the patient.

The pneumatic system 18 may also include additional bladders 20 for use in the prone mode. For example, the pneumatic system 18 may include the repositioning bladder 128, generally arranged in the head zone 24. The repositioning bladder 128 is arranged to align with a clavicle area of the patient. The adjustment of the repositioning bladder 128 to the expanded state is configured to lift the chest area of the patient, which provides additional space for repositioning the head or arms of the patient between a first side and a second side in the prone position as described herein.

Additionally or alternatively, the pneumatic system 18 may include the foot elevation bladder 130 arranged in the foot zone 28 of the surface assembly 12. The foot elevation bladder 130 is configured to be adjusted to the expanded state to raise the feet of the patient, providing additional comfort to the patient when in the prone position.

The first barrier 156 is configured to extend over the bladders 20 of the pneumatic system 18. The first barrier 156 also isolates the pneumatic system 18 from other components of the surface assembly 12. An X-ray layer 238 is generally disposed on the first barrier 156, extending across the head zone 24 of the surface assembly 12.

Referring still to FIG. 4, a second barrier 240 is disposed on the X-ray layer 238 and encloses a microclimate management (MCM) system 250. The second barrier 240 may be an additional fire barrier surrounding the MCM system 250. The MCM system 250 generally includes an MCM blower 252, a top coverlet, and a spacer material within the top coverlet. The blower 252 operates to direct or blow air through the spacer material. The MCM system 250 is generally disposed on top of the surface assembly 12 or within the surface assembly 12 above the bladders 20 (e.g., as an MCM layer). The patient may rest on the MCM system 250. While the patient is positioned on the MCM system 250, air is directed through the top coverlet. This configuration wicks away moisture from the skin of the patient by blowing air underneath the patient, which is advantageous for preventing skin conditions that may be caused by lying on the surface assembly 12 for an extended period of time. The upper cover 114 fully encloses the interior of the surface assembly 12, containing the various therapy and support components.

Figure 5:
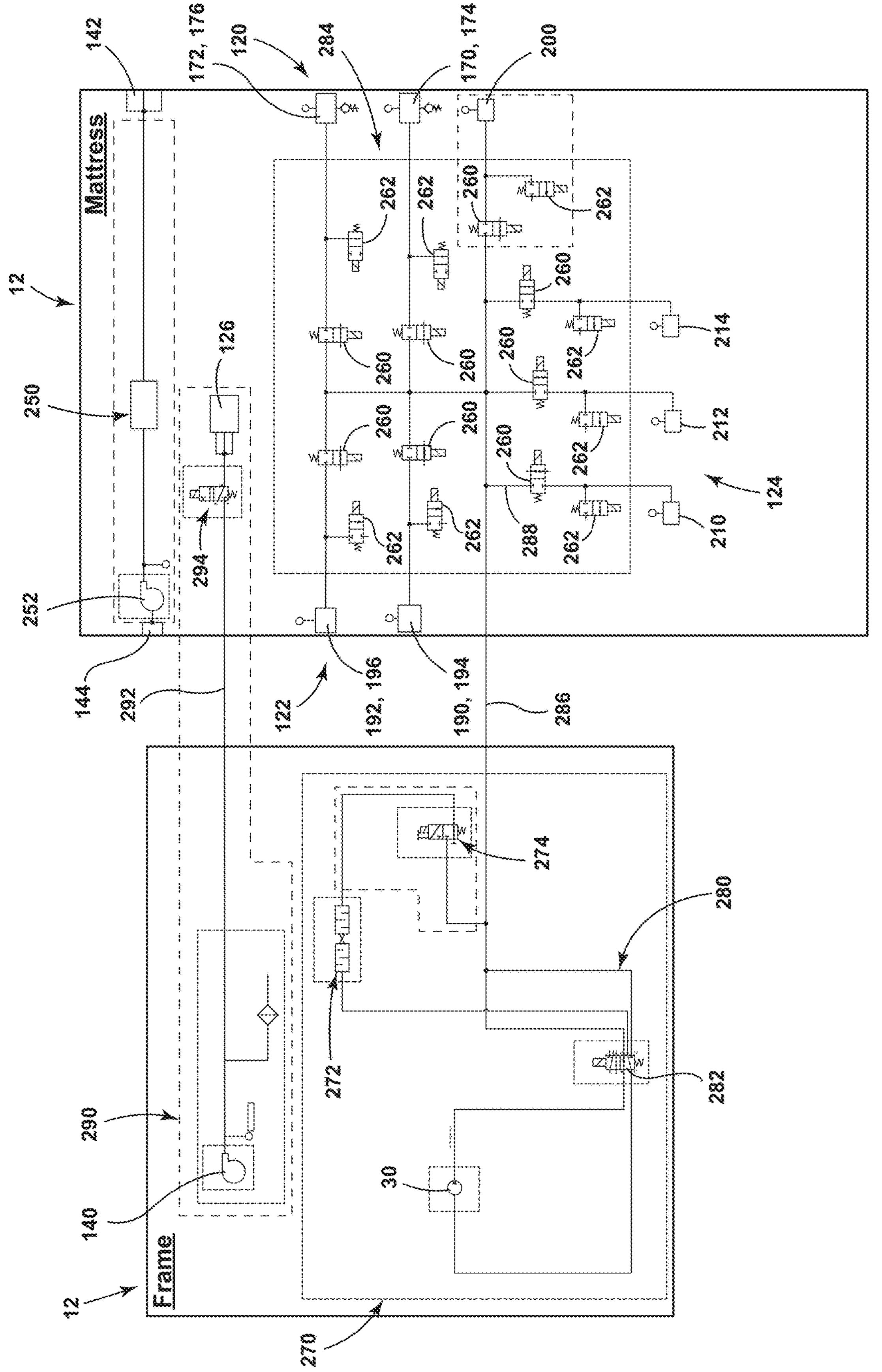
FIG. 5 is a schematic diagram of a pneumatic system, according to the present disclosure.
Figure 6:
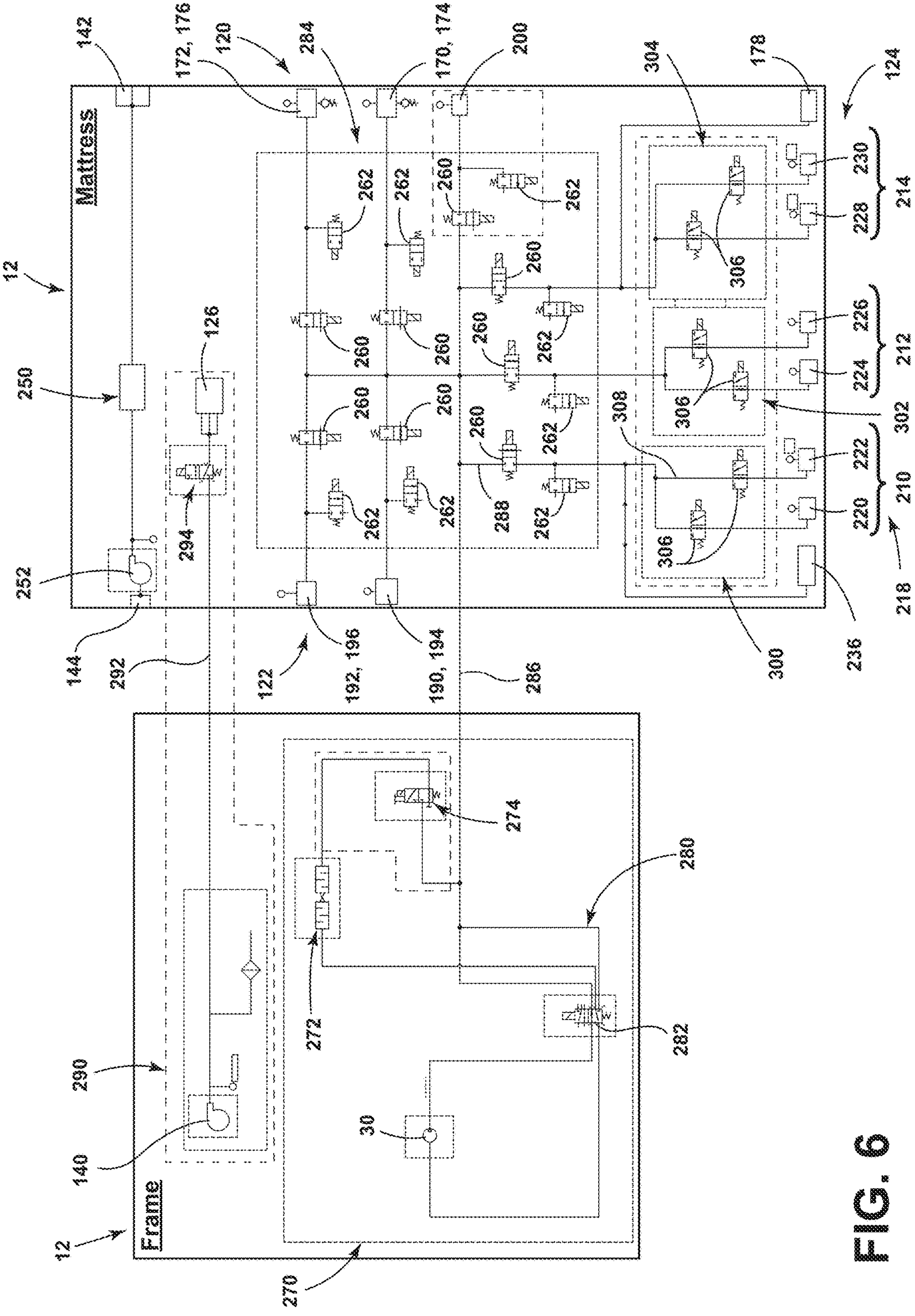
FIG. 6 is a schematic diagram of a pneumatic system with alternating low pressure functionality, according to the present disclosure.

Referring still to FIGS. 3 and 4, as well as FIGS. 5 and 6, the pneumatic system 18 includes multiple devices 30, 140, 252 for directing fluid to adjust the various bladders 20, through valves 260 for controlling the fluid being directed to the bladders 20, and exhaust valves 262 controlling the fluid being expelled or exhausted from the bladders 20. A control box 264, for example, an air circuit breaker (ACB) control box 264, which houses various electrical components for the pneumatic system 18, is disposed in the head zone 24 of the surface assembly 12 adjacent to the first and second turn bladders 170, 172. The control box 264 may communicate with the controller 32 for controlling various aspects of the pneumatic system 18.

Referring to FIGS. 5 and 6, pneumatic diagrams of the surface assembly 12 are illustrated. In the example illustrated in FIG. 5, the surface assembly 12 includes the advanced articulation bladder 200, the working bladders 122, the support bladders 124, the turn bladders 120, and the PVT bladders 126. In comparison, in FIG. 6, the surface assembly 12 includes the advanced articulation bladder 200, the working bladders 122, the turn bladders 120, the PVT bladders 126, and the alternating support bladders 218. Additionally, each of the surface assemblies 12 in FIGS. 5 and 6 includes the MCM system 250.

With reference still to FIG. 5, various components of the pneumatic system 18 may be coupled to the frame 14 of the support apparatus 16. For example, a compressor assembly 270 is coupled to the support apparatus 16. The compressor assembly 270 includes the compressor 30, a muffler assembly 272, and an opti-rest valve assembly 274. While generally referred to herein as the compressor 30, a pump or blower may also be utilized without departing from the teachings herein. The pneumatic system 18 includes tubing 280 to fluidly couple the components of the compressor assembly 270 with one another, as well as other components of the pneumatic system 18.

The compressor 30 is disposed proximate to a switching valve 282, which is configured to adjust to direct fluid flowing from the compressor 30 to a manifold assembly 284, the opti-rest valve assembly 274, and/or the bladders 20, as well as from the manifold assembly 284, the opti-rest valve assembly 274, and/or the bladders 20 to the compressor 30. The opti-rest valve assembly 274 may be utilized as a pulmonary treatment option when the support apparatus 16 is functioning in an opti-rest mode. The opti-rest mode offers increased comfort for the patient while maintaining pressure relief. Specifically, the opti-rest function inflates the head, seat, and foot bladders 210, 212, 214 producing a massaging wave-like action. The opti-rest function may generally be utilized when the patient is in the supine position.

Referring still to FIG. 5, the tubing 280 fluidly coupling the components of the pneumatic system 18 includes a central tube line 286 that extends from the compressor assembly 270 and into the surface assembly 12 and multiple tube branches 288 extending from the central tube line 286, where each tube branch 288 extends to a separate bladder 20. One through valve 260 and one exhaust valve 262 are positioned along each tube branch 288 of the tubing 280.

The pneumatic system 18 includes a manifold assembly 284, which includes the through valves 260 and the exhaust valves 262 coupled to the tubing 280 for controlling fluid into and out of the bladders 20. The through valves 260 are generally configured as two-way valves 260, which have an inlet and an outlet for directing fluid in a single direction. In various examples, the through valves 260 are configured as normally-closed two-way valves 260. Additionally, the manifold assembly 284 includes multiple exhaust valves 262, which may also be configured as normally-closed two-way valves 262. The exhaust valves 262 allow the fluid in the pneumatic system 18 to be vented or exhausted out of the pneumatic system 18 and into the atmosphere.

In the example illustrated in FIG. 5, the tube branches 288, each with one through valve 260 and one exhaust valve 262 coupled thereto, extend to the respective bladders 20. Accordingly, one tube branch 288 fluidly couples each of the turn bladders 120, the working bladders 122, the advanced articulation bladder 200, the head bladders 210, the seat bladders 212, and the foot bladders 214 to the compressor assembly 270, respectively. The tube branch 288 coupled to the advanced articulation bladder 200 may be an extension of the central tube line 286. Further, the tube branches 288 may also be separate, such as the tube branches 288 extending to the support bladders 124, or have at least a portion of an overlapping path, such as the tube branches 288 extending to the turn bladders 120 and working bladders 122.

Referring still to FIG. 5, the PVT bladders 126 may be included as part of a PVT assembly 290. The PVT assembly 290 may be coupled to the frame 14, the surface assembly 12, or a combination thereof. In the illustrated configuration, the PVT assembly 290 includes the PVT blower 140 coupled to the frame 14. Tubing 292 extends from the PVT blower 140 to a PVT valve assembly 294 coupled with the surface assembly 12. The PVT valve assembly 294 generally includes a three-way valve, directing fluid from the PVT blower 140 to the PVT bladders 126 and from the PVT bladders 126 to be exhausted into the atmosphere.

Additionally, the MCM system 250 is configured as the MCM layer within the surface assembly 12 in the configuration illustrated in FIG. 5. At least one air inlet 144 is defined in the surface assembly 12 to intake from the atmosphere for the MCM blower 252 positioned within the surface assembly 12. The MCM blower 252 is in fluid communication with the MCM layer, driving fluid through the MCM layer (e.g., the spacer material). The air is drawn into the surface assembly 12 through the air inlet 144 by the MCM blower 252, driven through the surface assembly 12, and exhausted into the atmosphere via at least one of the air vents 142 on the opposing side of the surface assembly 12.

Referring again to FIG. 6, the configuration illustrated in FIG. 6 is substantially similar to the configuration in FIG. 5 with the addition of the ALP therapy function. Instead of the support bladders 124 configured as the head, seat, and foot bladders 210, 212, 214, the surface assembly 12 includes the alternating support bladders 218 with the first and second head bladders 220, 222, the first and second seat bladders 224, 226, and the first and second foot bladders 228, 230. The surface assembly 12 includes the manifold assembly 284 for controlling the fluid for the turn bladders 120, the working bladders 122, and the advanced articulation bladder 200 and multiple ALP manifolds 300, 302, 304 for controlling the fluid for the alternating support bladders 218.

In the configuration illustrated in FIG. 6, the surface assembly 12 includes the head ALP manifold 300 in fluid communication with the first and second head bladders 220, 222, the seat ALP manifold 302 in fluid communication in the first and second seat bladders 224, 226, and the foot ALP manifold 304 in fluid communication with the first and second foot bladders 228, 230. Each ALP manifold 300, 302, 304 includes three-way valves 306, which include an inlet and an outlet for directing fluid in a single direction to the alternating support bladders 218 and an exhaust opening to expel fluid from the alternating support bladders 218, respectively.

In the illustrated example, three tube branches 288 extend from the central tube line 286, and each of these tube branches 288 is fluidly coupled with one through valve 260 and one exhaust valve 262 of the manifold assembly 284. Secondary branches 308 extend from the tube branches 288 to each of the alternating support bladders 218, as well as the head isolation bladder 236. One three-way valve 306 is fluidly coupled to each of the secondary branches 308 that extends to the alternating support bladders 218 (e.g., each alternating bladder 218 is associated with one three-way valve 306) to control the fluid in the alternating support bladders 218.

One of the secondary branches 308 also extends to the head isolation bladder 236. The fluid in the head isolation bladder 236 is controlled by the manifold assembly 284, rather than one of the ALP manifolds 300, 302, 304. Further, the foot filler 178 may be configured as a bladder 20 and included in the pneumatic system 18. In such examples, one of the secondary branches 308 extends to the foot filler 178. The fluid in the foot filler 178 is controlled by the manifold assembly 284, rather than the ALP manifolds 300, 302, 304. Fluid may travel or flow from the central tube line 286, through the tube branches 288, and through the secondary branches 308 to the head isolation bladder 236 and the foot filler 178.

Referring still to FIGS. 5 and 6, it is also contemplated that the repositioning bladder 128 and the foot elevation bladder 130 may be incorporated into the pneumatic system 18. In such examples, additional tube branches 288 may couple the repositioning bladder 128 and the foot elevation bladder 130 to the central tube line 286. Additionally or alternatively, additional secondary branches 308 may extend from the tube branches 288 to fluidly couple the repositioning bladder 128 and the foot elevation bladder 130 with the central tube line 286. The fluid in one or both of the repositioning bladder 128 and the foot elevation bladder 130 may be controlled through the manifold assembly 284 or an additional manifold. Accordingly, one or both of the repositioning bladder 128 and the foot elevation bladder 130 may be fluidly coupled with at least one through valve 260 and one exhaust valve 262, a three-way valve 306, or a combination thereof. Moreover, it is contemplated that the various features illustrated as described on the support apparatus 16 may also be included in the surface assembly 12 without departing from the teachings herein.

Figure 7:
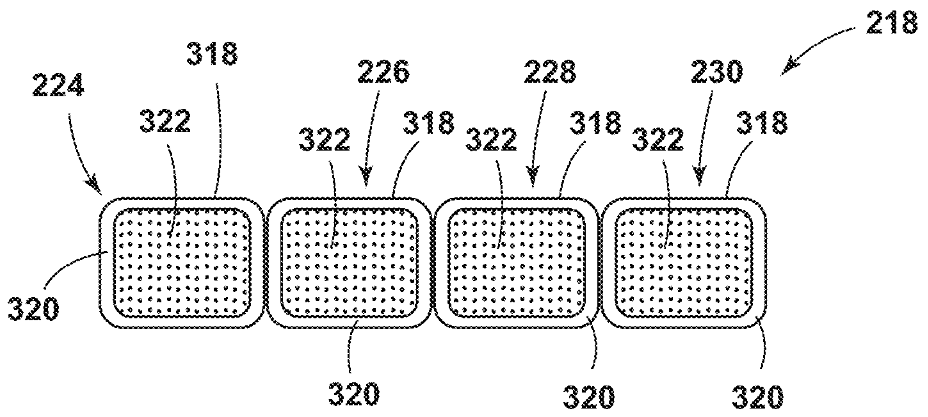
FIG. 7 is a schematic cross-sectional view of alternating bladders in a neutral state, according to the present disclosure.
Figure 8:
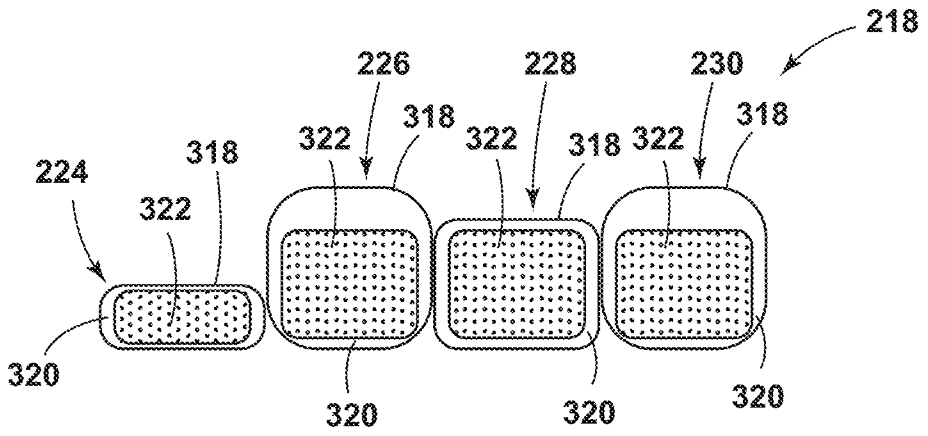
FIG. 8 is a schematic cross-sectional view of alternating bladders in different states, according to the present disclosure.

Referring to FIGS. 7 and 8, the alternating support bladders 218 are configured to adjust between the non-deployed condition (i.e., the neutral state) and at least one deployed condition (i.e., the compressed state and the expanded state) to provide the alternating pressure to the patient. In the configuration of FIG. 7, four head bladders 210 are illustrated, including two first head bladders 220 and two second head bladders 222 arranged in the alternating pattern. The first and second head bladders 220, 222 are in the neutral state where the ALP function is deactivated, and the first and second head bladders 220, 222 provide support for the patient.

The alternating support bladders 218 in the illustrated configuration include an outer membrane 318, which may be generally impermeable to fluid and which defines an interior chamber 320. A core 322 is disposed within the interior chamber 320. The core 322 is formed of a porous material that is elastically deformable, such as, for example, a foam material or other similar material. The cores 322 of each of the alternating support bladders 218 are configured to compress and expand as the respective alternating support bladder 218 is adjusted between the expanded state, the compressed state, and the neutral state. When in the neutral state, the cores 322 may generally define the shape of the bladders 20 such that the outer membrane 318 rests on the surface of the core 322. It is also contemplated that the alternating support bladders 218 may not include the cores 322. In such examples, the neutral state may be defined by a predefined intermediate level of fluid between the compressed state and the expanded state.

Referring to FIG. 8, the alternating support bladders 218 are illustrated in different states, which are generally utilized during the ALP functionality. One of the first head bladders 220 is illustrated in the compressed state, the other first head bladder 220 is illustrated in the neutral state, and both of the second head bladders 222 are illustrated in the expanded state. To adjust the bladders 218 to the compressed state, the fluid is evacuated or vacuumed from the bladders 218, which consequently compresses the core 322. In such examples, the compressor 30 may be configured to actively draw fluid from the alternating support bladders 218.

To adjust the bladders 218 to the expanded state, fluid is directed into the interior chamber 320, adjusting the outer membrane 318 away from the core 322. To adjust the alternating support bladders 218 from the compressed state to the neutral state, fluid may be actively directed into the bladder 218 or the interior chamber 320 may be exposed to the atmosphere, allowing passive adjustment as the core 322 expands to the original shape. To adjust the alternating support bladders 218 from the expanded state to the neutral state, fluid may be exhausted into the atmosphere via the three-way valves 306. It is also contemplated that the fluid may be actively drawn from the alternating support bladders 218 without departing from the teachings herein.

The expanded state applies pressure to the patient, while the neutral state and the compressed state remove pressure from the patient. The greater contrast in height between the compressed state and the expanded state compared to the difference between the neutral state and the expanded state increases the pressure difference for the patient. The bladders 218 may adjust between the expanded state and the neutral state, the expanded state and the compressed state, or a combination thereof. Each bladder 20 within the pneumatic system 18 may be controlled between the deployed and non-deployed conditions through similar active and passive methods as described herein with respect to the alternating support bladders 218.

Figure 9:
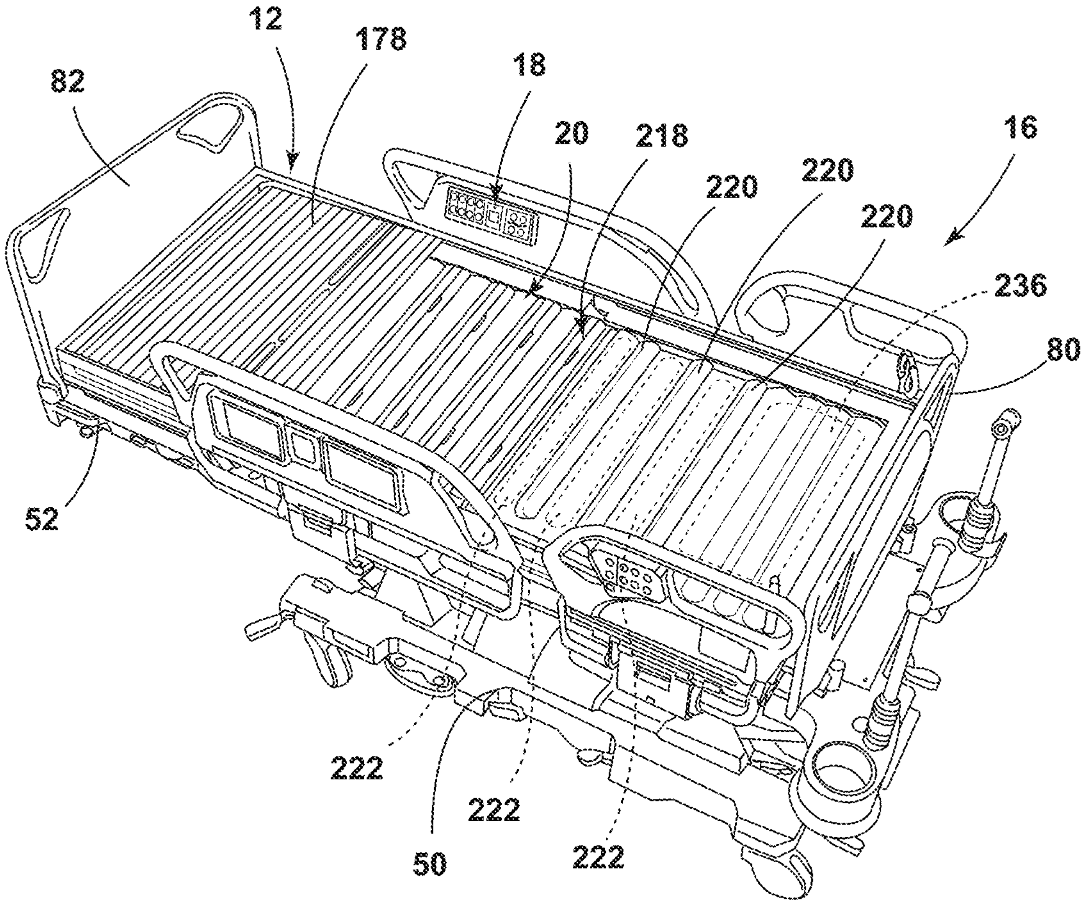
FIG. 9 is a top perspective view of a surface assembly on a support apparatus with a top cover removed, where alternating bladders illustrate alternating low pressure functionality in a standard mode of operation, according to the present disclosure.
Figure 10:
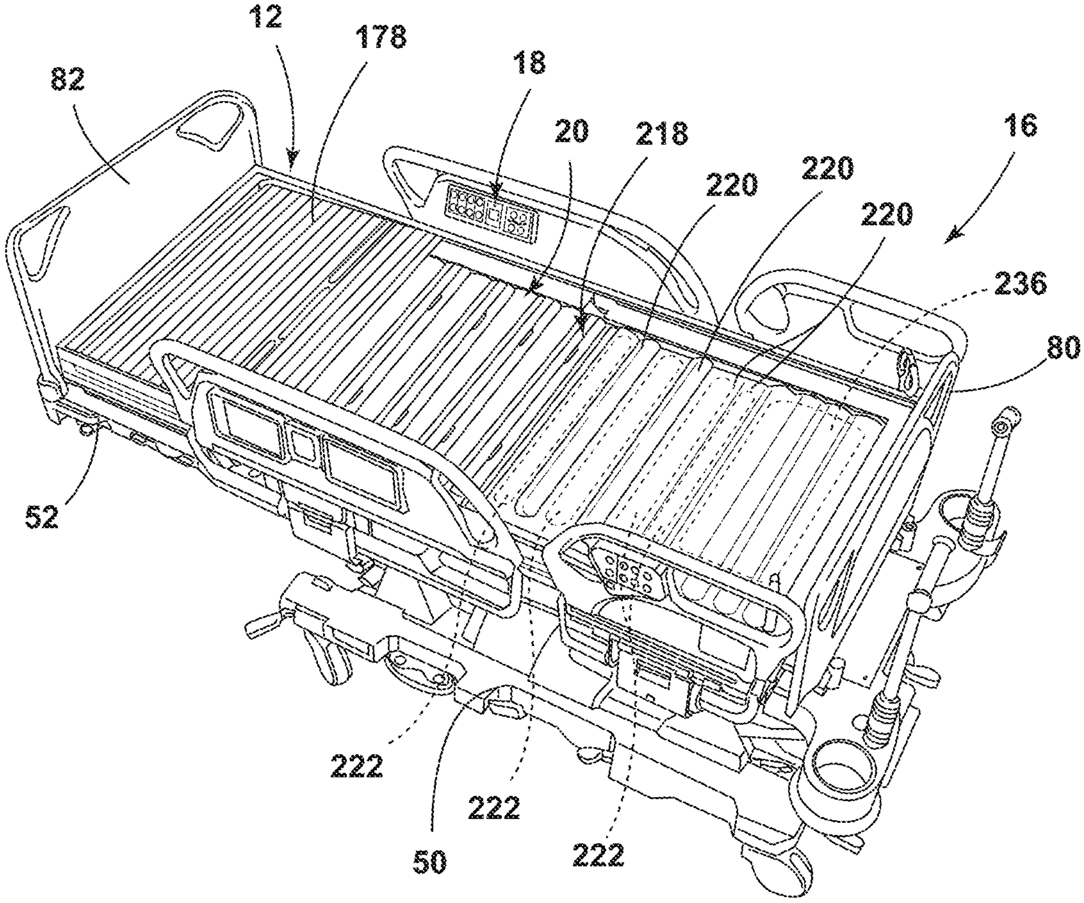
FIG. 10 is a top perspective view of a surface assembly on a support apparatus with a top cover removed, where alternating bladders illustrate alternating low pressure functionality in a prone mode of operation, according to the present disclosure.

Referring to FIGS. 9 and 10, the support apparatus 16 is shown with the upper cover 114 and the MCM system 250 of the surface assembly 12 removed to view the alternating support bladders 218 within the surface assembly 12. The first and second head bladders 220, 222 in the head zone 24 are illustrated during the active ALP functionality, with the first head bladders 220 in the expanded state, while the second head bladders 222 remain in the neutral state. The operation mode of the support apparatus 16 affects the functionality of various features of the support apparatus 16, including the ALP functionality of the pneumatic system 18. The change in functionality is based on the support position of the patient (e.g., supine v. prone).

For example, as illustrated in FIG. 9, the support apparatus 16 is operating in the standard mode for when the patient is in the supine position. The standard mode may be utilized when the patient is on his or her back and may also be referred to as a supine mode. As previously noted, the head zone 24 of the surface assembly 12 includes the head isolation bladder 236 and the first and second head bladders 220, 222. The head isolation bladder 236 is generally not adjusted as part of the ALP functionality. When the support apparatus 16 is operating in the standard mode, most or all of the first and second head bladders 220, 222 are adjusted as part of the ALP functionality. In the illustrated configuration, the head zone 24 includes three first head bladders 220, illustrated in the expanded state, and three second head bladders 222, illustrated in the neutral state, as well as the head isolation bladder 236.

In the configuration illustrated in FIG. 10, the support apparatus 16 is operating in the prone mode with the adjusted ALP therapy or functionality for when the patient is being supported in the prone position. When operating in the prone mode, some, but not all, of the first and second head bladders 220, 222 are adjusted to provide the ALP therapy. One or more of the head bladders 220, 222 disposed adjacent to the head isolation bladder 236 remain in the neutral state. For example, as illustrated in FIG. 10, the head zone 24 includes the head isolation bladder 236, three first head bladders 220, of which two are adjusted to the expanded state and one remains in the neutral state, and the three second head bladders 222 in the neutral state.

This adjusted functionality in the prone mode increases or extends an area for the head of the patient compared to when the support apparatus 16 is operating in the standard mode. The controller 32 is configured to adjust a first predefined number of the head bladders 220, 222 in a pattern between the deployed condition and the non-deployed condition when operating in the standard mode. The pattern is generally a repeated alternating pattern for the ALP functionality.

When operating in the prone mode, the controller 32 is configured to adjust a second predefined number of head bladders 220, 222 in the alternating pattern where the second predefined number is less than the first predefined number. For example, the controller 32 is configured to retain at least one head alternating bladder 220, 222 adjacent to the head isolation bladder 236 in the head zone 24 in the non-deployed condition, while adjusting at least one head bladders 220, 224, at least one seat bladder 224, 226, and/or at least one foot bladder 228, 230 between the deployed and non-deployed conditions. Adjusting fewer head bladders 220, 222 increases a stationary head area where the bladders 220, 222, 236 remain in the neutral state for the patient to rest his or her head. Accordingly, the controller 32 is configured to adjust which head bladders 220, 222 are utilized for providing the therapy to the patient based on the mode of operation (e.g., standard v. prone), while separately controlling the other bladders 20 in the pneumatic system 18. The prone mode ALP functionality may be utilized with or without the use of the prone accessory 90 (FIG. 2). The prone mode ALP functionality may be advantageous for preventing side-to-side movement of the head, which can cause skin breakdown and interference with ventilation tubing.

The adapted ALP functionality may increase the comfort of the patient in the prone position, and, therefore, may be referred to as a comfort prone function. The increased comfort from the comfort prone function may be advantageous for patients who are conscious proning. In certain aspects, the adjustment of the ALP function when operating in the prone mode may be a predefined adjustment, such that a select number of bladders 218 at select locations may remain in the neutral state during the duration of the prone mode ALP functionality. For example, a select number of alternating bladders 218 in the head zone 24 adjacent to the head isolation bladder 236 remain in the neutral state.

Additionally or alternatively, the adjustment to the ALP functionality may be dynamic or adaptive. In such examples, the alternating support bladders 218 that remain in the neutral state may be determined by a position of the patient, which may be sensed, input, or otherwise determined or communicated to the support apparatus 16. It is contemplated that the number and location of alternating support bladders 218 maintained in the neutral state (e.g., not included or adjusted in the ALP therapy) when operating in the prone mode may be adjustable based on a caregiver input, the position of the patient, the morphology of the patient, and/or other factors.

Referring again to FIGS. 9 and 10, the support apparatus 16 is configured to operate differently, with adjusted settings, when operating in the prone mode. Certain therapies and functionalities, like the comfort prone functionality, provided by the support apparatus 16 are adjusted in the prone mode. For example, when the patient is in the prone position, the segments 60, 62, 64 (FIG. 1) of the support apparatus 16 may be locked, to maintain the flat condition. In another non-limiting example, the pneumatic system 18 may adjust the surface assembly 12 to define surface contours 330 (FIG. 14) to adapt to body contours of the patient as described further herein.

Figure 11:
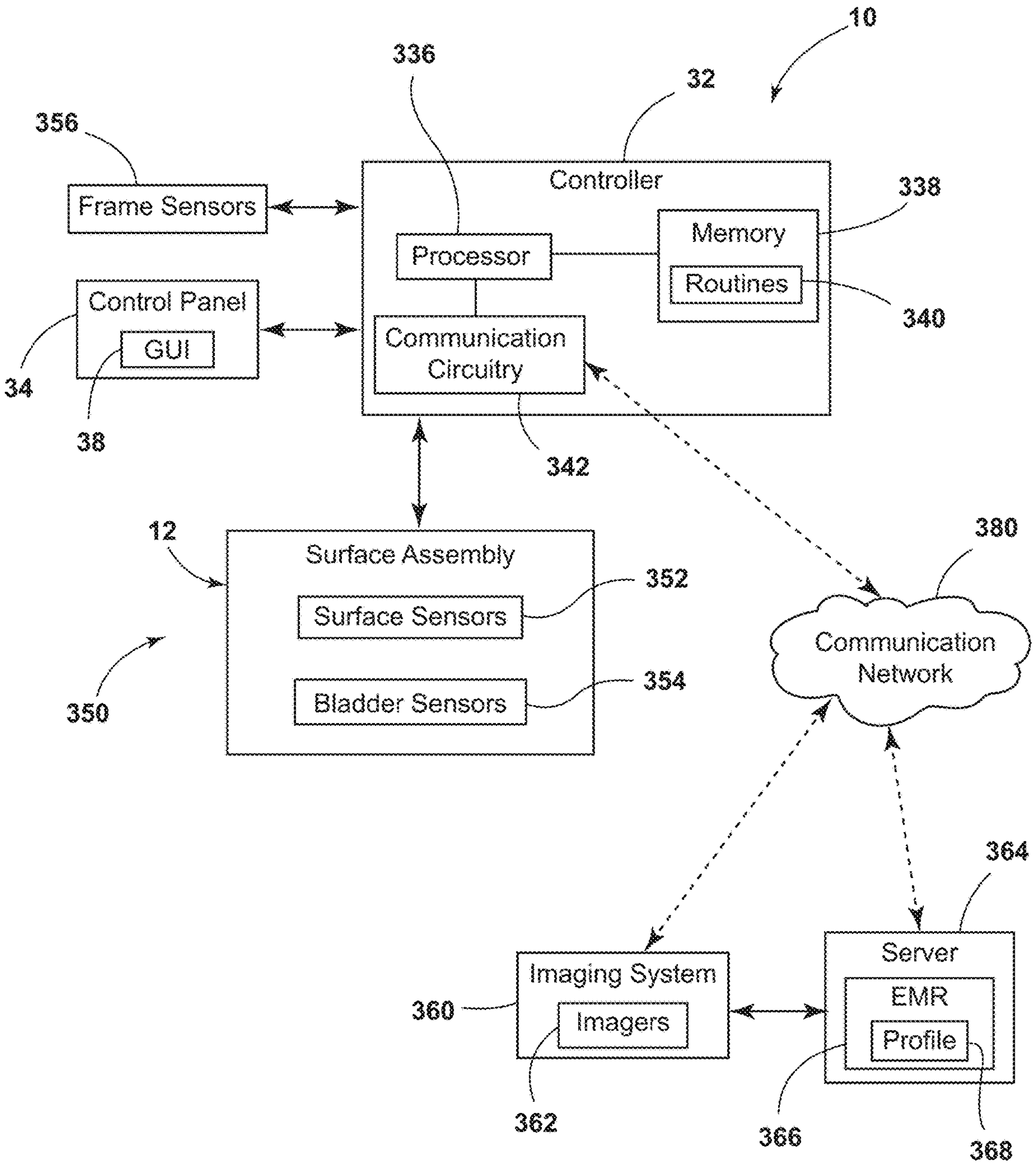
FIG. 11 is a block diagram of a proning system for a medical facility, according to the present disclosure.

With reference to FIG. 11, the support apparatus 16 includes the controller 32 that has a processor 336, a memory 338, and other control circuitry. Instructions or routines 340 are stored in the memory 338 and executable by the processor 336. The control circuitry generally includes communication circuitry 342 for bidirectional communication directly through wired or wireless communications. The controller 32 is in communication with the surface assembly 12 and the various electronic components disposed therein, such as the control box 264. The support apparatus 16 is also configured for bidirectional communication with other devices and systems of the healthcare facility.

In various aspects, the support apparatus 16 is configured to determine a patient position (e.g., location, supine v. prone, etc.) on the surface assembly 12, which may be advantageous for adjusting the surface assembly 12. The support apparatus 16 may be able to determine the location of the patient on the surface assembly 12 and/or the support position of the patient. In such examples, the support apparatus 16 includes various sensors 350 for sensing position information (e.g., location, support position, etc.). The surface assembly 12 includes surface sensors 352 coupled to the surface assembly 12. The surface sensors 352 may be force sensors, weight sensors, capacitive sensors, proximity sensors, etc. to sense the position information. Based on the distribution of the force, location of force, and the amount of force, the sensed information may be utilized by the controller 32 to determine where and how the patient is positioned on the surface assembly 12.

Additionally or alternatively, the surface assembly 12 may include bladder sensors 354 operably coupled with the bladders 20 of the pneumatic system 18. The bladder sensors 354 are generally air pressure sensors configured to determine the pressure applied to the corresponding bladders 20 based on the air pressure within the bladders 20. When the bladders 20 are maintained in a select position, the change in air pressure generally corresponds to a change in force applied to the bladders 20. This change in air pressure may be communicated to the controller 32 and utilized to determine the position information, as well as to adjust the amount of fluid within the bladder 20 for the CLP functionality.

The frame 14 of the support apparatus 16 may also include the sensors 350 (e.g., frame sensors 356) in communication with the controller 32. The frame sensors 356 may force sensors, weight sensors, capacitive sensors, proximity sensors, etc. The frame sensors 356 may be coupled to the upper frame 52, the siderails 70, or in any practicable location to sense information about the patient. The controller 32 is configured to receive the sensed information from each of the sensors 350 on the support apparatus 16 and utilize the sensed information to determine and monitor the position of the patient.

Referring still to FIG. 11, the controller 32 may also utilize the sensed information to determine the patient morphology, such as body contours. Determining body contours may be advantageous, particularly when the patient is in the prone position, to provide increased comfort for the patient. For example, the surface assembly 12 may adapt for body contours in the chest and genital areas of the patient utilizing the sensed information. The body contours may be sensed, for example, based on a difference in weight or pressure, or determined utilizing other information.

The controller 32 may utilize information from other devices and systems to determine the patient position. This may be advantageous to provide a more cohesive and integrated treatment for the patient by providing more accurate or updated information about the patient. For example, in the illustrated configuration, the controller 32 is configured to communicate with an imaging system 360. The imaging system 360 includes one or more imagers 362 disposed throughout the medical facility. In such examples, the medical facility may include imagers 362 in each patient room, unit, operating room, surgical suite, etc. The imaging system 360 is configured to obtain image data of the patient for a variety of uses, such as determining the patient position, monitoring patient behavior, obtaining health metrics, such as vital signs, etc. The imaging system 360 may process the image data, communicate the image data for processing, or a combination thereof.

The imaging system 360 may be utilized to determine the position of the patient on the support apparatus 16. The imaging system 360 may store dimensions and other information for identifying the support apparatus 16, the patient, and the position of the patient. The imaging system 360 generally includes image processing software to identify the position of the patient related to the support apparatus 16 and/or based on the associated position within a calibrated coordinate grid and operating envelope of a predefined area (e.g., the patient room, an area encompassing the support apparatus 16, etc.). The operating envelope may be defined or programmed into the imaging system 360 as a predetermined working range defined in relation to the coordinated grid.

Additionally or alternatively, the imaging system 360 may utilize coordinates in the image data to determine the position of the patient. For example, a head position of the patient may be determined using coordinates from thermal imaging. The imaging system 360 may map a center point on image data and assign a grid to the image data having a first axis in a first direction and a second axis in a second direction, generally perpendicular to the first axis. The grid is defined within an operating boundary of the image data. Typically, the first axis is an x-axis and the second axis is a y-axis, allowing the imaging system 360 to define x-coordinates and y-coordinates of features within the image data. Using the x- and y-axes, the imaging system 360 may define an origin position where both the x- and y-coordinates equal zero (i.e., (0, 0)). The head position may then be determined using the x-coordinate and the y-coordinate of the center point relative to the origin position. Changes in the head position may be determined by determining a change in coordinates of the head position relative to the grid.

Referring still to FIG. 11, the controller 32 may utilize the image data from the imaging system 360 and/or the position information determined by the imaging system 360. The controller 32 is configured to determine, monitor, and/or confirm the position of the patient and the morphology of the patient. For example, the controller 32 may analyze the image data or receive the analyzed information.

Additionally or alternatively, the imaging system 360 and the controller 32 from the support apparatus 16 may be in communication with a server 364, which stores information from the imaging system 360 and the support apparatus 16. The server 364 may be a local server 364 at the medical facility, a remote server 364, or both. The server 364 may generally include software or algorithms for processing and coordinating data used throughout the medical facility.

For example, the server 364 may store electronic medical records (EMRs) 366 for each patient at the medical facility. Within the EMR 366 are multiple profiles 368, with each profile 368 associated with a single patient. The image data from the imaging system 360, for example, may be stored within the profile 368. The profile 368 may also include information related to the morphology of the patient, such as sex, weight, height, specific body contours, other body-related information, etc. The information from the EMR 366 may be utilized by the controller 32 to determine the exact position of the patient on the surface assembly 12 (e.g., length of the patient relative to the surface assembly 12) and the morphology of the patient. Further, once the controller 32 has determined that the patient is in the prone position, the controller 32 may automatically adjust the surface assembly 12 to operate in the prone mode.

Additionally or alternatively, the controller 32 is configured to receive information from caregiver inputs, such as through the GUI 38 on a control panel 34, which is generally coupled to one of the siderails 70 (as illustrated in FIG. 1). The caregiver may input information about the patient position, the body contours of the patient, and/or the surface contours 330 of the surface assembly 12 through the GUI 38 as described further herein.

Figure 12:
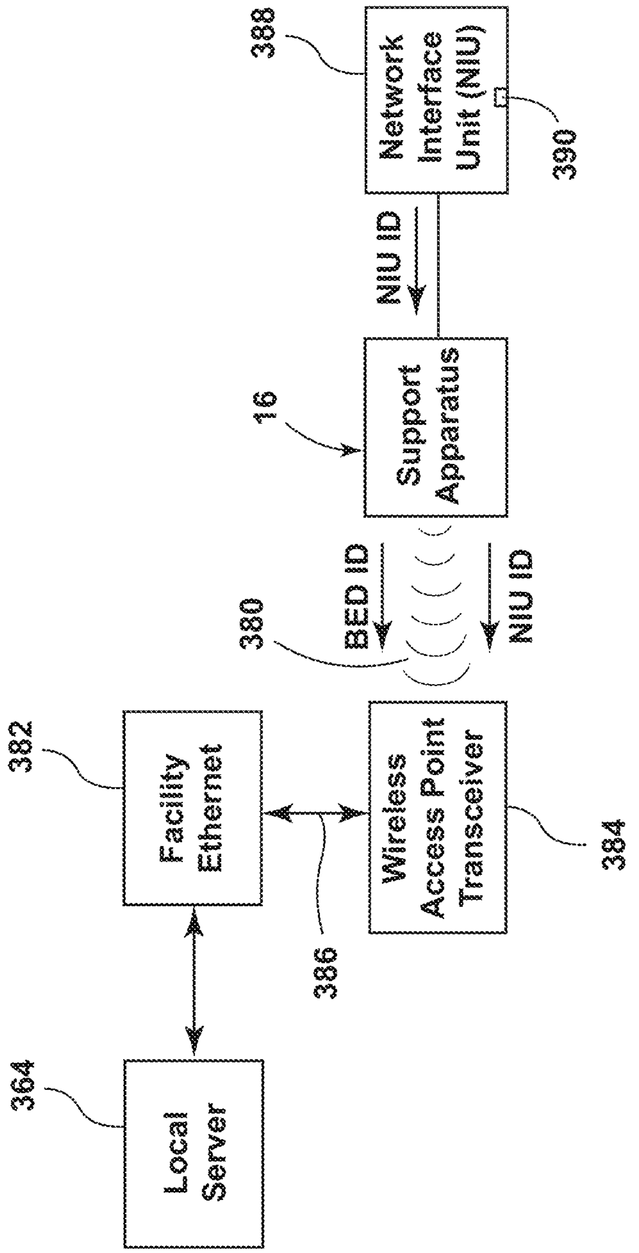
FIG. 12 is a block diagram of wireless communication between a support apparatus and a server, according to the present disclosure.
Figure 13:
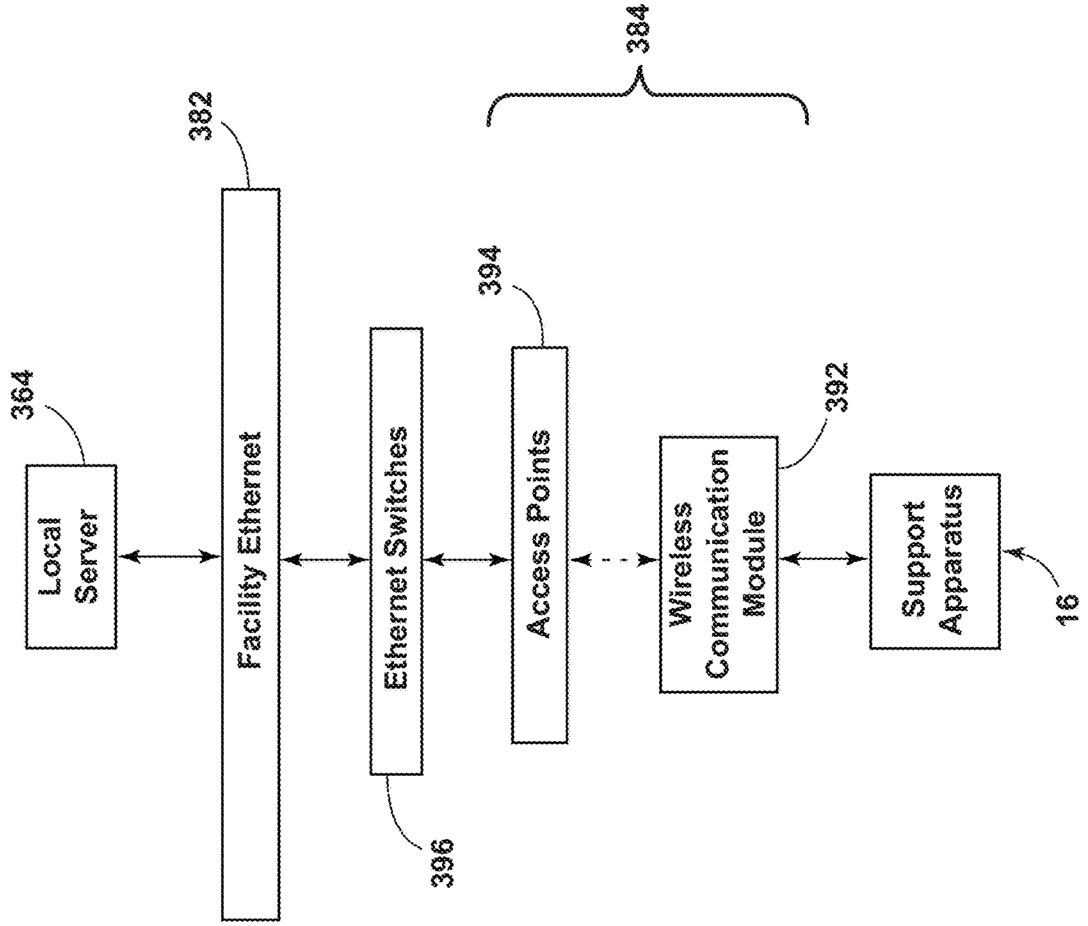
FIG. 13 is a block diagram of wireless communication between a support apparatus and a server, according to the present disclosure.

Referring still to FIG. 11, the controller 32 includes the communication circuitry 342 configured for bidirectional wired and wireless communication via a communication network 380. The controller 32 may wirelessly communicate with the server 364, the imaging system 360, and other devices and systems of the healthcare facility via the communication network 380. The communication network 380 may be part of a network of the medical facility. The network may include a combination of wired connections (e.g., Ethernet 382 as illustrated in FIGS. 12 and 13), as well as wireless connections, which may include the wireless communication network 380. The communication network 380 may include a variety of electronic devices, which may be configured to communicate over various wired or wireless communication protocols. The communication network 380 may include a wireless router through which the remotely accessed devices may be in communication with one another, as well as the server 364.

The communication network 380 may be implemented via one or more direct or indirect nonhierarchical communication protocols, including but not limited to, Bluetooth®, Bluetooth® low energy (BLE), Thread, Ultra-Wideband, Z-wave, ZigBee, etc. Additionally, the communication network 380 may correspond to a centralized or hierarchal communication network 380 where one or more of the devices communicate via the wireless router (e.g., a communication routing controller). Accordingly, the communication network 380 may be implemented by a variety of communication protocols, including, but not limited to, global system for mobile communication (GSM), general packet radio services, code division multiple access, enhanced data GSM environment, fourth generation (4G) wireless, fifth generation (5G) wireless, Wi-Fi, world interoperability for wired microwave access (WiMAX), local area network, Ethernet 382, etc. By flexibly implementing the communication network 380, the various devices and servers 364 may be in communication with one another directly via the wireless communication network 380 or a cellular data connection.

Referring still to FIG. 11, as well as FIGS. 12 and 13, exemplary wireless communications of the support apparatus 16 to the server 364 are illustrated. In certain aspects, the support apparatus 16 is configured to communicate with a wireless access transceiver 384, which is coupled to Ethernet 382 of the medical or healthcare facility. The communication network 380 provides for bidirectional communication between the support apparatus 16 and the wireless access transceiver 384. The wireless access transceiver 384 communicates bidirectionally with Ethernet 382 via a data link 386.

As illustrated in FIG. 12, the support apparatus 16 may be associated with a network interface unit 388. The server 364 may include software (e.g., routines) that operate to associate the identification code of the support apparatus 16 with the network interface unit identification data to locate each support apparatus 16 within the medical facility. Each network interface unit 388 includes a port 390 for selectively coupling with Ethernet 382. When the network interface unit 388 is coupled with Ethernet 382, the network interface unit 388 communicates the identification data to the support apparatus 16, which then wirelessly communicates the data for the support apparatus 16 and the network interface unit 388 to the wireless access transceiver 384. The wireless access transceiver 384 then communicates with the server 364 via Ethernet 382.

As illustrated in FIG. 13, the support apparatus 16 may be capable of communicating wirelessly via a wireless communication module 392. The wireless communication module 392 generally communicates via an SPI link with circuitry of the associated support apparatus 16 (e.g., the communication circuitry 342) and via a wireless 802.11 link with wireless access points 394. The wireless access points 394 are generally coupled to Ethernet switches 396 via 802.3 links. It is contemplated that the wireless communication modules 392 may communicate with the wireless access points 394 via any of the wireless protocols disclosed herein. Additionally or alternatively, the Ethernet 382 switches may generally communicate with Ethernet 382 via an 802.3 link. Ethernet 382 is also in communication with the local server 364, allowing information and data to be communicated between the local server 364 and the support apparatus 16.

The controller 32 disclosed herein may include various types of control circuitry, digital or analog, and may include the processor 336, a microcontroller, an application specific integrated circuit (ASIC), or other circuitry configured to perform the various inputs or outputs, control, analysis, or other functions described herein. The memory 338 described herein may be implemented in a variety of volatile and nonvolatile memory formats. Routines 340 may include operating instructions to enable the various methods described herein.

Figure 14:
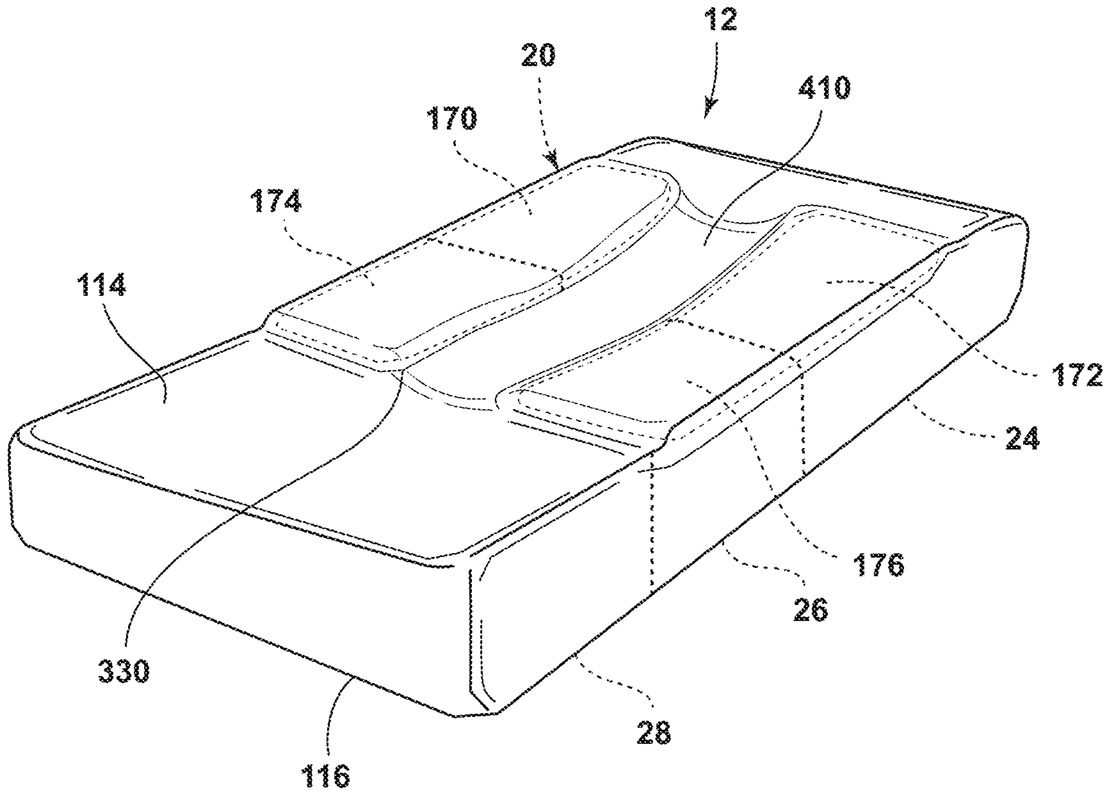
FIG. 14 is a side perspective view of a surface assembly defining a central recessed region for adapting to a patient morphology, according to the present disclosure.

Referring to FIG. 14, the controller 32 is configured to adapt the shape of the surface assembly 12 to define the surface contours 330 when operating in the prone mode based on the patient position, location, and morphology. Once the controller 32 determines the patient is in the prone position, the controller 32 may automatically adjust the shape of the surface assembly 12 in response to the prone position and the patient morphology. For example, as illustrated in FIG. 14, the controller 32 may adjust the turn bladders 120 to the expanded state to define a central recessed region 410. In such examples, the expanded turn bladders 120 cause portions of the surface assembly 12 to extend above the remaining bladders 20, and consequently the remainder of the top surface of the surface assembly 12. The central recessed region 410 may then provide space for the various contours and morphology of the patient, such as the chest and genital areas of the patient.

The use of the expanded turn bladders 120 may shift the body of the patient away from the top surface in the head zone 24, thereby providing increased space for the head of the patient. Further, some or all of the remaining bladders 20 may remain in the neutral state or be adjusted to the compressed state. The bladders 20 in the head zone 24, for example, may be adjusted to the compressed state to provide increased space for the head of the patient. In the prone position, the patient often rests the side of his or her face on the surface assembly 12. Accordingly, providing increased space for the head of the patient may increase comfort for the patient, as well as increase space for ventilation tubes. It is also contemplated that the turn bladders 120 may remain in the neutral state, while the remaining bladders 20 are adjusted to the compressed state. In such examples, the compression of the remaining bladders 20 results in the formation of the central recessed region 410 and additional space for the head of the patient.

Figure 15:
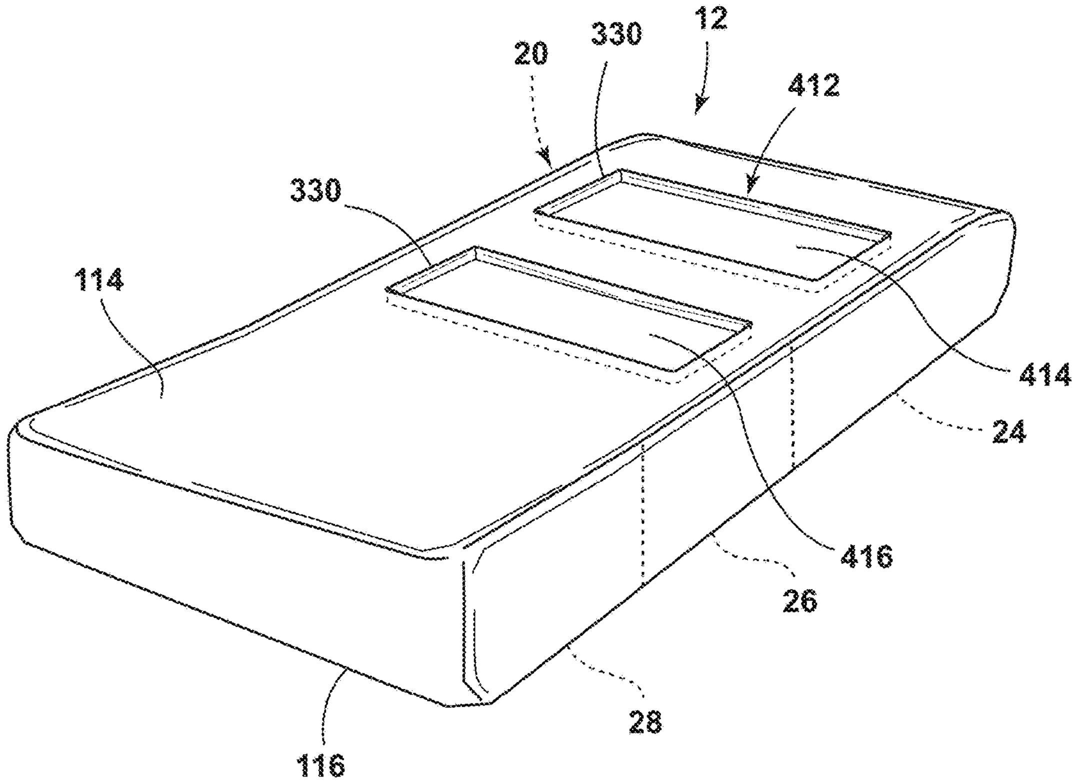
FIG. 15 is a side perspective view of a surface assembly defining recessed areas in a head zone and a seat zone for adapting to a patient morphology, according to the present disclosure.

Referring to FIG. 15, in addition or alternatively to the central recessed region 410 illustrated in FIG. 14, the surface assembly 12 may define multiple recessed areas 412 when in the prone mode. The multiple recessed areas 412 may align with various contours of the body of the patient. For example, the configuration illustrated in FIG. 15 includes two recessed areas 414, 416. The first recessed area 414 generally aligns with the head of the patient, providing additional space for the head and face of the patient, and the second recessed area 416 generally aligns with the chest area of the patient. Additional or alternative recessed areas 412 may be utilized, which may align with a stomach area, the genital area, or other contours and areas of the patient. The multiple recessed areas 412 may be predefined areas on the surface assembly 12 based on the configuration of the pneumatic system 18. In this way, the same select bladders 20 are adjusted to form the recessed areas 412.

Figure 16:
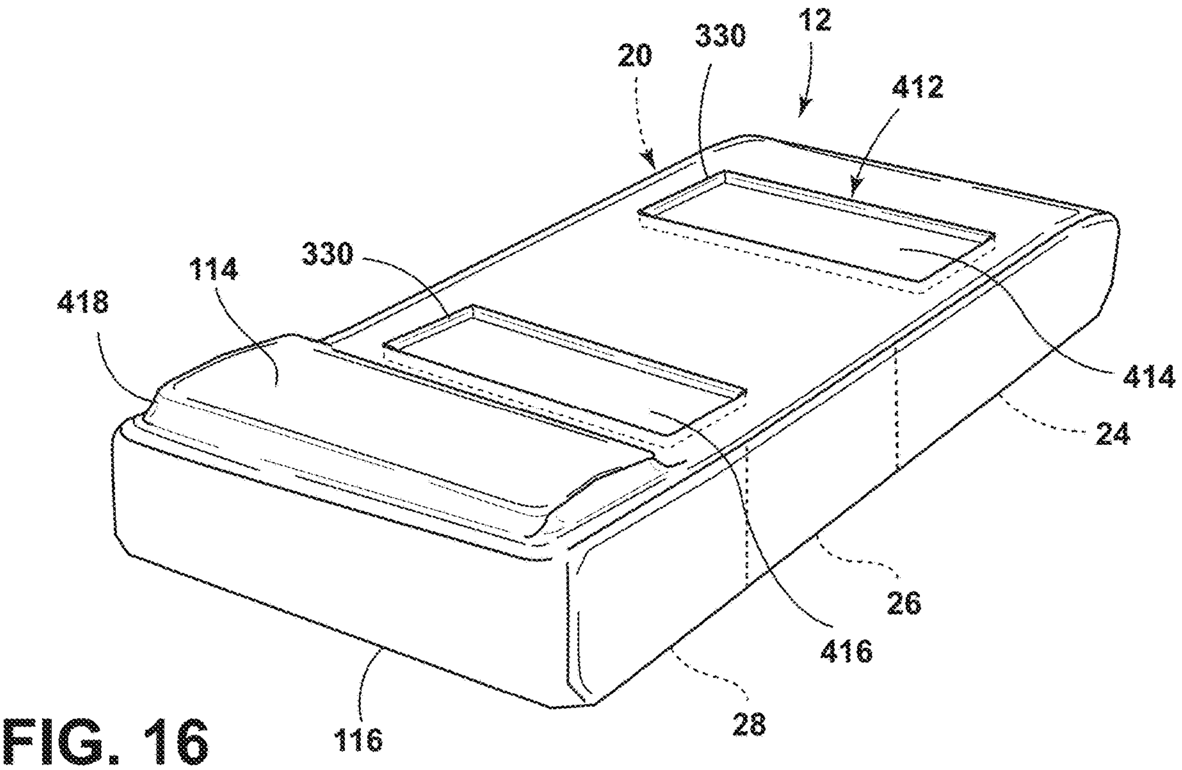
FIG. 16 is a side perspective view of a surface assembly defining recessed areas in a head zone and a foot zone for adapting to a patient morphology, according to the present disclosure.

With reference to FIG. 16, in certain aspects, the recessed areas 412 may be dynamically adjusted and/or adapted to the specific information about the patient, including the exact location of the patient on the surface assembly 12 and the morphology of the patient. In such examples, different bladders 20 are adjusted to form the various recessed areas 412. For example, one set of bladders 20 may form one of the recessed areas 416 for a chest of a first patient, and when the surface assembly 12 is used for a second shorter patient, a second set of bladders 20 may form the recessed area 416 for the chest. The recessed areas 412 may align with different body portions for each patient.

Referring again to FIGS. 15 and 16, the controller 32 may utilize information from the EMR data, the image data, the sensed data, the caregiver input, or combinations thereof to determine the position and morphology of the patient and adjust the pneumatic system 18 to form the recessed areas 412. The recessed areas 412 may be formed in different ways. For example, the pneumatic system 18 may inflate all of the bladders 20 to provide an elevated surface, except for the bladders 20 in the recessed areas 412. In the recessed areas 412, the bladders 20 may remain in the neutral state or may be adjusted to the compressed state. Additionally or alternatively, a majority of the bladders 20 may remain in the neutral state and the bladders 20 in the recessed areas 412 may be adjusted to the compressed state to form the recessed areas 412.

Referring to FIGS. 1-16, the support apparatus 16 has adapted functionality for when the patient is in the prone position. The prone mode may be selected by the caregiver or may automatically be determined by the controller 32 based on sensed and received information. The controller 32 may adjust the pneumatic system 18 to provide different surface contours 330 in the surface assembly 12, such as the central recessed region 410 and/or the multiple recessed areas 412. The surface contours 330 may also include an elevated foot area 418, provided by expansion of the foot elevation bladder 130. The support apparatus 16 is configured to adjust the surface assembly 12 to maximize comfort for the patient in the prone position.

The controller 32 may adjust the turn bladders 120 to form the central recessed region 410, various bladders 20 to form multiple recessed areas 412, the alternating support bladders 218 to adjust the ALP functionality, a combination thereof, or various combinations thereof. The pneumatic system 18 may define one or more of the central recessed region 410, the multiple recessed areas 412, and the elevated foot area 418 independently of or in combination with one another. Further, one or more of the elevated foot area 418, the central recessed region 410, and the multiple recessed areas 412 may be utilized with one or both of the CLP functionality and the adapted ALP functionality (i.e., the comfort prone functionality). The combination of one or more of the features provides increased comfort, as well as therapies to the patient in the prone position.

Figure 17:
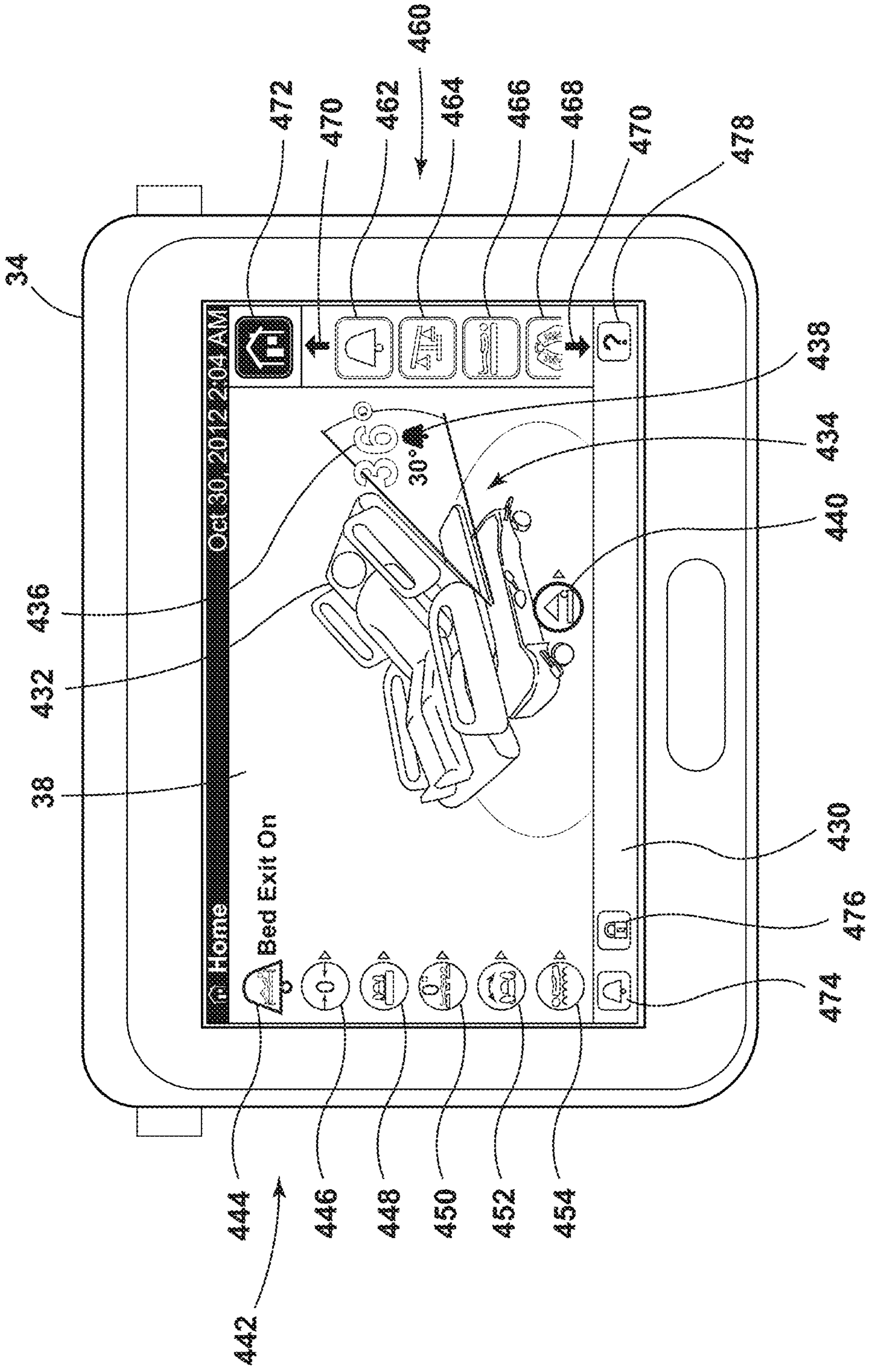
FIG. 17 is illustrative of a home screen on a graphical user interface of a control panel, according to the present disclosure.

Referring to FIG. 17, the GUI 38 of the control panel 34 generally allows the caregiver to view, adjust, and input information relating to the support apparatus 16, including the prone mode. In the illustrated example, a home screen 430 includes a graphical representation 432 of the support apparatus 16, illustrating bed information 434. The bed information 434 includes a head angle status 436, a head of bed alarm indicator 438, and a lowest bed position indicator 440. The lowest bed position indicator 440 notifies the caregiver of whether the upper frame 52 of the support apparatus 16 is in the lowest position relative to the base frame 50. Additionally, the home screen 430 includes multiple status icons 442 related to features of the support apparatus 16, including, for example, a bed exit status 444, a bed zero status 446, a surface status 448, a Trendelenburg status 450, a rotation status 452, and a percussion and vibration status 454. The status icons 442 may be selected to adjust the status of the various features and/or may display the current status for the various features.

Further, the home screen 430 includes multiple selectable icons 460 to view, adjust, or input information related to various functions of the support apparatus 16. In the illustrated example, the selectable icons 460 include an alarm icon 462, a scale icon 464, a surface control icon 466, a pulmonary therapy icon 468, and an arrow 470 to display additional selectable icons 460. The home screen 430 also includes a home icon 472, used to navigate back to the main home screen 430 illustrated in FIG. 17. The home screen 430 of the illustrated configuration also includes an alarm status icon 474, a screen lock icon 476, and a help icon 478. Additional, fewer, or alternative icons 460 and information may be included on the home screen 430 without departing from the teachings herein.

The caregiver may select the surface control icon 466 to control aspects of the surface assembly 12. For example, upon navigating to a surface control screen 490 (see FIG. 22), the caregiver may view and navigate through multiple prone aid notifications 36 (see FIGS. 18-21 and FIG. 23). The controller 32 is configured to generate various prone aid notifications 36, which are communicated to and displayed on the GUI 38 for the caregiver. The prone aid notifications 36 may provide reminders, instructions, alerts, or other information for assisting the caregiver.

Generally, the prone aid notifications 36 provide reminders, instructions, alerts, or other information for assisting the caregiver in adjusting the patient to the prone position and/or for adjusting the patient for the prone mode of operation. The prone aid notifications 36 guide the caregiver in adjusting, turning, moving, or otherwise positioning the patient on the surface assembly 12 for the patient to be comfortable in the prone position, as well as for optimizing functions and therapies during the prone mode of operation. Additionally or alternatively, if the patient is already in the prone position, the prone aid notification 36 may assist the caregiver is repositioning the patient from a first side or first prone position to a second side or second prone position (e.g., rotating the head of the patient, alternating swimmer's positions, etc.).

Figure 18:
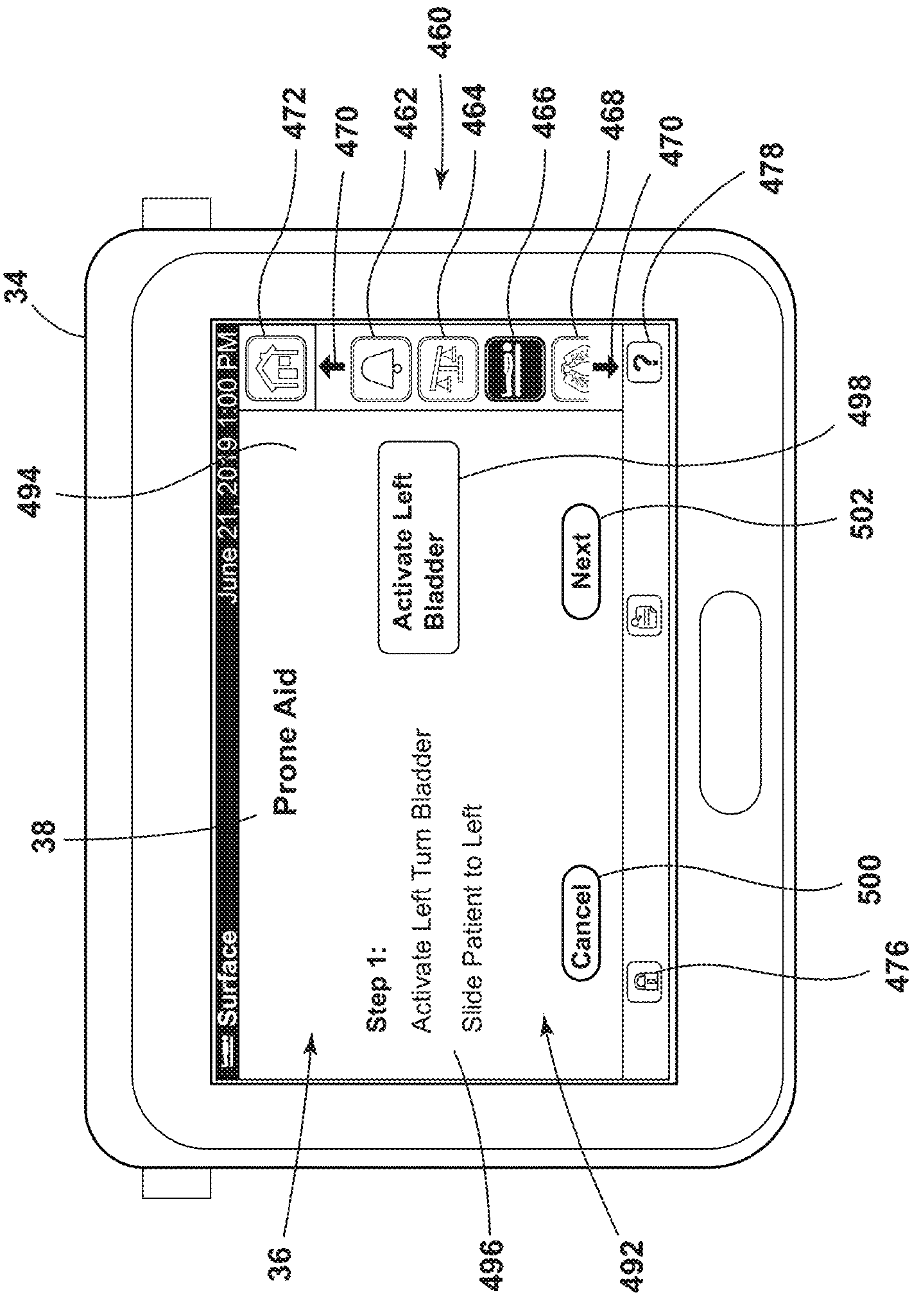
FIG. 18 is illustrative of a first instruction screen in a prone aid notification on a graphical user interface of a control panel, according to the present disclosure.

As illustrated in FIG. 18, the prone aid notifications 36 may be prone positioning instructions 492, which assist the caregiver in adjusting the patient to the prone position. A first instruction screen 494 includes a first step for adjusting the patient from the supine position to the prone position. The first step includes activating the left turn bladders 172, 176 and sliding the patient to his or her left. The first instruction screen 494 includes instructions 496 for the actions for the caregiver, as well as a selectable activate icon 498. The selectable activate icon 498 allows the caregiver to activate the left turn bladders 172, 176, adjusting the left turn bladder 172, 176 to the expanded state, from the same screen 494 as the instructions 496. This is advantageous to provide efficient assistance for the caregiver, rather than the caregiver navigating between multiple screens. Once the left turn bladders 172, 176 are activated and the patient has been adjusted or slid to the left, the caregiver may select a "next" icon 500 to proceed to the next step in the instructions 496.

Alternatively, the caregiver may select a "cancel" icon 502 to exit the instruction screen 494.

Figure 19:
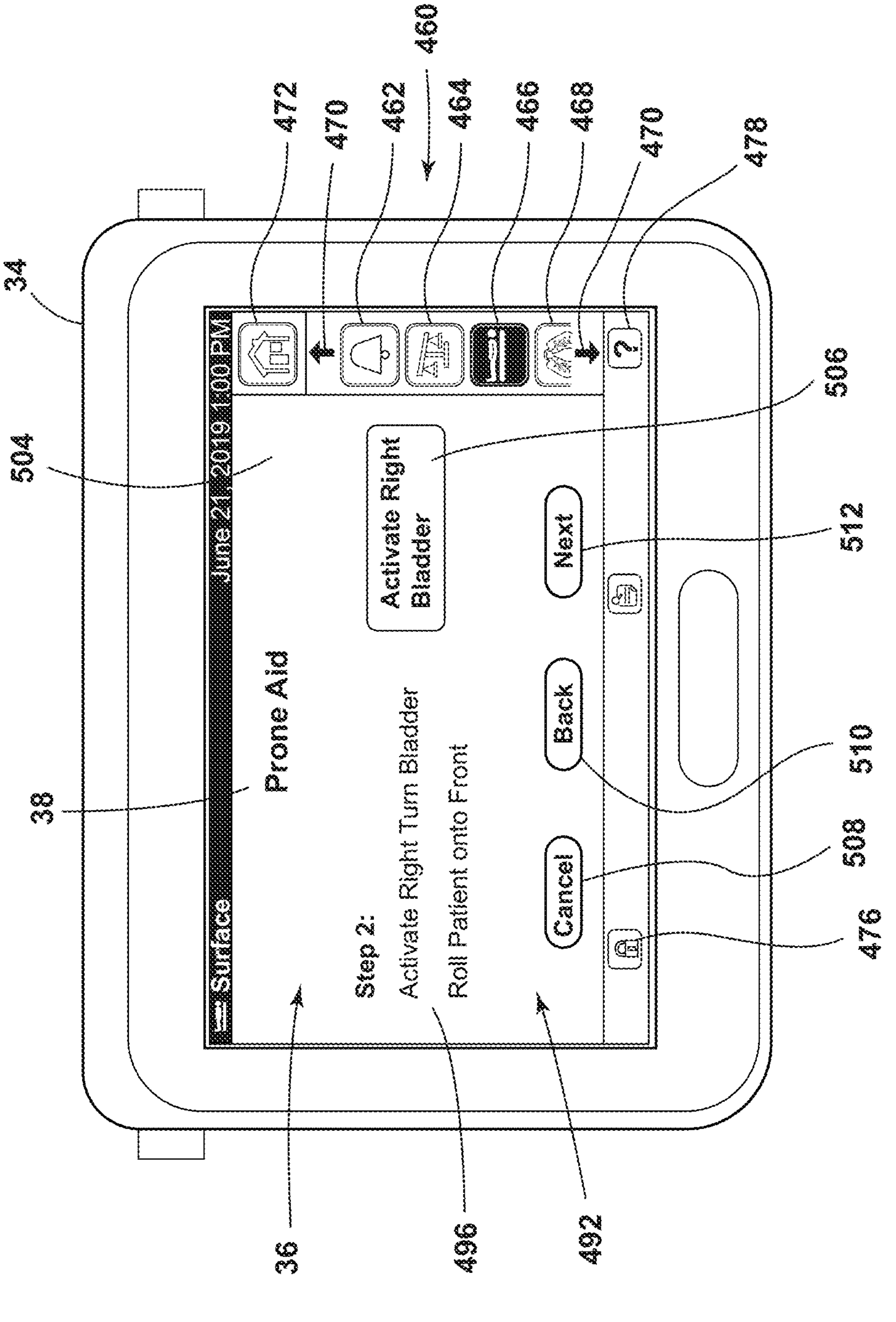
FIG. 19 is illustrative of a second instruction screen in a prone aid notification on a graphical user interface of a control panel, according to the present disclosure.

As illustrated in FIG. 19, a second instruction screen 504 includes a second step for assisting the caregiver in adjusting the patient to the prone position. The second step includes activating the right turn bladders 170, 174 and rolling the patient onto his or her front. The second instruction screen 504 includes the instructions 496 and a second activate icon 506. Upon selection of the second activate icon 506, the right turn bladders 170, 174 are adjusted to the expanded state. The left turn bladders 172, 176 may remain in the expanded state or, alternatively, adjust to the neutral state. The caregiver may use the inflation or expansion of right turn bladders 170, 174 to fully roll the patient onto his or her stomach. The second instruction screen 504 includes a "cancel" icon 508 to exit the instruction screen 504, a "back" icon 510 to return to the first instruction screen 494, and a "next" icon 512 for proceeding with the next step.

Figure 20:
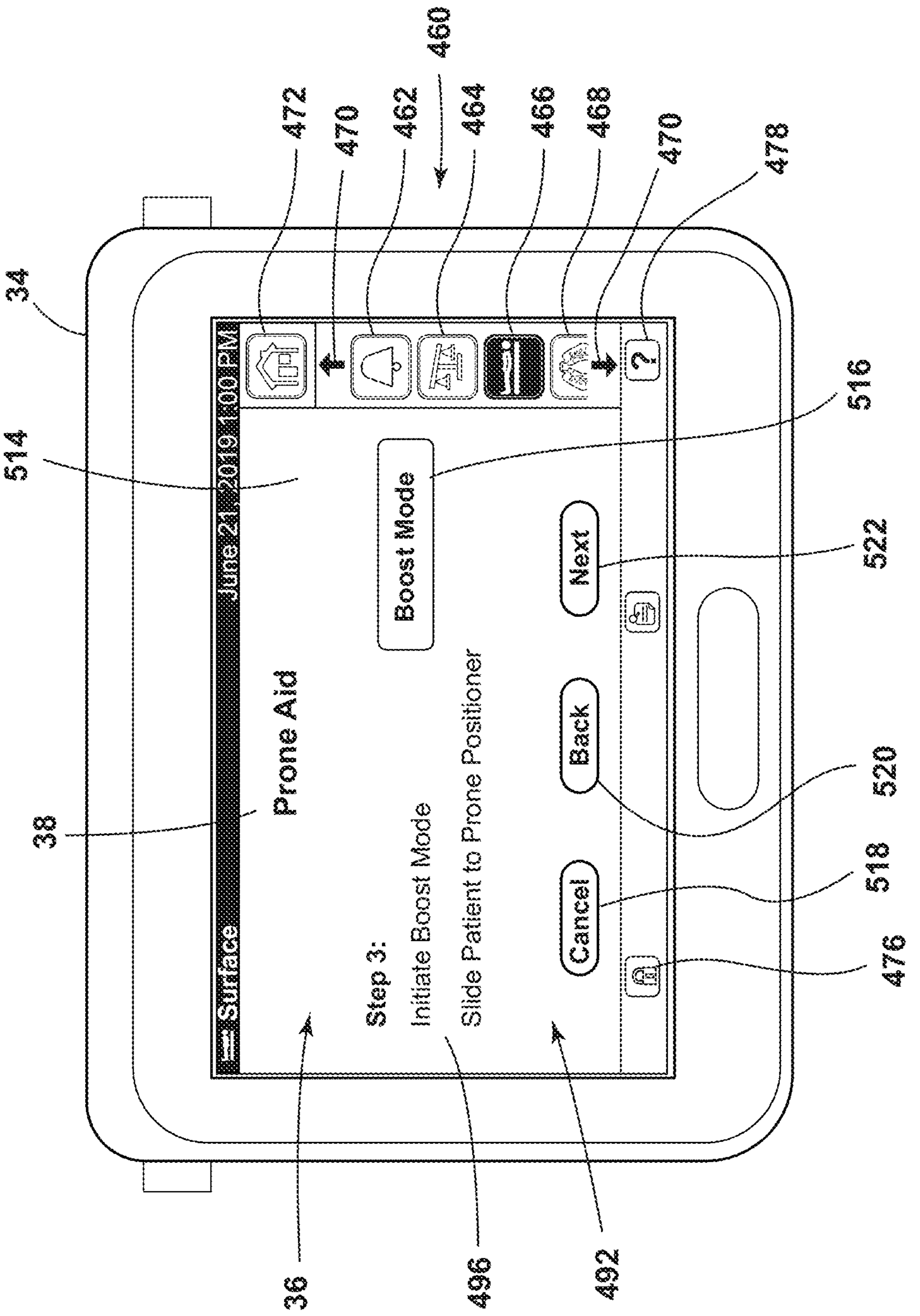
FIG. 20 is illustrative of a third instruction screen in a prone aid notification on a graphical user interface of a control panel, according to the present disclosure.

Referring to FIG. 20, a third instruction screen 514 is illustrated with a third step for assisting the caregiver in adjusting the patient to the prone position. The third step for adjusting the patient to the prone position includes properly aligning the patient on the support apparatus 16. The third instruction screen 514 includes the instructions 496 for activating a boost mode of operation and a selectable boost icon 516. In the boost mode, all the bladders 20 in the pneumatic system 18 are adjusted to the expanded state to provide a more rigid and flat surface. In such examples, the bladders 20 are generally adjusted to a maximum inflated condition. The rigid and flat surface reduces sheer for the caregiver to slide the patient along the surface assembly 12 toward the head end 92 of the support apparatus 16. This assists with properly aligning the head of the patient in the head zone 24 or on the prone accessory 90.

When the prone accessory 90 is being used, the third instruction screen 514 may also include instructions 496 for sliding the patient onto the prone accessory 90 and/or adjusting the position of the prone accessory 90. The instructions 496 may automatically be updated based on the controller 32 determining whether the prone accessory 90 is coupled with the support apparatus 16. The controller 32 may determine whether the prone accessory 90 is coupled to the support apparatus 16 via the sensors 350, through an input by the caregiver, and/or information from the EMR 366.

Once the patient is adjusted to the proper position on the support apparatus 16, the caregiver may adjust the surface assembly 12 out of the boost mode by again selecting the selectable boost icon 516. The bladders 20 may then adjust to define surface contours 330, or alternatively most or all the bladders 20 may adjust to the neutral state. The caregiver may exit the instruction screen 514 via a "cancel" icon 518, return to a previous instruction screen 494, 504 via a "back" icon 520, or proceed to the next step via a "next" icon 522.

Figure 21:
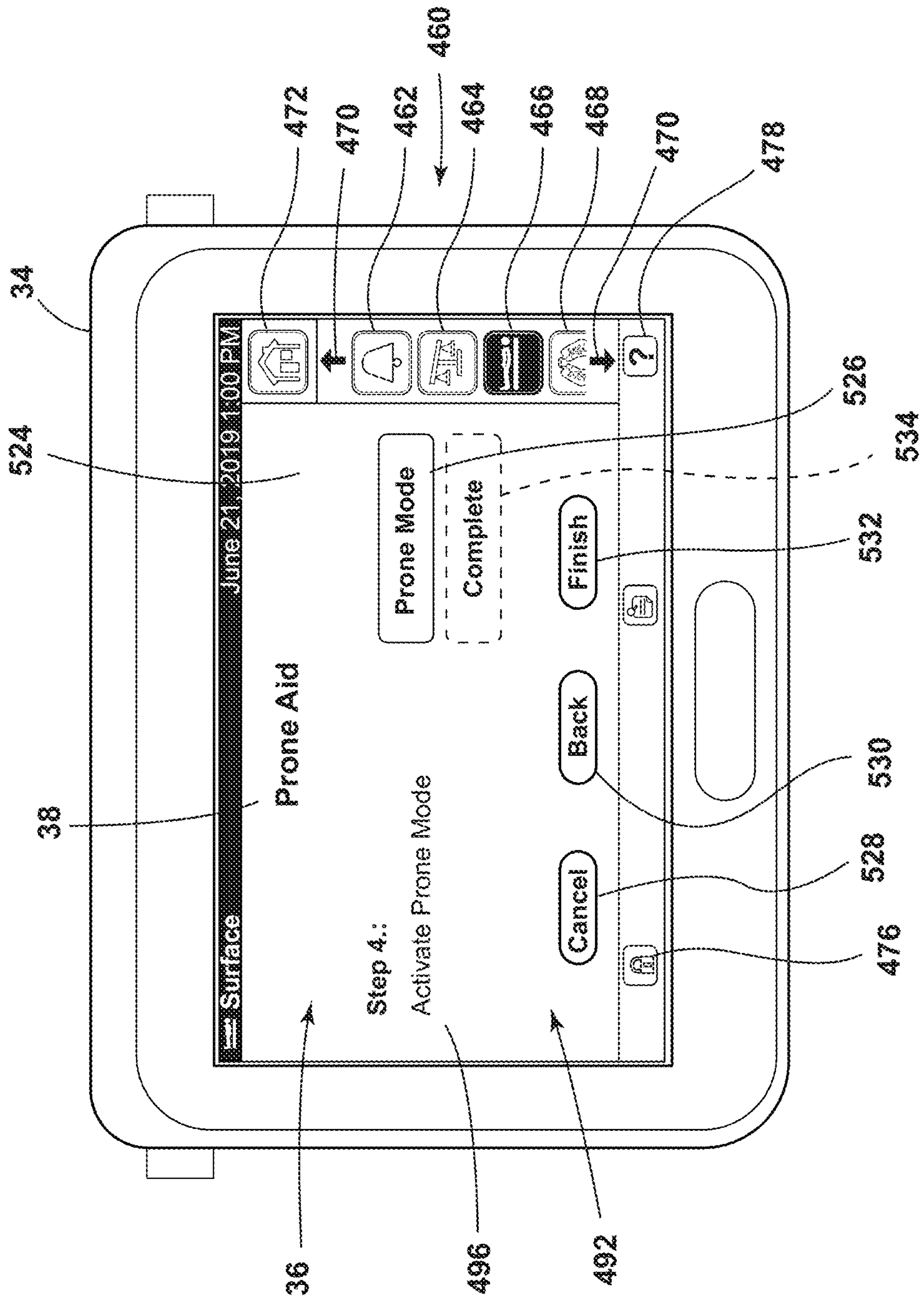
FIG. 21 is illustrative of a fourth instruction screen in a prone aid notification on a graphical user interface of a control panel, according to the present disclosure.

Referring to FIG. 21, a fourth instruction screen 524 is illustrated, which may be utilized for activating the prone mode of the support apparatus 16. In the illustrated configuration, the fourth instruction screen 524 includes a selectable feature 526 for activating the prone mode. Upon selecting an "activate" icon 526, the surface assembly 12 may adjust to define the selected or detected surface contours 330 in the surface assembly 12. Upon activation of the prone mode, the foot elevation bladder 130 may also be adjusted to the expanded state. The fourth instruction screen 524 may include icons, to "cancel" 528, go "back" 530, or "finish" 532.

Additionally or alternatively, the fourth instruction screen 524 may include a "complete" icon 534, which may automatically activate the prone mode as the caregiver has completed instructions for adjusting the patient to the prone position. The fourth instruction screen 524 may also include selectable icons for activating the CLP functionality and/or the comfort prone functionality. It is also contemplated that after deactivation of the boost mode in the third step of the instructions 496, the instructions 496 may end, which signifies to the controller 32 that the patient is now in the prone position. In such examples, the controller 32 may automatically adjust the support apparatus 16 to the prone mode and adjust for the contours of the patient.

If the patient is positioned in the prone position and the surface assembly 12 is in the prone mode of operation, the caregiver may control certain aspects of the surface assembly 12 to reposition the patient. For example, upon navigating to the surface control screen 490 (see FIG. 22), the caregiver may view and navigate through multiple prone aid notifications 36, which may provide reminders, instructions, alerts, or other information for assisting the caregiver in repositioning the patient. The repositioning instruction screens may be similar to the prone positioning instruction screens 494, 504, 514, 524 illustrated in FIGS. 18-21, providing instructions 496 and selectable features for controlling the surface assembly 12.

In such examples, a first repositioning screen may include instructions 496 for confirming the position of the patient. The caregiver may confirm that the patient is in the prone position and/or may confirm or input the specific information for the prone position. Accordingly, the caregiver may confirm or input the head position (e.g., rotated left, rotated right, on the prone accessory 90, etc.) and arm positions of the patient (e.g., raised by head, lowered by side, etc.). The caregiver may also confirm or input the time the patient has been in the current position. In certain aspects, this information may be determined by the controller 32 and included on the first repositioning screen.

The caregiver may then navigate to a second repositioning screen, which includes instructions 496 to assist the caregiver in activating various bladders 20 to adjust the patient. For example, the second repositioning screen may include an icon for adjusting the repositioning bladder 128. The selection of the icon may adjust the repositioning bladder 128 to the expanded state, lifting the chest of the patient as described herein. Further, the second repositioning screen may include an icon for adjusting the bladders 20 in the head zone 24. Generally, the bladders 20 in the head zone 24 are adjusted to the deflated or compressed state, which provides additional space proximate the head of the patient. Additionally or alternatively, the second repositioning screen may include an icon for adjusting the foot elevation bladder 130. The foot elevation bladder 130 may be deflated to lower the feet or legs of the patient. This may be advantageous prior to activating the repositioning bladder 128 to increase comfort of the patient as the chest of the patient is raised.

A third repositioning screen may include instructions 496 for guiding the caregiver in repositioning the patient. For example, the instructions 496 may include information on rotating the head of the patient. The information may also include how to adjust ventilation tubing during and after rotation of the head of the patient. The instructions 496 may also include information on adjusting the arms of the patient to alternate the swimmer's position (i.e., raising one arm on the same side to which the head is facing while placing the other arm by the patient side). The third repositioning screen may also include instructions 496 for adjusting other aspects of the position of the patient as determined by the caregiver.

A fourth reposition screen may include instructions 496 for adjusting the bladders 20 after repositioning the patient. For example, the icons from the second repositioning screen may be utilized, and re-selection of the icons may adjust the bladders 20. In such examples, the repositioning bladder 128 may be deflated to lower the chest of the patient, the bladders 20 in the head zone 24 may be adjusted to the neutral state or a previous state to support the head of the patient, and/or the foot elevation bladder 130 may be adjusted to the expanded state to lift the feet of the patient. The caregiver may also input a time for the patient to be in this position before rotation to the alternate side. Alternatively, this time may be determined by the controller 32. The time in this position may begin when the bladders 20 are readjusted and the caregiver selects a "confirm" icon or exits the prone aid notifications 36 for repositioning the patient. The repositioning screens are generally utilized for guiding the caregiver in adjusting the patient between the first side and the second side of the prone position, including the head position and the swimmer's position.

Figure 22:
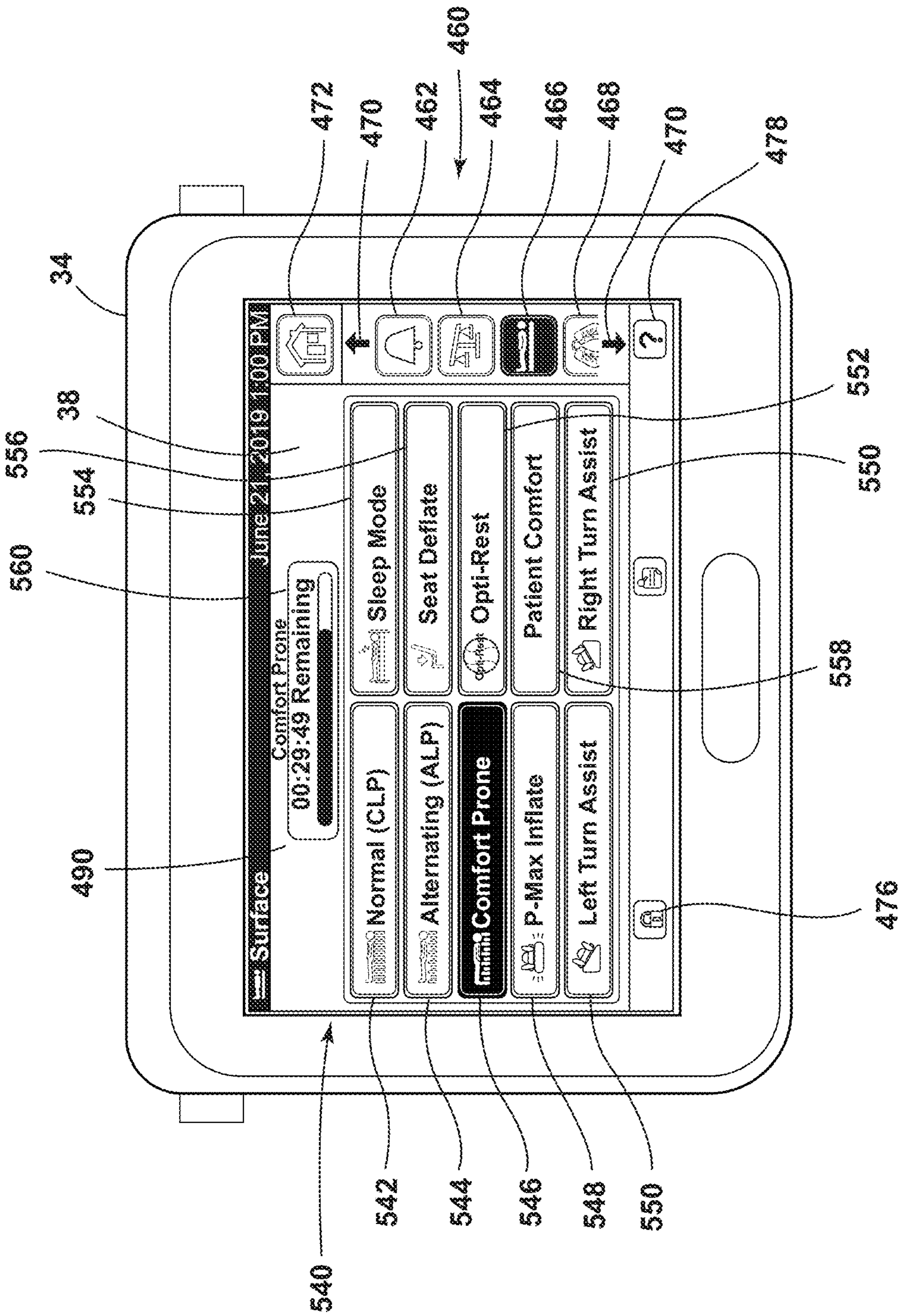
FIG. 22 is illustrative of a surface control screen in a prone aid notification on a graphical user interface of a control panel, according to the present disclosure.

Referring to FIG. 22, the surface control screen 490 is illustrated, which includes selectable icons 540 for controlling multiple functions for the surface assembly 12. The selectable icons 540 include a normal CLP function icon 542 for activating the CLP function when the patient is in the supine position. An ALP function icon 544 is utilized activating the ALP function in the standard mode when the patient is in the supine position. The selectable icons 540 also include a comfort prone icon 546 related to the comfort prone functionality. Selection of the comfort prone icon 546 may activate the adapted ALP function for use when the patient is in the prone position. Additional selectable icons 540 in the illustrated configuration include a max inflate or boost mode icon 548, a turn assist function icon 550, an opti-rest function icon 552, a sleep mode icon 554, a seat deflate icon 556 for when the patient is in the Fowler's position, and a patient comfort icon 558.

The surface control screen 490 may also show a time remaining 560 for a predefined period of time for a select therapy. In the illustrated example, the comfort prone therapy is activated and the time remaining 560 communicates the time to the caregiver. It is also contemplated that the time elapsed may, additionally or alternatively, be displayed on the surface control screen 490.

Figure 23:
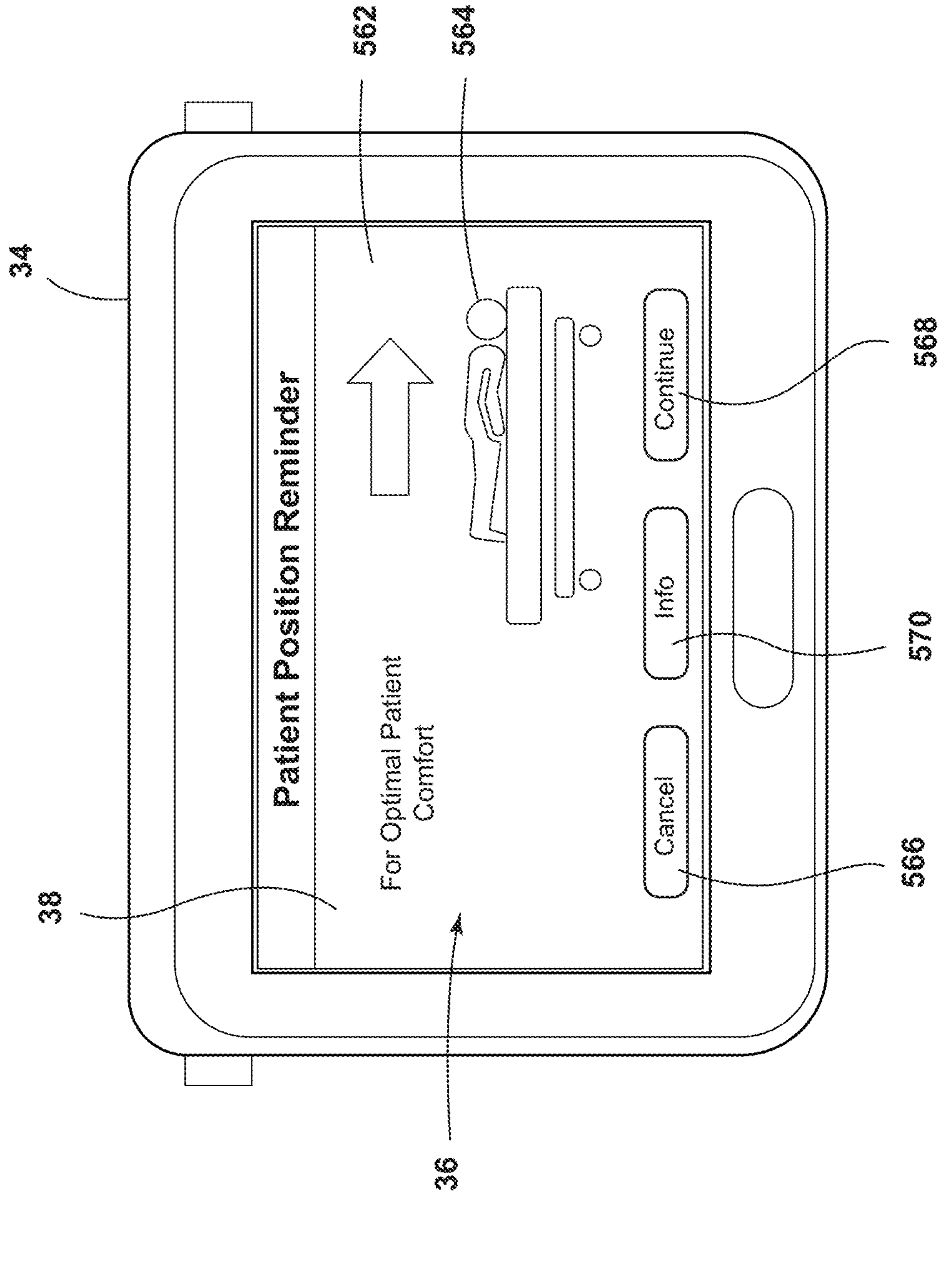
FIG. 23 is illustrative of a positioning reminder in a prone aid notification on a graphical user interface of a control panel, according to the present disclosure.

With reference to FIG. 23, upon selection of the comfort prone icon 546 (FIG. 22), the controller 32 may generate at least one prone aid notification 36, which may be a positioning reminder 562. The positioning reminder 562 includes instructions 496 for the caregiver to adjust the patient toward the head end 92 of the support apparatus 16 to place the head of the patient in the larger head zone 24 or on the prone accessory 90. The positioning reminder 562 in the illustrated configuration also includes a graphical representation 564 of how to adjust the patient. The positioning reminder 562 also includes icons to "cancel" 566, "continue" 568, or obtain additional information 570. The additional information may be about the prone position, the prone mode, and/or the comfort prone functionality. In addition to the positioning reminder 562, the controller 32 may generate any one or more of the positioning instruction screens 494, 504, 514, 524 upon selection of the comfort prone icon 546.

Figure 24:
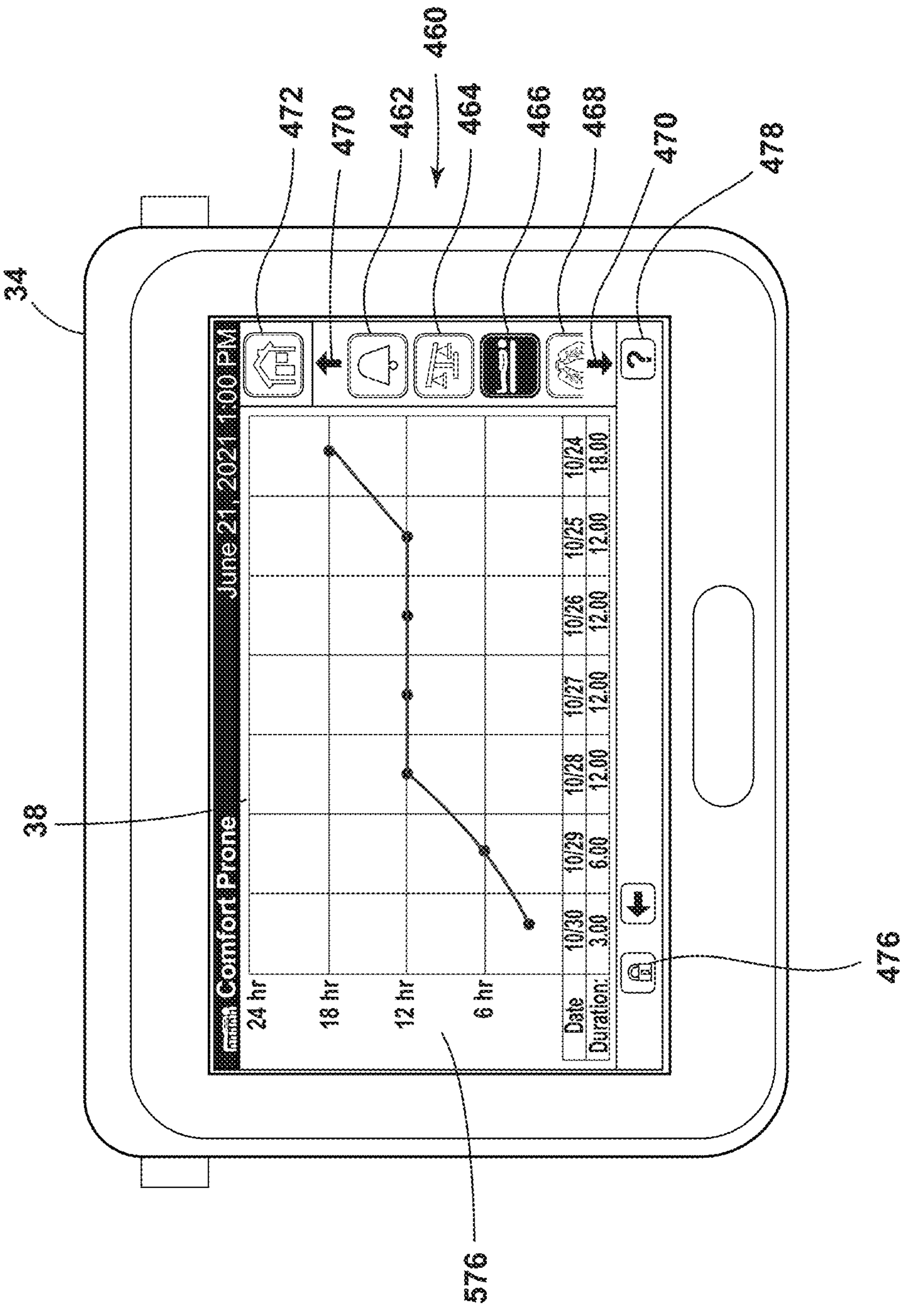
FIG. 24 is illustrative of a history screen for use of a comfort prone functionality on a graphical user interface of a control panel, according to the present disclosure.

Referring to FIG. 24, the controller 32 is configured to monitor the use of the comfort prone functionality over time and generate a comfort prone history. A history screen 576 is configured to be generated by the controller 32 and displayed on the GUI 38. The history screen 576 illustrates the dates the comfort prone functionality was utilized, as well as the length of time for each date. Any practicable configuration may be utilized for showing dates and timing of the use of the comfort prone functionality over a predefined period of time. The controller 32 may also communicate the history information to the EMR 366 and/or retrieve information from the EMR 366 to include on the history screen 576.

Figure 25:
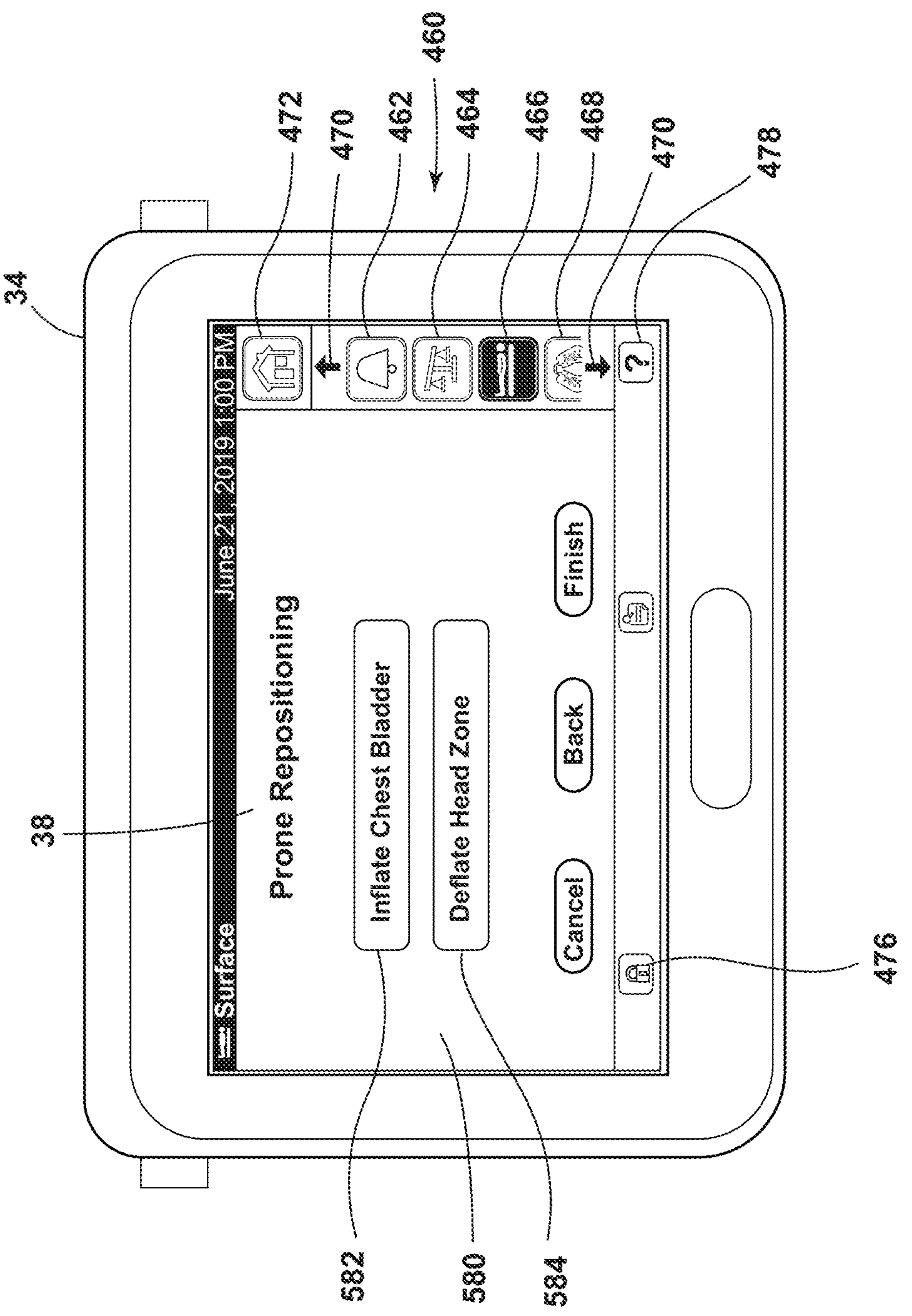
FIG. 25 is illustrative of a repositioning screen on a graphical user interface of a control panel for repositioning a head of a patient in a prone position, according to the present disclosure.

Referring to FIG. 25, the GUI 38 may also be utilized to control the pneumatic system 18 for patient prone repositioning. When the patient is in the prone position, the patient often alternates which side of his or her face he or she is resting on. Additionally, the patient may alternate between the swimmer's positions. The swimmer's position is a more specific prone position in which one arm of the patient is raised such that the hand is positioned by the head of the patient. Additionally, the head of the patient is rotated toward the raised arm. After a predefined period of time, the arm that is raised is alternated and the head of the patient is rotated. In conscious proning, the patient may be able to adjust the position of his or her head and/or arms without additional assistance from the surface assembly 12. However, in certain conscious proning circumstances or when the patient is sedated, additional functionality may be used by the patient or the caregiver to assist with adjusting the head and/or swimmer's position of the patient from one side to the other.

The prone repositioning may assist in moving the surface assembly 12, moving the patient, or combinations thereof to provide additional space around the head area of the patient. A repositioning screen 580, as illustrated in FIG. 25, includes a repositioning icon 582, which controls the repositioning bladder 128 arranged proximate to the clavicle of the patient, and a deflate head zone icon 584, which controls the bladder or bladders 20 in the head zone 24 of the surface assembly 12. Upon selection of the repositioning icon 582, the repositioning bladder 128 is expanded or inflated to lift the clavicle area and upper chest of the patient. Upon selection of the deflate head zone icon 584, the support bladders 124 and/or the head isolation bladder 236 may be adjusted to neutral state or the compressed state in response to the selection of the deflate head zone icon 584. The repositioning screen 580 may also include an icon for deflating or deactivating the foot elevation bladder 130 to lower the feet of the patient during the repositioning process.

The lifting of the chest and the deflation or compression of the head zone 24 may be used independently of one another or in combination. When used in combination, the space between the head of the patient and the surface of the surface assembly 12 in the head zone 24 is increased, providing additional space for adjusting the head position of the patient, as well as the arms of the patient to adjust the swimmer's position. It is contemplated that the support bladders 124 that align with the clavicle may also be adjusted to the expanded state to further lift the chest of the patient. Additionally, upon selection of the deflate head zone icon 584, the bladders 20 in the head zone 24 may adjust to the neutral state rather than the compressed state. Reselection of the repositioning icon 582, the deflate head zone icon 584, and the icon related to the foot elevation bladder 130 may return the bladders 20 to a previous state or the neutral state. Alternatively, each bladder 20 may automatically adjust to the previous state after a predefined period of time.

Referring to FIGS. 26-30, the GUI 38 may also be utilized for the caregiver to input or confirm information about the morphology of the patient and the surface contours 330 of the surface assembly 12. The caregiver generally interacts with the GUI 38 to provide information to the controller 32, which may be utilized to adjust the surface assembly 12. In various aspects, the caregiver may select, adjust, or manipulate information and graphics on the GUI 38.

Figure 26:
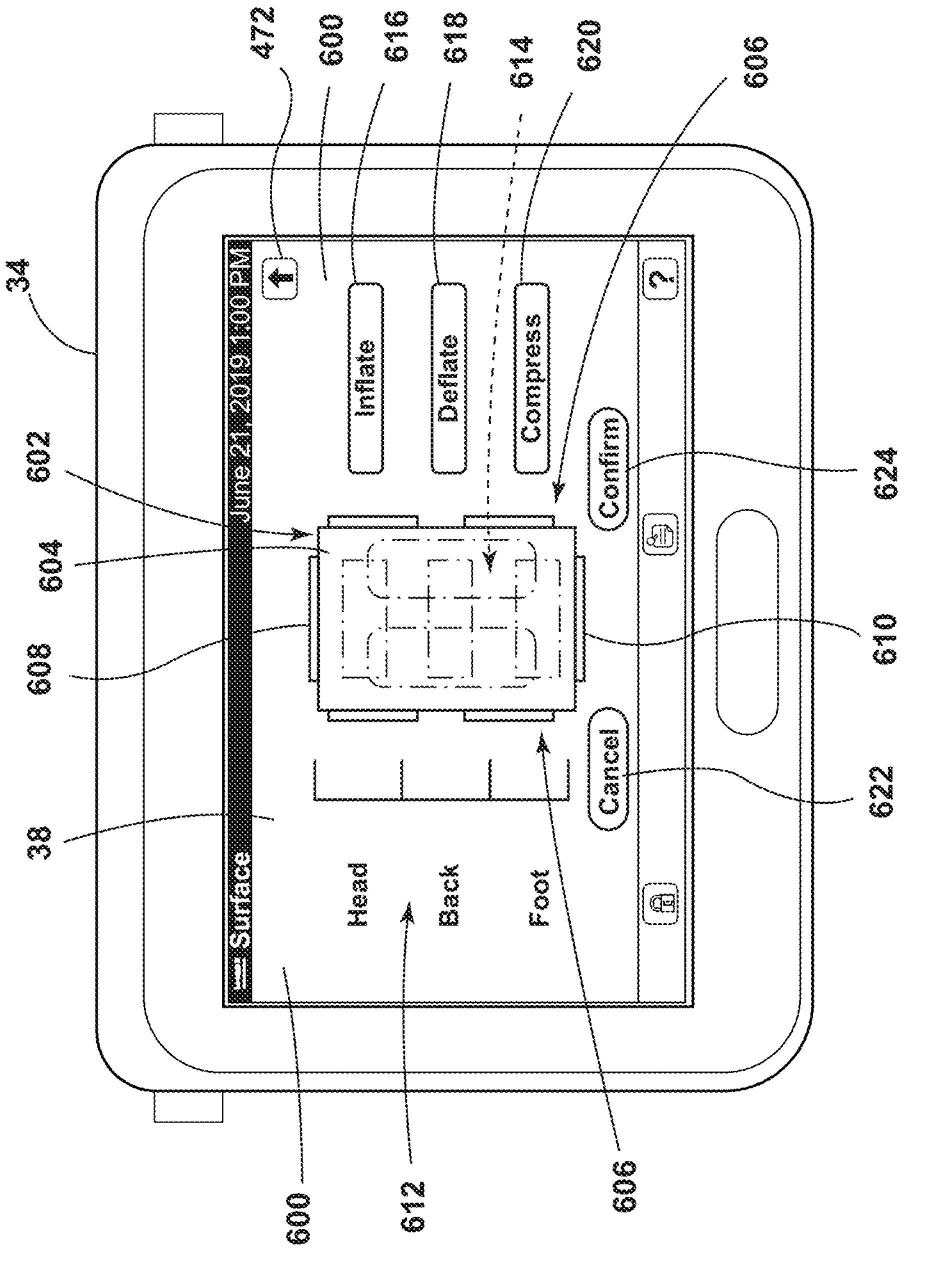
FIG. 26 is illustrative of an area-based input screen on a graphical user interface of a control panel for adjusting surface contours when operating in a prone mode, according to the present disclosure.

For example, as illustrated in FIG. 26, the GUI 38 may display an area-based input screen 600 that includes a graphic 602 representative of a top view of the support apparatus 16, including a mattress indicator 604, siderail indicators 606, a headboard indicator 608, and a footboard indicator 610. Other indicators for identifiable features on the support apparatus 16 may also be used. The indicators 604, 606, 608, 610 may be advantageous for providing spatial context to the caregiver to input or confirm information. Additionally or alternatively, the GUI 38 may also include surface zone indicators 612 to assist the caregiver in determining where bladder area icons 614 are relative to the support apparatus 16. The bladder area icons 614 on the graphic 602 correspond with bladders 20 on the support apparatus 16, located in the same position on the support apparatus 16 as are illustrated on the graphic 602.

The graphic 602 includes multiple bladder area icons 614 on the graphic 602 that can be adjusted by the caregiver and which correspond with the contours 330 to be defined in the surface assembly 12. The bladder area icons 614 may be located in predefined locations on the graphic 602 to correspond with the predefined central recessed region 410 and recessed areas 412. The caregiver may select the bladder area icon 614 to be adjusted to form or remove the surface contour 330. For example, the caregiver can select an "inflate" icon 616 to inflate the bladders 20 for the selected bladder area icon 614, a "deflate" icon 618 for deflating the bladders 20, or a "compress" icon 620 for compressing the bladders 20 for the selected bladder area icon 614. The caregiver may select a "cancel" icon 622 to keep the current contours 330 of the surface assembly 12 or a "confirm" icon 624 for accepting the changed contours 330.

Figure 27:
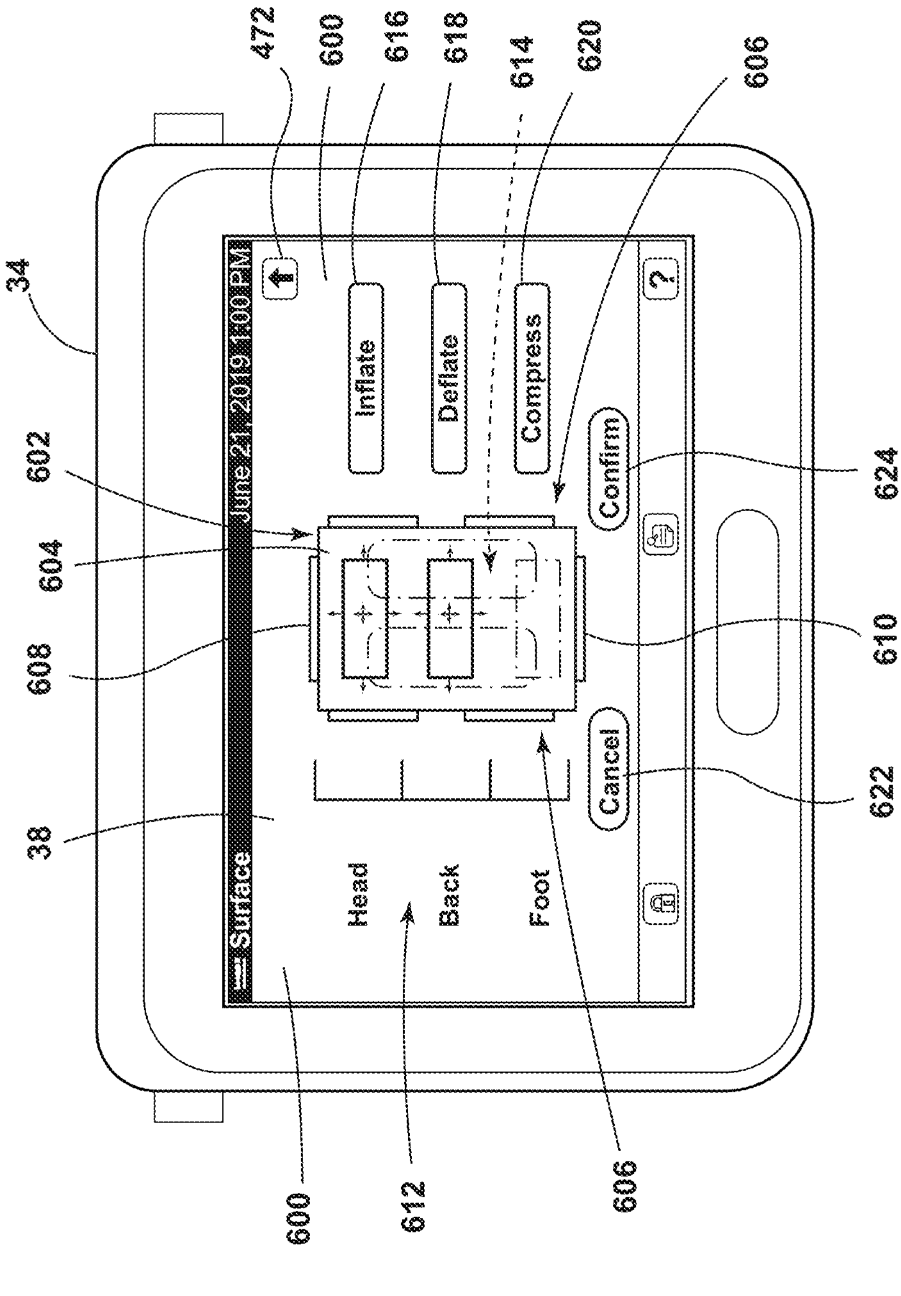
FIG. 27 is illustrative of an area-based input screen with adjustable areas on a graphical user interface of a control panel for adjusting surface contours when operating in a prone mode, according to the present disclosure.

As illustrated in FIG. 27, in various aspects, the controller 32 may automatically select and/or adjust the surface assembly 12 to define the central recessed region 410 or any of the multiple recessed areas 412. In this way, the controller 32 is configured to determine the morphology and adapt the surface contours 330 accordingly. The bladder area icons 614 on the graphic 602 may be pre-selected to allow the caregiver to view the proposed contours 330 of the surface assembly 12. The caregiver may further adjust the surface assembly 12 and/or confirm the selected bladder area icons 614. In the example illustrated in FIG. 27, the bladder area icons 614 corresponding to the recessed area 412 in the head zone 24 and the recessed area 412 in the seat zone 26 are selected based on information received or determined by the controller 32. The caregiver may confirm the contours 330, select additional regions to be adjusted, or de-select regions to be adjusted.

The preselected bladder area icons 614 may be utilized for the predefined contours 330 and the adaptive surface assembly 12. When using the adaptive surface assembly 12, as illustrated in FIG. 27, the caregiver may move the bladder area icons 614 on the graphic 602, adjust shapes of the bladder area icons 614, and/or adjust sizes of the bladder area icons 614 to customize the contours 330 of the surface assembly 12.

With reference to FIGS. 28-31, the caregiver may provide information to the proning system 10 related to the patient morphology and/or surface contours 330. The proning system 10 may utilize the information input by the caregiver to form the surface contours 330 and/or may utilize the information to determine the morphology and adjust the surface assembly 12 to define the surface contours 330. The input information may have a variety of forms such as images, text, etc. as described in the examples set forth herein.

Figure 28:
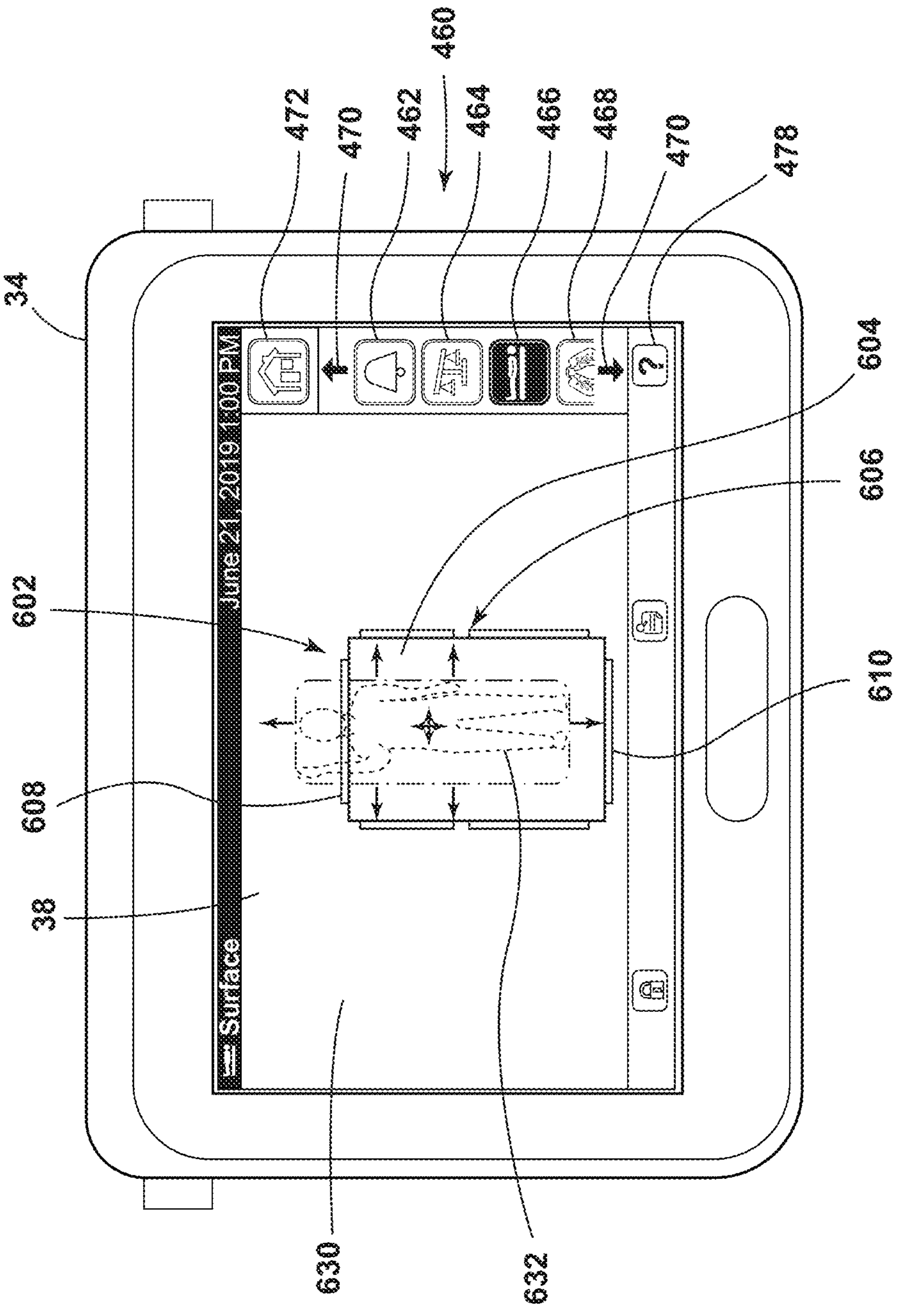
FIG. 28 is illustrative of a morphology input screen on a graphical user interface of a control panel for adjusting surface contours when operating in a prone mode, according to the present disclosure.

Referring to FIG. 28, in a non-limiting example, the morphology of the patient and/or the surface contours 330 may be input by the caregiver via the GUI 38 or determined by the controller 32 based on an input from the caregiver. In various examples, on a first morphology input screen 630, the GUI 38 may include a patient avatar 632 overlaid on the graphic 602 of the support apparatus 16. The patient avatar 632 can be adjusted and manipulated by the caregiver to input the patient position and morphology. For example, the caregiver may move the patient avatar 632 relative to the graphic 602, as well as change the size and shape (generally height and width) of the avatar 632. The various indicators on the graphic 602 may assist the caregiver in aligning the avatar 632 with the patient on the support apparatus 16, as well as adjusting the morphology of the patient. For example, the chest area of the patient may be adjacent to the head siderails 72, 74, and the caregiver can move the patient avatar 632 to a corresponding location on the graphic 602.

Figure 29:
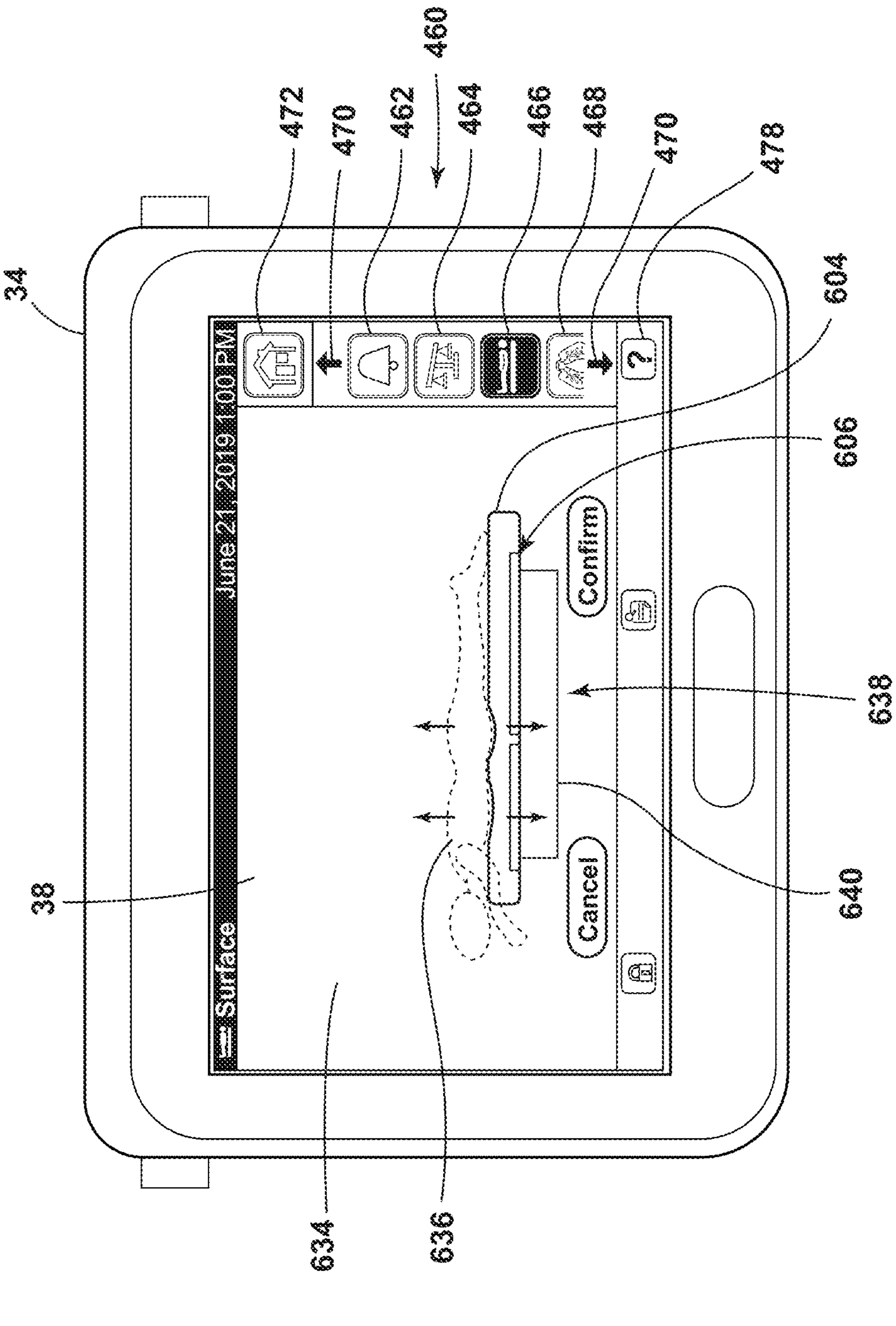
FIG. 29 is illustrative of a first surface input screen on a graphical user interface of a control panel for adjusting surface contours when operating in a prone mode, according to the present disclosure.

Referring to FIG. 29, on a second morphology input screen 634, the caregiver may input additional information about the patient, such as, for example, thickness and body contours. A second patient avatar 636 is illustrated on a second graphic 638 representative of a side view of the support apparatus 16. The information from the first morphology input screen 630 may be utilized to provide the initial size, shape, and/or position of the second patient avatar 636 relative to the second graphic 638.

The second graphic 638 includes the mattress indicator 604 and two siderail indicators 606, as well as a base indicator 640 that corresponds with the base frame 50 (FIG. 1). The indicators 604, 606, 640 may assist the caregiver in adjusting the second patient avatar 636 to match the patient on the support apparatus 16. The caregiver may adjust the second patient avatar 636 to input the thickness and body contours for the patient, such as a chest area, genital area, stomach area, etc. The caregiver may also adjust the position of the second patient avatar 636 relative to the second graphic 638, as well as a height of the patient avatar 632 relative to the second graphic 638.

Figure 30:
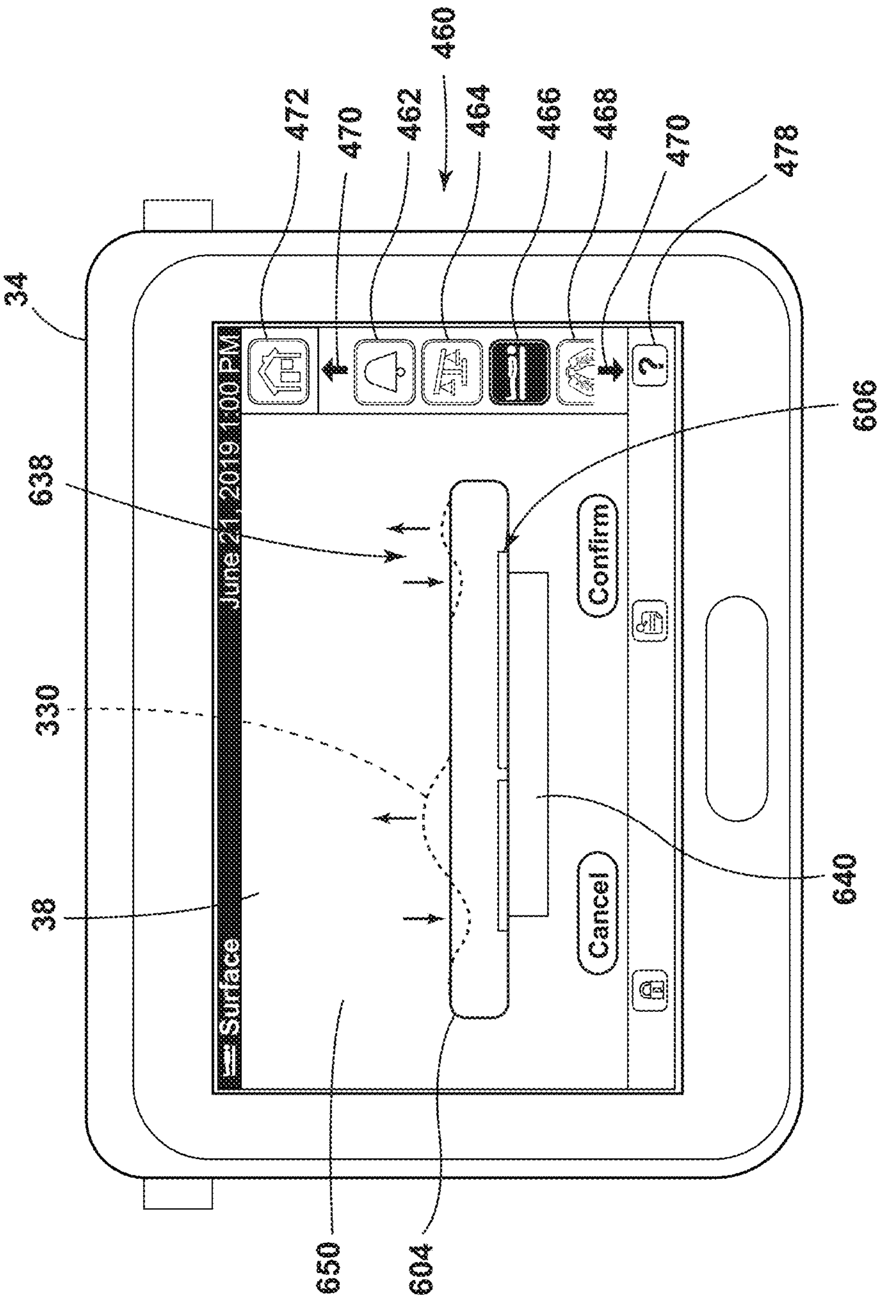
FIG. 30 is illustrative of a second surface input screen on a graphical user interface of a control panel for adjusting surface contours when operating in a prone mode, according to the present disclosure.
Figure 31:
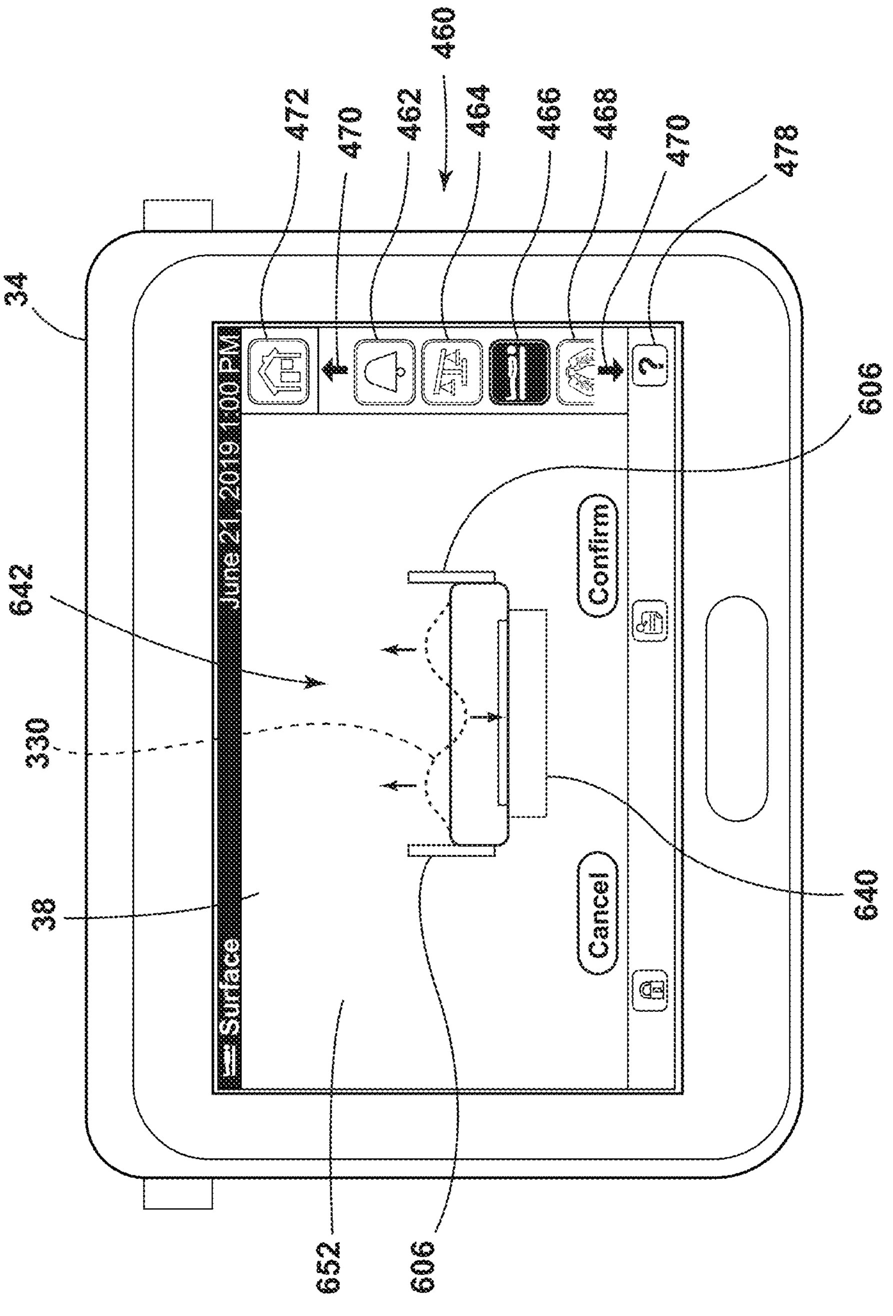
FIG. 31 is illustrative of a first surface input screen on a graphical user interface of a control panel for adjusting surface contours when operating in a prone mode, according to the present disclosure.

Referring to FIGS. 30 and 31, the caregiver may adjust the second graphic 638 (FIG. 30) and a third graphic 642 (FIG. 31) representative of the support apparatus 16 to define the surface contours 330. The third graphic 642 is generally representative of an end view of the support apparatus 16. The caregiver may input information for adjusting the surface assembly 12 based on the patient morphology, rather than inputting direct information about the patient. The caregiver may also input both the patient morphology via the morphology input screens 630, 634, as well as input surface contours 330 to provide additional customization to the configuration of the surface assembly 12.

A first surface input screen 650 is illustrated in FIG. 30. The first surface input screen 650 includes the second graphic 638 without the second patient avatar 636 (FIG. 29). The caregiver may adjust the shape of the second graphic 638 to input elevated portions and recessed portions to be defined in the surface assembly 12. The first surface input screen 650 allows the caregiver to adjust the contours 330 on the surface assembly 12 that extend laterally across the surface assembly 12. The caregiver may move, adjust, and manipulate the second graphic 638 to input the selected surface contours 330.

The second graphic 638 may be rotated to provide different adjustments on the left side and the right side of the surface assembly 12. Alternatively, an additional graphic for the opposing side of the support apparatus 16 may be utilized. Further, the first graphic 602 representative of the support apparatus 16 may also be utilized to provide more customized and personalized surface contours 330 in different areas on the surface assembly 12.

Referring again to FIG. 31, a second surface input screen 652 is illustrated on the GUI 38. The second surface input screen 652 includes the third graphic 642 representative of the end view of the support apparatus 16. The caregiver may adjust the shape of the third graphic 642 to input elevated portions and recessed portions to be defined in the surface assembly 12. The second surface input screen 652 allows the caregiver to adjust contours 330 on the surface assembly 12 that extend in a longitudinal direction across the surface assembly 12. The caregiver may move, adjust, and manipulate the third graphic 642 to input the selected surface contours 330.

The third graphic 642 may be rotated to provide different adjustments on the head end 146 and the foot end 148 of the surface assembly 12. Alternatively, an additional graphic for the opposing side of the support apparatus 16 may be utilized. Further, the first graphic 602 representative of the support apparatus 16 may also be utilized to provide more customized and personalized surface contours 330 in different areas on the surface assembly 12. The caregiver adjusts the patient avatar 632, the graphics 602, 638, 642 representative of the support apparatus 16, or combinations thereof to input the morphology information and surface contours 330.

Referring again to FIGS. 28-31, the caregiver may provide additional or alternative inputs or types of inputs to select or provide information to the controller 32 regarding the morphology of the patient, the surface contours 330, or both. In various aspects, the caregiver may input specific information to select or choose information relating to the morphology and/or surface contours 330. In additional or alternative examples, the caregiver inputs information that is utilized by the controller 32 to determine the morphology and/or surface contours 330. For example, the caregiver may select an image from a plurality of patient avatars 632 presented on the GUI 38. In such examples, the caregiver may choose the patient avatar 632 that most closely resembles the morphology of the patient. This may also be considered adjusting the patient avatar 632.

In another non-limiting example, the caregiver may select descriptions or descriptors relating to the morphology of the patient. For example, the caregiver may choose descriptors such as “apple,” “pear,” “hourglass,” etc. for inputting the patient morphology and/or adjusting the patient avatar 632. The selection of the patient avatar 632, adjustment of the patient avatar 632, adjustment of the graphics 602, 638, 642 representative of the support apparatus 16, selection of text descriptors, and/or combinations thereof may be utilized for inputting the patient morphology for the proning system 10. Moreover, these input methods are merely exemplary and additional input styles, types, information, etc. may be input through the GUI 38 or another caregiver device without departing from the teachings herein.

Referring to FIGS. 1-31, the proning system 10 provides customizable care for the patient when in the prone position. The support apparatus 16 is configured to operate in the prone mode to make adjustments to functions of the support apparatus 16, and components thereof, to provide treatment, care, therapies, and comfort for patients in the prone position. The surface assembly 12 may be adjusted, automatically and/or through caregiver inputs, to define a surface shape (i.e., surface contours 330) that accommodates the morphology and body contours of the patient. The adjusted shape of the surface assembly 12 provides increased comfort and improved care to the patient. Further, the proning system 10 includes the comfort prone functionality, which provides the adapted ALP function adjusted for the patient in the prone position. The proning system 10 also provides the prone notifications to assist the caregiver improve the care provided for the patient.

The support apparatus 16 in the proning system 10 is configured to selectively control the bladders 20 in the surface assembly 12 to optimize comfort for the patient in the prone position, as well as optimize the functions and therapies provided in the prone mode of operation. For example, the bladders 20 in the head zone 24 may be at a different pressure or pressures than bladders 20 in the seat zone 26 and/or the foot zone 28. In such examples, the bladders 20 in the head zone 24 may be deflated or maintained in the neutral state, while at least one bladder 20 in one or both of the other zones 26, 28 may be inflated. In additional non-limiting examples, the bladders 20 in the head zone 24 are at a different pressure than bladders 20 in the foot zone 28 such as when the foot elevation bladder 130 is inflated and the bladders 20 in the head zone 24 are deflated. Additionally or alternatively, the turn bladders 120 may be inflated while the bladders 20 in the head zone 24 are deflated. The controller 32 may be configured to provide the comfort prone functionality (e.g., the adjusted ALP functionality) to the bladders 20 in the seat zone 26 and/or the foot zone 28 by adjusting or putting at least two bladders 20 in the respective zone 26, 28 at different pressures. Multiple combinations of pressures are contemplated without departing from the teachings herein.

Use of the present device and systems may provide a variety of advantages. For example, the support apparatus 16 may have different modes of operation with adjusted functionality based on whether the patient is in the supine position or in the prone position. Further, the prone mode of the support apparatus 16 provides adapted functionality, which increases comfort, care, and treatment of the patient. Moreover, the comfort prone ALP functionality may be adjusted relative to the standard mode ALP functionality to provide more comfortable ALP therapy while the patient is in the prone position. The comfort prone functionality may also assist in reducing the development of pressure injuries for patients in the prone position.

Additionally, the prone mode may provide a variety of functions and features for conscious proning, as well as sedated proning. Further, the proning system 10 may be adaptable or dynamically adjustable based on the position of the patient on the surface assembly 12, the morphology of the patient, or combinations thereof. Moreover, the controller 32 may obtain information from various sensors 350 on the support apparatus 16, including the frame sensors 356, the surface sensors 352, and the bladder sensors 354, as well as the image data from the imaging system 360, and patient data from the EMR 366 to make automatic adjustments to the surface assembly 12 to increase comfort and improve care for the patient. Additional benefits or advantages may be realized and/or achieved.

The device disclosed herein is further summarized in the following paragraphs and is further characterized by combinations of any and all of the various aspects described therein.

According to another aspect of the present disclosure, a patient proning system includes a surface assembly configured to be positioned on a frame of a support apparatus. The surface assembly includes a pneumatic system that includes bladders arranged in multiple zones and a pump in fluid communication with the bladders. The pump is configured to adjust the bladders between a deployed condition and a non-deployed condition. A controller is communicatively coupled to the pneumatic system. The controller is configured to selectively control the pneumatic system in a standard mode and a prone mode based on a patient support position. A control panel is communicatively coupled to the controller. The controller is configured to generate at least one prone aid notification to be displayed on a graphical user interface of the control panel. The prone aid notification provides at least one of a reminder, instruction, alert, or information for assisting the caregiver in positioning a patient for the prone mode.

According to another aspect of the present disclosure, bladders are configured as alternating support bladders arranged in multiple zones including a head zone, a seat zone, and a foot zone.

According to another aspect of the present disclosure, a controller is configured to adjust a first predefined number of alternating support bladders in a head zone in a pattern between a deployed condition and a non-deployed condition when operating in a standard mode.

According to another aspect of the present disclosure, a controller is configured to adjust a second predefined number of alternating support bladders in a head zone in a pattern between a deployed condition and a non-deployed condition when operating in the prone mode. The second predefined number is less than a first predefined number.

According to another aspect of the present disclosure, a pattern is a repeated pattern for an alternating low pressure functionality.

According to another aspect of the present disclosure, at least one prone aid notification includes a reminder to adjust a patient toward a head end of a surface assembly.

According to another aspect of the present disclosure, at least one prone aid notification includes a first notification with instructions for turning a patient from a supine position to a prone position and a second notification with instructions for repositioning the patient from a first side in the prone position to a second side in the prone position.

According to another aspect of the present disclosure, a controller generates a reminder in response to activation of an alternating low pressure functionality when in a prone mode.

According to another aspect of the present disclosure, wherein the controller is configured to generate input screens to be displayed on a graphical user interface. The input screens include a first input screen including a graphic representative of a support apparatus and a second input screen including a graphic representative of the support apparatus and a patient avatar. The controller is configured to adjust bladders in a surface assembly based on an input related to bladder area icons on the first input screen via the graphical user interface and determine a morphology of a patient based on adjustment of the patient avatar on the graphical user interface.

According to another aspect of the present disclosure, at least one prone aid notification includes at least one of instructions for turning a patient from a supine position to a prone position and instructions for repositioning the patient from a first side to a second side in the prone position.

According to another aspect of the present disclosure, at least one prone aid notification includes multiple instruction screens that include instructions for adjusting a patient to a prone position and icons for adjusting a pneumatic system to assist in adjusting a patient.

According to another aspect of the present disclosure, icons are selectable icons related to adjusting bladders to a deployed condition.

According to another aspect of the present disclosure, a support apparatus includes a surface assembly configured to be disposed on a frame. The surface assembly includes a pneumatic system including bladders, a compressor in fluid communication with the bladders, and valves in fluid communication with the bladders. The bladders are adjustable between a deployed condition and a non-deployed condition. A controller is in communication with the pneumatic system. The controller is configured to control the pneumatic system in a standard mode and a prone mode based on a patient support position, determine a morphology of a person disposed on the surface assembly when in the prone mode, and adjust the bladders in the surface assembly to define surface contours based on the morphology of the person.

According to another aspect of the present disclosure, a deployed condition is at least one of an expanded state and a compressed state. A non-deployed condition is a neutral state.

According to another aspect of the present disclosure, a controller is configured to determine a morphology of a person based on at least one of sensed information from sensors, image data from an imaging system, and data from an electronic medical record.

According to another aspect of the present disclosure, at least one of a surface assembly and a frame includes sensors. A controller is configured to determine a position of a person on the surface assembly based on sensed information received from the sensors.

According to another aspect of the present disclosure, a morphology of a person includes at least one of height, width, thickness, and body contours.

According to another aspect of the present disclosure, a control panel has a graphical user interface. A controller is configured to generate input screens to be displayed on the graphical user interface.

According to another aspect of the present disclosure, at least one input screen is an area-based input screen including a graphic representative of a support apparatus. The graphic includes bladder area icons.

According to another aspect of the present disclosure, a controller is configured to adjust bladders in a surface assembly based on an input related to bladder area icons via a graphical user interface.

According to another aspect of the present disclosure, at least one input screen includes a graphic representative of a support apparatus and a patient avatar. A controller is configured to determine a morphology based on adjustment of the patient avatar relative to the graphic on a graphical user interface.

According to another aspect of the present disclosure, at least one input screen includes an adjustable graphic representative of a support apparatus. A controller is configured to define surface contours based on adjustment of the adjustable graphic on a graphical user interface.

According to another aspect of the present disclosure, bladders includes a foot elevation bladder disposed proximate a foot end of a surface assembly. The foot elevation bladder is configured to be adjusted to a deployed condition to define at least one surface contour.

According to another aspect of the present disclosure, bladders include turn bladders disposed on a left side and a right side of a surface assembly. The turn bladders are configured to be adjusted to a deployed condition. At least one surface contour is a central recessed region defined by the turn bladders in the deployed condition.

According to another aspect of the present disclosure, surface contours include at least one recessed area configured to align with at least one of a head area of a person, a chest area of the person, and a genital area of the person.

According to another aspect of the present disclosure, a controller is configured to generate at least one prone aid notification to be communicated to a user interface. The at least one prone aid notification includes multiple instruction screens for adjusting a patient on a surface assembly from a supine position to a prone position.

According to another aspect of the present disclosure, bladders include a repositioning bladder configured to align with a chest area of a person supported on a surface assembly.

According to another aspect of the present disclosure, a controller is configured to determine a position of a person on a surface assembly and adjust bladders in the surface assembly to define surface contours based on the position of the person when in the prone mode.

According to another aspect of the present disclosure, bladders are configured as alternating support bladders arranged in multiple zones. A controller is configured to adjust a first predefined number of the alternating support bladders in a head zone in a pattern between a deployed condition and a non-deployed condition when operating in the standard mode and adjust a second predefined number of the alternating support bladders in the head zone in the pattern between the deployed condition and the non-deployed condition when operating in the prone mode.

According to another aspect of the present disclosure, a proning system includes a surface assembly including bladders adjustable between a deployed condition and a non-deployed condition and a controller communicatively coupled with the surface assembly. The controller is configured to adjust the surface assembly between a standard mode of operation and a prone mode of operation based on a patient support position, adjust the surface assembly to define surface contours when in the prone mode of operation, and generate at least one prone aid notification configured to be communicated to a user interface. The prone aid notification provides at least one of a reminder, instruction, alert, or information for assisting the caregiver in positioning a patient for the prone mode of operation.

According to another aspect of the present disclosure, bladders include a repositioning bladder configured to align with a chest area of a patient supported on a surface assembly.

According to another aspect of the present disclosure, a controller is configured to communicate with an imaging system to receive image data of a patient supported on a surface assembly.

According to another aspect of the present disclosure, a controller is configured to determine at least one of a patient support position of a patient, a morphology of the patient, and a position of the patient on a surface assembly based on image data.

According to another aspect of the present disclosure, a controller is configured to adjust bladders to define surface contours.

According to another aspect of the present disclosure, at least one prone aid notification includes a positioning reminder configured to be generated upon activation of an alternating low pressure therapy when a surface assembly is in a prone mode of operation.

According to another aspect of the present disclosure, at least one prone aid notification includes multiple instruction screens for adjusting a patient on a surface assembly from a supine position to a prone position.

According to another aspect of the present disclosure, multiple instruction screens includes a first instruction screen with an icon for activating a first side turn bladder, instructions to activate the first side turn bladder, and instructions to adjust a patient to a first side of a surface assembly.

According to another aspect of the present disclosure, multiple instruction screens includes a second instruction screen with an icon for activating a second side turn bladder, instructions to activate the second side turn bladder, and instructions to adjust a patient to a prone position.

According to another aspect of the present disclosure, multiple instruction screens includes a third instruction screen with an icon for activating a boost mode of bladders, instructions to activate the boost mode, and instructions to adjust a patient toward a head end of a surface assembly.

According to another aspect of the present disclosure, a surface assembly is disposed on a frame. A prone accessory is coupled to a head end of the frame.

According to another aspect of the present disclosure, a control panel includes a user interface. The user interface is configured to display a surface control screen. The surface control screen includes a first icon for activating an alternating low pressure therapy of a surface assembly in a standard mode of operation and a second icon for activating an adjusted alternating low pressure therapy of the surface assembly in a prone mode of operation.

According to another aspect of the present disclosure, a first predefined number of bladders are configured to be adjusted between a deployed condition and a non-deployed condition during an alternating low pressure therapy in a standard mode of operation and a second predefined number of bladders are configured to be adjusted between the deployed condition and the non-deployed condition during an adjusted alternating low pressure therapy in a prone mode of operation.

According to another aspect of the present disclosure, a second predefined number of bladders is less than a first predefined number of bladders to increase a stationary head area of a surface assembly.

According to another aspect of the present disclosure, a proning system includes a controller configured to adjust the surface assembly between a standard mode of operation and a prone mode of operation based on a patient support position, determine a morphology of a patient positioned on a surface assembly, determine a position of the patient on the surface assembly, and adjust bladders in the surface assembly to define surface contours based on at least one of the morphology and the position of the patient when in the prone mode of operation.

According to another aspect of the present disclosure, a controller is configured to activate a pneumatic system in a surface assembly to provide a therapy with bladders and adjust the bladders that are included in the therapy when in a prone mode of operation.

According to another aspect of the present disclosure, a controller is configured to generate a prone aid notification configured to be communicated to a user interface.

According to another aspect of the present disclosure, at least one prone aid notification includes multiple instruction screens for repositioning a patient on a surface assembly between a first prone position and a second prone position.

According to another aspect of the present disclosure, a patient proning system includes a surface assembly configured to be positioned on a frame of a support apparatus. The surface assembly includes a pneumatic system that includes bladders arranged in multiple zones including a first zone configured to support a head of a patient and a second zone and a pump in fluid communication with the bladders. The pump is configured to selectively adjust the first and second zones between a deployed condition and a non-deployed condition. A controller is communicatively coupled to the pneumatic system. The controller is configured to selectively control the pneumatic system in at least one of a standard mode and a prone mode based on a patient support position. In the prone mode, the controller deflates the first zone while inflating at least one bladder in the second zone.

According to another aspect of the present disclosure, a controller provides alternating pressure therapy to bladders in a second zone when in a prone mode by putting at least two of the bladders in the second zone at different pressures.

According to another aspect of the present disclosure, a control panel is communicatively coupled to a controller. The controller is configured to generate at least one prone aid notification to be displayed on a graphical user interface of the control panel. The prone aid notification provides at least one of a reminder, instruction, alert, or information for assisting the caregiver in positioning the patient in a prone mode.

According to another aspect of the present disclosure, a second zone supports a foot area of a patient. Bladders in a first zone and bladders in a second zone are at different pressures.

According to another aspect of the present disclosure, bladders in a second zone include turn bladders. The turn bladders are at a different pressure than bladders in a first zone.

According to another aspect of the present disclosure, a patient proning system includes a support apparatus including a frame and a surface assembly configured to be positioned on the frame of the support apparatus. The surface assembly includes a pneumatic system. The pneumatic system includes alternating bladders arranged in multiple zones including a first zone configured to support a head of a patient and a second zone, an isolation bladder disposed in the first zone, and a pump in fluid communication with the alternating bladders and the head isolation bladder. The pump is configured to selectively adjust the alternating bladders in the first and second zones between a deployed condition and a non-deployed condition. A controller is communicatively coupled to the pneumatic system. The controller is configured to selectively control the pneumatic system in a standard mode and a prone mode based on a patient support position. In the prone mode, the controller is configured to retain at least one alternating bladder adjacent to the isolation bladder in the first zone in the non-deployed condition while adjusting at least one alternating bladder in the first zone and at least one alternating bladder in the second zone between the deployed condition and the non-deployed condition.

According to another aspect of the present disclosure, a prone accessory coupled to a head end of a frame.

According to another aspect of the present disclosure, a support apparatus includes a user interface configured to receive an input related to a patient morphology. A controller is configured to adjust at least one of turn bladders and alternating bladders in a surface assembly to define surface contours based on the input when in a prone mode.

According to another aspect of the present disclosure, a controller is configured to generate a prone aid notification to be communicated to a user interface.

According to another aspect of the present disclosure, a foot elevation bladder is disposed proximate a foot end of the surface assembly for elevating feet of the patient when in the deployed condition and in the prone mode, and a repositioning bladder is configured to align with a chest area of the patient supported on the surface assembly to lift the chest area of the patient when in the deployed condition and in the prone mode.

According to another aspect of the present disclosure, a surface assembly includes turn bladders. A controller is configured to determine a morphology of a patient positioned on the surface assembly, determine a position of the patient on the surface assembly, and adjust at least one of the turn bladders and alternating bladders in the surface assembly to define surface contours based on at least one of the morphology and the position of the patient when in a prone mode.

According to another aspect of the present disclosure, a means for proning a patient includes a first support means configured to be positioned on a frame of a second support means. The first support means includes a therapy means that includes bladders arranged in multiple zone and a fluid control means in fluid communication with the bladders. The fluid control means is configured to selectively adjust the bladders between a deployed condition and a non-deployed condition. A control means is communicatively coupled with the therapy means. The control means is configured to selectively control the therapy means in at least one of a standard mode and a prone mode based on a patient support position. A means for receiving an input is coupled to the control means. The control means is configured to generate at least one prone aid notification to be displayed on a display means of the means for receiving an input.

Related applications, for example those listed herein, are fully incorporated by reference. Assertions within the related applications are intended to contribute to the scope and interpretation of the information disclosed herein. Any changes between any of the related applications and the present disclosure are not intended to limit the scope or interpretation of the information disclosed herein, including the claims. Accordingly, the present application includes the scope and interpretation of the information disclosed herein as well as the scope and interpretation of the information in any or all of the related applications.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term “coupled” (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A patient proning system, comprising:

a surface assembly configured to be positioned on a frame of a support apparatus, wherein the surface assembly includes a pneumatic system that includes:

bladders arranged in multiple zones, wherein the bladders include alternating support bladders arranged in the multiple zones including a head zone, a seat zone, and a foot zone; and a pump in fluid communication with the bladders, wherein the pump is configured to adjust the bladders between a deployed condition and a non-deployed condition;

a controller communicatively coupled to the pneumatic system, wherein the controller is configured to:

selectively control the pneumatic system in a standard mode and a prone mode based on a patient support position;

adjust a first predefined number of the alternating support bladders in the head zone in a pattern between the deployed condition and the non-deployed condition when operating in the standard mode; and adjust a second predefined number of the alternating support bladders in the head zone in the pattern between the deployed condition and the non-deployed condition when operating in the prone mode, and wherein the second predefined number is less than the first predefined number; and a control panel communicatively coupled to the controller, wherein the controller is configured to generate at least one prone aid notification to be displayed on a graphical user interface of the control panel, wherein the at least one prone aid notification provides at least one of a reminder, instruction, alert, or information for assisting a caregiver in positioning a patient for the prone mode.

2. The patient proning system of claim 1, wherein the at least one prone aid notification includes a reminder to adjust a patient toward a head end of the surface assembly.

3. The patient proning system of claim 1, wherein the at least one prone aid notification includes a first notification with instructions for turning the patient from a supine position to a prone position and a second notification with instructions for repositioning the patient from a first side in the prone position to a second side in the prone position.

4. The patient proning system of claim 1, wherein the at least one prone aid notification includes multiple instruction screens that include instructions for adjusting a patient to a prone position and icons for adjusting the pneumatic system to assist in adjusting the patient.

5. The patient proning system of claim 1, wherein the controller is configured to:

generate input screens to be displayed on the graphical user interface, wherein the input screens include a first input screen including a graphic representative of the support apparatus and a second input screen including a graphic representative of the support apparatus and a patient avatar;

adjust the bladders in the surface assembly based on an input related to bladder area icons on the first input screen via the graphical user interface; and determine a morphology of the patient based on adjustment of the patient avatar on the graphical user interface.

6. A support apparatus, comprising:

a surface assembly configured to be disposed on a frame, wherein the surface assembly includes a pneumatic system including:

bladders, wherein the bladders include alternating support bladders arranged in multiple zones;

a compressor in fluid communication with the bladders; and valves in fluid communication with the bladders, wherein the bladders are adjustable between a deployed condition and a non-deployed condition; and a controller in communication with the pneumatic system, wherein the controller is configured to:

control the pneumatic system in a standard mode and a prone mode based on a patient support position;

adjust a first predefined number of the alternating support bladders in a head zone in a pattern between the deployed condition and the non-deployed condition when operating in the standard mode;

adjust a second predefined number of the alternating support bladders in the head zone in the pattern between the deployed condition and the non-deployed condition when operating in the prone mode;

determine a morphology of a person disposed on the surface assembly when in the prone mode; and adjust the bladders in the surface assembly to define surface contours based on the morphology of the person.

7. The support apparatus of claim 6, wherein the controller is configured to determine the morphology of the person based on at least one of sensed information from sensors, image data from an imaging system, and data from an electronic medical record.

8. The support apparatus of claim 6, wherein the bladders include a foot elevation bladder disposed proximate a foot end of the surface assembly, and wherein the foot elevation bladder is configured to be adjusted to the deployed condition to define at least one of the surface contours.

9. The support apparatus of claim 6, wherein the bladders include turn bladders disposed on a left side and a right side of the surface assembly, and wherein the turn bladders are configured to be adjusted to the deployed condition, and wherein at least one of the surface contours is a central recessed region defined by the turn bladders in the deployed condition.

10. The support apparatus of claim 6, wherein the surface contours include at least one recessed area configured to align with at least one of a head area of the person, a chest area of the person, and a genital area of the person.

11. The support apparatus of claim 6, wherein the bladders include a repositioning bladder configured to align with a chest area of the person supported on the surface assembly.

12. The support apparatus of claim 6, wherein the controller is configured to:

generate at least one prone aid notification to be communicated to a user interface, and wherein the at least one prone aid notification includes multiple instruction screens for adjusting a patient on the surface assembly from a supine position to a prone position.

13. The support apparatus of claim 6, wherein the controller is configured to:

determine a position of the person on the surface assembly; and adjust the bladders in the surface assembly to define the surface contours based on the position of the person when in the prone mode.

14. A patient proning system, comprising:

a support apparatus including a frame;

a surface assembly configured to be positioned on the frame of the support apparatus, wherein the surface assembly includes a pneumatic system including:

alternating bladders arranged in multiple zones including a first zone configured to support a head of a patient and a second zone;

an isolation bladder disposed in the first zone; and a pump in fluid communication with the alternating bladders and the isolation bladder, wherein the pump is configured to selectively adjust the alternating bladders in the first and second zones between a deployed condition and a non-deployed condition; and a controller communicatively coupled to the pneumatic system, wherein the controller is configured to:

selectively control the pneumatic system in a standard mode and a prone mode based on a patient support position;

in the prone mode, retain at least one alternating bladder adjacent to the isolation bladder in the first zone in the non-deployed condition to increase an area for supporting the head of the patient in the prone mode compared to the standard mode while adjusting at least one alternating bladder in the first zone and at least one alternating bladder in the second zone between the deployed condition and the non-deployed condition.

15. The patient proning system of claim 14, wherein the pneumatic system includes:

a foot elevation bladder disposed proximate a foot end of the surface assembly for elevating feet of the patient when in the deployed condition and in the prone mode; and a repositioning bladder configured to align with a chest area of the patient supported on the surface assembly to lift the chest area of the patient when in the deployed condition and in the prone mode.

16. The patient proning system of claim 14, wherein the support apparatus includes a user interface configured to receive an input related to a patient morphology, and wherein the controller is configured to adjust at least one of turn bladders and the alternating bladders in the surface assembly to define surface contours based on the input when in the prone mode.

17. The patient proning system of claim 14, wherein the controller is configured to generate a prone aid notification to be communicated to a user interface.

18. The patient proning system of claim 14, wherein the surface assembly includes turn bladders, and wherein the controller is configured to:

determine a morphology of the patient positioned on the surface assembly;

determine a position of the patient on the surface assembly; and adjust at least one of the turn bladders and the alternating bladders in the surface assembly to define surface contours based on at least one of the morphology and the position of the patient when in the prone mode.

19. The patient proning system of claim 14, wherein the at least one alternating bladder adjacent to the isolation bladder is configured to adjust between the deployed condition and the non-deployed condition in the standard mode.

20. The patient proning system of claim 14, wherein the area for supporting the head of the patient includes the isolation bladder and the at least one alternating bladder adjacent to the isolation bladder in the prone mode and the isolation bladder in the standard mode.

* * * * *